(12) United States Patent
Holloway

(10) Patent No.: US 11,161,574 B2
(45) Date of Patent: Nov. 2, 2021

(54) FOAM BLANK

(71) Applicant: Daniel Holloway, Currumbin (AU)

(72) Inventor: Daniel Holloway, Currumbin (AU)

( * ) Notice: Subject to any disclaimer, the term of this patent is extended or adjusted under 35 U.S.C. 154(b) by 0 days.

(21) Appl. No.: 16/470,158

(22) PCT Filed: Dec. 22, 2017

(86) PCT No.: PCT/AU2017/051454
§ 371 (c)(1),
(2) Date: Jun. 14, 2019

(87) PCT Pub. No.: WO2018/112554
PCT Pub. Date: Jun. 28, 2018

(65) Prior Publication Data
US 2020/0017174 A1    Jan. 16, 2020

(30) Foreign Application Priority Data

Dec. 23, 2016  (AU) ............................... 2016905379
Dec. 5, 2017   (AU) ............................... 2017904886

(51) Int. Cl.
*B63B 32/57*    (2020.01)
*B29C 70/86*    (2006.01)
*B29L 31/52*    (2006.01)

(52) U.S. Cl.
CPC ............ *B63B 32/57* (2020.02); *B29C 70/865* (2013.01); *B29L 2031/5272* (2013.01); *B63B 2231/50* (2013.01)

(58) Field of Classification Search
CPC ..... B63B 32/57; B63B 2231/50; B63B 32/40; B29C 70/865; B29C 70/52; B29L 2031/5272
See application file for complete search history.

(56) References Cited

U.S. PATENT DOCUMENTS 2,454,719 A  * 11/1948  Scogland ............. B29D 24/002
                                                156/155
6,712,657 B1 *  3/2004  Echecopar ............. B63B 32/57
                                                441/74
(Continued)

FOREIGN PATENT DOCUMENTS

AU    2011226976 A1   4/2013
CN     102145737 A    8/2011
(Continued)

OTHER PUBLICATIONS

English Bibliography for Chinese Published Pat. App. No. CN102553204A, published Jul. 11, 2012, printed from Derwent Innovation on May 28, 2021, 5 pages.

*Primary Examiner* — Anthony D Wiest
(74) *Attorney, Agent, or Firm* — Fay Sharpe LLP

(57) ABSTRACT

This invention relates in general to an improved foam blank for a surfcraft and in particular, to an improved reinforced foam blank and a method of manufacturing the same. The foam blank has a top blank face, an opposed bottom blank face, a pair of shaped rails extending between the opposed top and bottom blank faces at blank face edges, an enclosed core space and a midline axis extending between a nose region and a tail region and which divides the foam blank into two substantially equal regions. At least one longitudinally extending slotted aperture is formed in any one or more of the top, the bottom or the rails, such that the slotted aperture extends into the enclosed core space. At least one flexible spine is bonded to be fixed within the at least one longitudinally extending slotted aperture.

22 Claims, 44 Drawing Sheets

(56) References Cited

U.S. PATENT DOCUMENTS

| | | |
|---|---|---|
| 7,892,058 B1 | 2/2011 | Echecopar |
| 9,216,801 B2 | 12/2015 | Barron |
| 2006/0292941 A1 | 12/2006 | Bert |
| 2007/0010145 A1* | 1/2007 | Mehiel .................. B63C 11/02 441/74 |
| 2007/0132141 A1 | 6/2007 | Pleskunas |
| 2008/0210137 A1 | 9/2008 | Cox |
| 2008/0293315 A1 | 11/2008 | Yeh |
| 2009/0324838 A1* | 12/2009 | Jolley .................. B63B 32/57 427/412.1 |
| 2011/0023762 A1 | 2/2011 | Chen |
| 2013/0164507 A1 | 6/2013 | Shen |
| 2014/0024272 A1 | 1/2014 | Barron |

FOREIGN PATENT DOCUMENTS

| | | |
|---|---|---|
| CN | 102553204 A | 7/2012 |
| WO | 2002009929 A1 | 2/2002 |

* cited by examiner

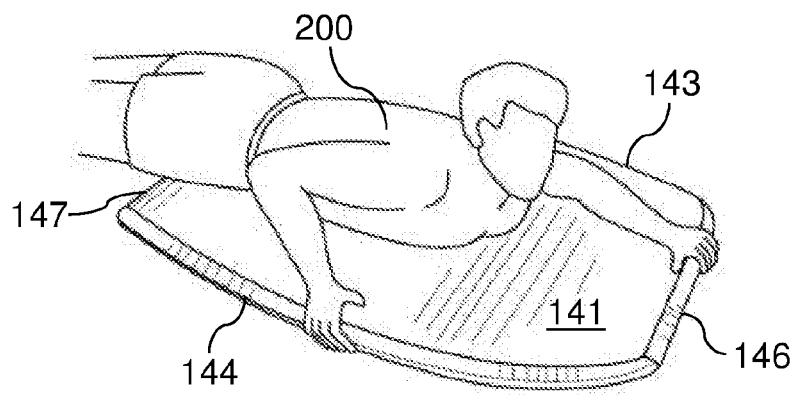
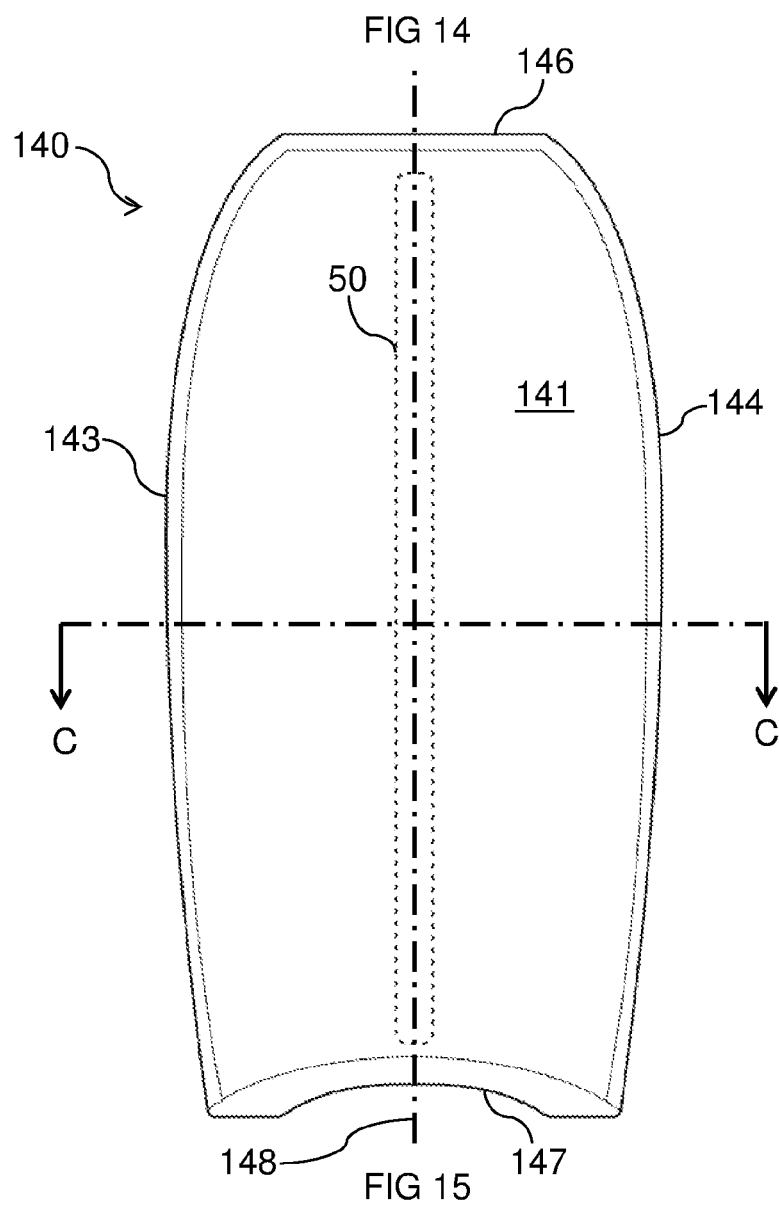

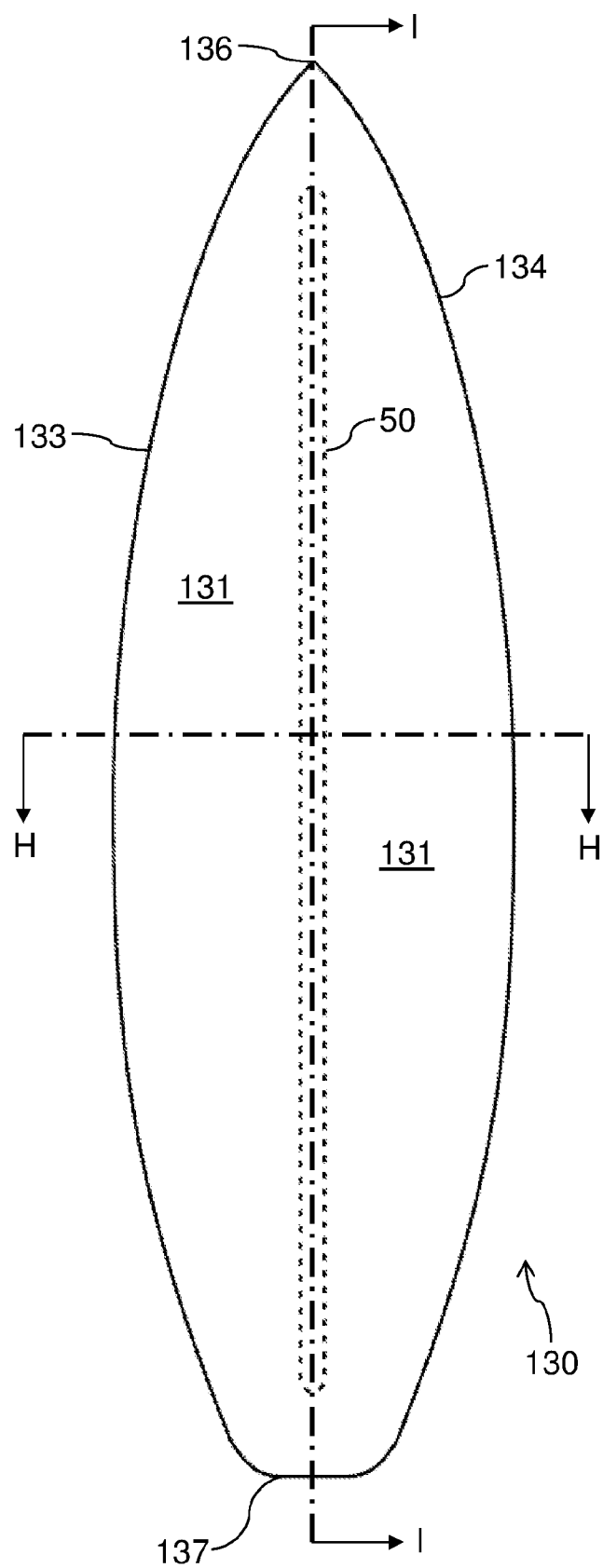
FIG 44
FIG 45

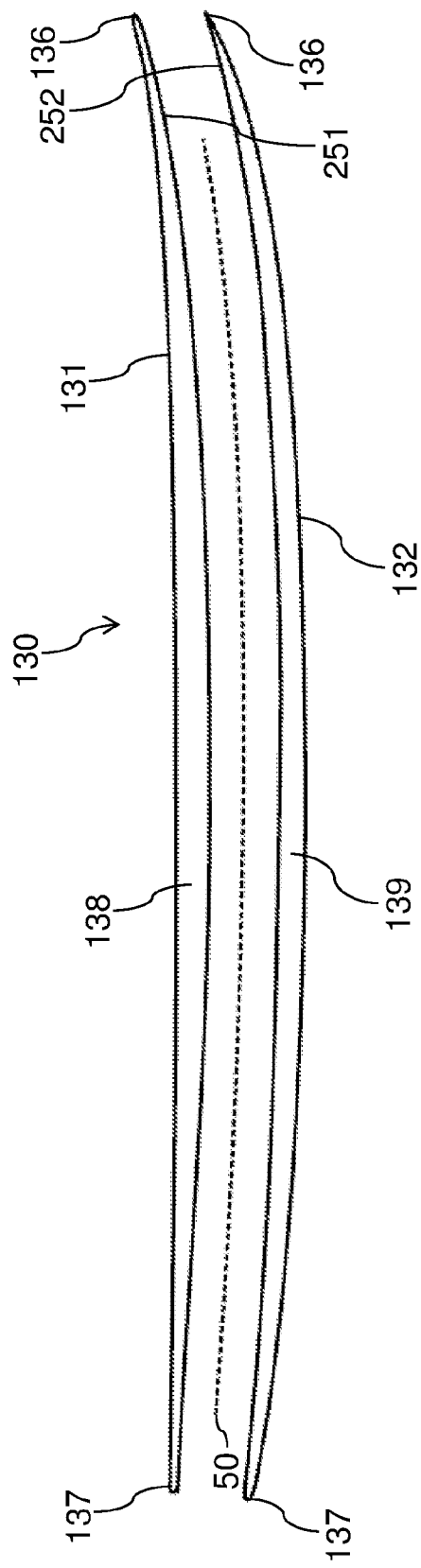
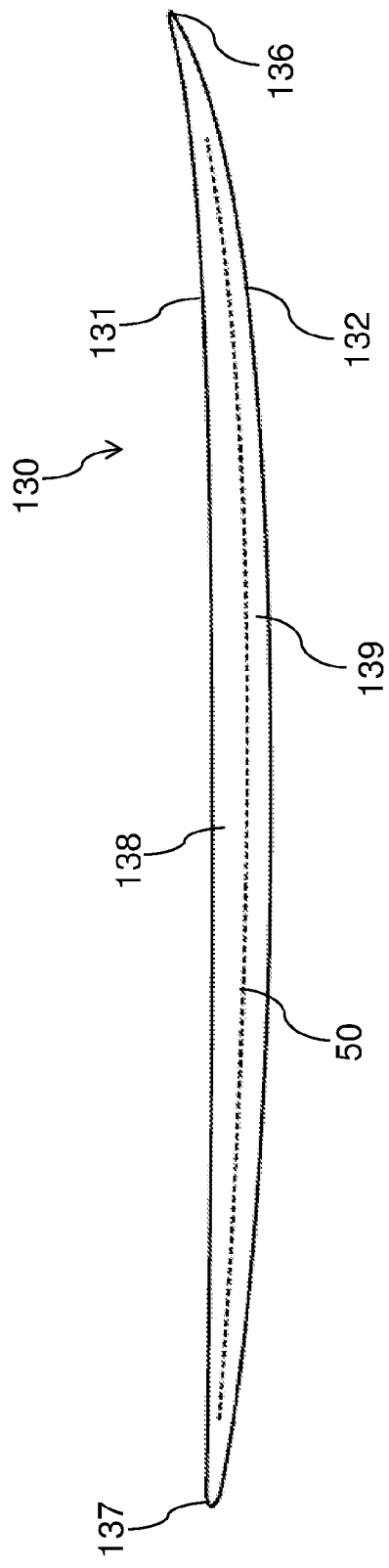

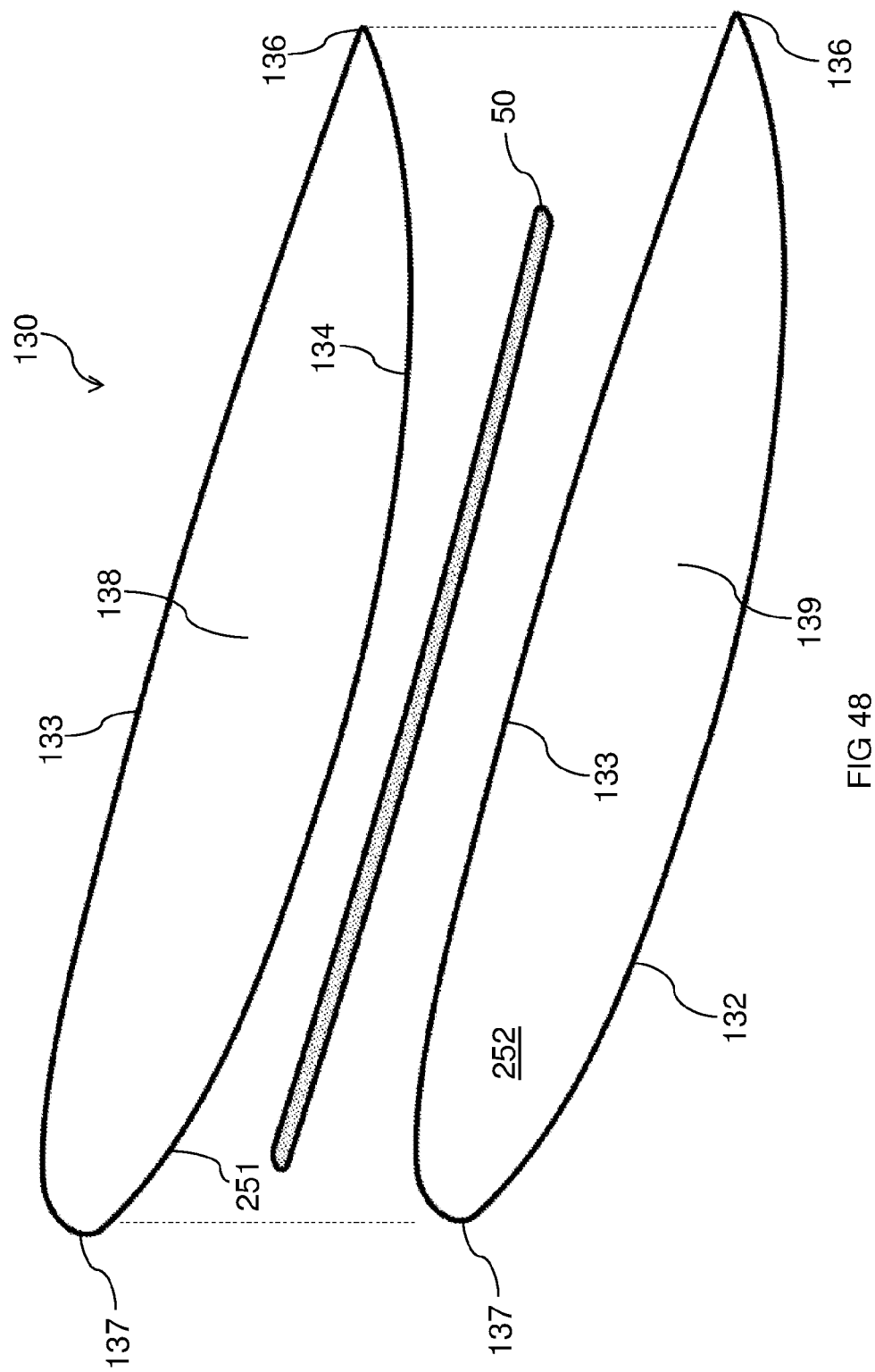

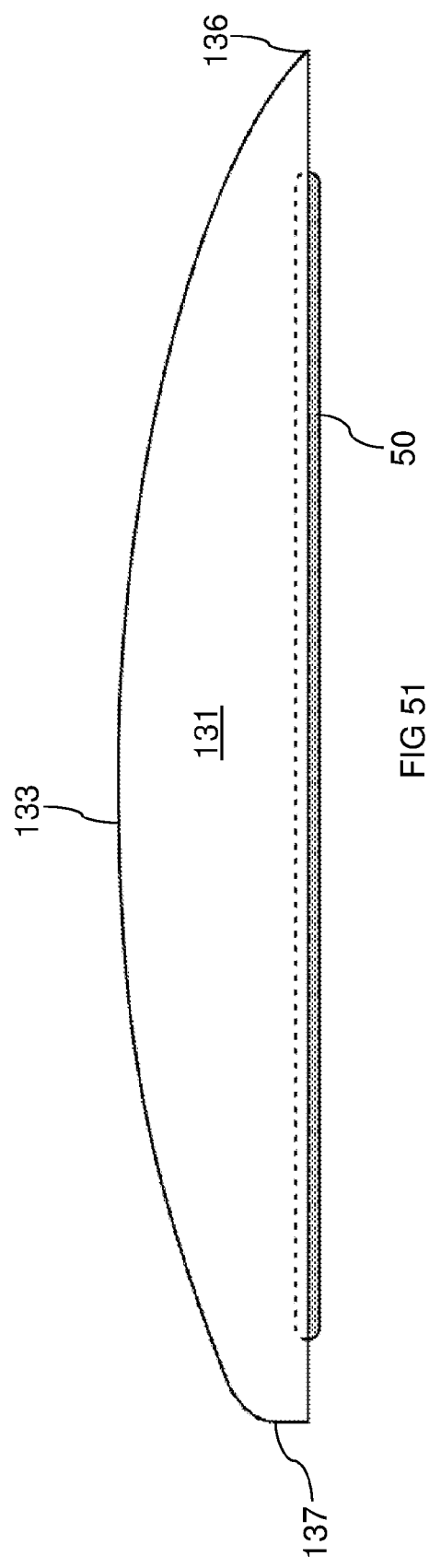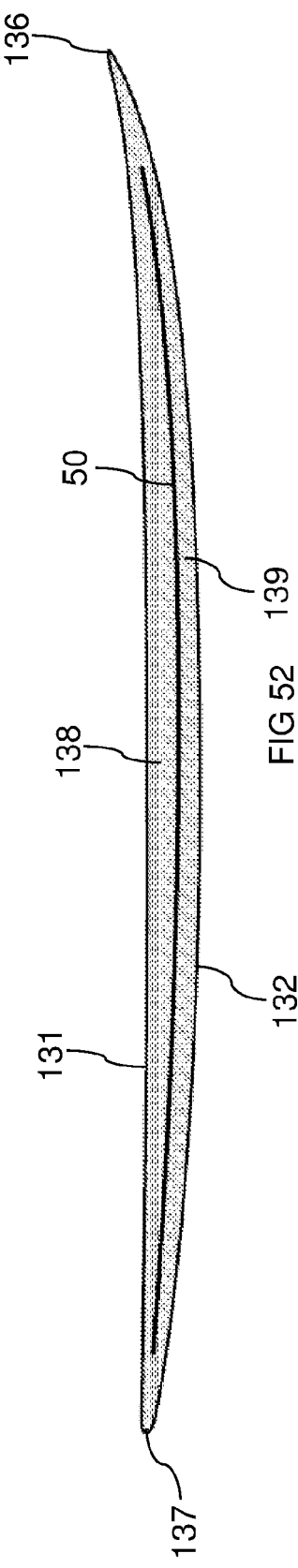

FOAM BLANK

FIELD OF THE INVENTION

This invention relates in general to an improved foam blank for a surfcraft suitable for riding waves and in particular, to an improved reinforced foam blank for a surfboard or bodyboard and a method of manufacturing the same.

BACKGROUND OF THE INVENTION

It should be noted that reference to the prior art herein is not to be taken as an acknowledgement that such prior art constitutes common general knowledge in the art.

Surfcraft, such as surfboards, surf skis, stand up paddleboards (SUP's), wakeboards, skim boards, surf lifesaving boards including nipper and racing mals, kiteboards and windsurfing boards are traditionally made through a standard production technique in which polyurethane foam, polystyrene foam, expanded polystyrene foam, or extruded polystyrene foam is cut to a desired shape and then encased in a fibre-reinforced skin, such as fiberglass. The surfboard for example is an elongated platform which is relatively light, but is strong enough to support an individual standing on them while riding an ocean breaking wave.

The bodyboard is another type of surfcraft which are also traditionally made through a standard production technique in which polyethylene foam, polypropylene foam and expanded polystyrene foam is cut to a desired shape to form the core of the bodyboard. The core is then encased by a bottom skin material, a deck material and the rails or side edges of the bodyboard. The bottom skin or slick material is typically a high density polyethylene (HDPE) or on the better types of bodyboard can be Surlyn made by DuPont. The deck material and rails can be made from a closed cell or crosslinked polyethelene or polypropylene material or an open cell foam material. The bodyboard allows the user to ride waves on their stomach or knees. Typically when riding on their stomach the user's waist should be lying on the tail of the bodyboard with their hands positioned on the nose of the board and the feet and legs in the water with the bodyboard held flat.

The flow of water is the science behind surfboard and bodyboard shaping and manufacturing. The overall design of the board has a profound impact on the wave riding performance. By way of example only a surfboard with a rounder template will force a surfer to cut longer curves and surf with a more laid-back style than a pointier one will allow for. There are several variables in the creation of a good surfboard or bodyboard. The material bending or flex of the board in the water is an important aspect of a modern board and allows the board foam material to bend without breaking. Likewise the rigidity or stiffness of the board provides the strength and prevents the board from breaking. Flex provides the ability to store potential energy, return the board to its original shape, release the stored potential energy and turn it into kinetic energy or acceleration. Thus there must be a balance between the rigidity and flex or bending of the board to prevent the board from breaking during use.

Surfboard manufacture utilises a blank, formed of polyurethane foam, polystyrene foam, expanded polystyrene foam, or extruded polystyrene foam, which are subsequently resin laminated by woven and non-woven fabrics, including but not limited to: fiberglass cloth, Innegra, Kevlar, Basalt or carbon fibre for additional strength. Composite deckskins are also used in certain constructions in and attempt to increase density strength on the surfboards surface.

To maintain the structural integrity of the surfboard or bodyboard due to bending, a stringer is typically embedded in the middle of the surfboard or bodyboard foam extending from the tail to the nose. The surfboard stringer is typically formed of balsa wood, basswood, redwood, cedar, plywood and birch and is used as an industry old method to add strength and rigidity to the surfboard. The bodyboard stringers are formed from a plastic pipe or carbon fibre and taper throughout their length.

While the addition of the stringer to the foam is supposed to increase the strength and rigidity of the board, there are a number of problems associated with the stringer. For example, the conventional stringer that is placed in the middle of the surfboard often results in a surfboard that is rigid along the centre of the surfboard, but weak and flexible along the surfboard's curved perimeter edges or rails. This inconsistent rigidity throughout the surfboard is known as a torsion flex, which causes the board to be non-uniform in its flex and can lose its drive and slow down while traveling on a wave.

One technique to overcome the issue of torsion flex is to place parabolic stringers on and along the rails of the surfboard instead of in the middle of the surfboard. By strengthening the rails, the foam can bend and spring back to its original shape quicker while the structural integrity of the foam is maintained and somewhat more uniform. However this technique significantly increases the cost of labour in surfboard construction. The blank foam must first be cut in a parabolic arc, and the wooden stringer must have a certain thickness, be carefully hand bent and hand glued along the rails to follow the outline of the surfboard. The shaping of a surfboard with parabolic stringers is both labour intensive and time consuming.

The addition of a stringer in a surfboard blank requires the stringer to be glued into the foam and this further increases the weight of the surfboard, which may affect the performance of the surfboard and consistency of the flex. Lastly, the wooden stringer reduces the shelf-life of the surfboard's responsiveness. After repeated compression and expansion due to the flex, a surfboard's traditional wooden stringer weakens, giving the surfboard a dead feeling.

The timber stringer is traditionally made from wood veneer, most commonly plywood. Other timbers used for the stringer include the likes of Balsa and *Paulownia*. These stringers are also used to add a curve or rocker to the foam blank. Furthermore, different width of stringers can be used to reinforce the blank. Timber stringers are applied to a surfboard blank after it has been cut in half, then glued in and set to the desired rocker shape. The stringer runs vertically through the blank from top to bottom. The stringer does little to strengthen the surfboard and offers no flex benefits outside of stiffening the blank (rigidity through the centre). Once glued in and the blank is re-joined, the timber stinger and the rocker shape it has created cannot be modified. Furthermore, timber stringers are generally only 3 mm to 6 mm in width which do not offer compression strength (no load spreading) and therefore can be dangerous as a surfers foot can buckle over the timber if the surfboard dents or breaks.

Some modern surfboards are now being designed to be stringerless. One particular design uses expanded polystyrene foam blank with carbon fibre strapping to reinforce the high stress zones of the board such as the rails. This increases the strength in the areas where it's most needed to create a strong, lightweight board with a lively flex pattern.

However, being stringerless means they are more likely to deform under load. The reinforced rails provide increased strength along the sides of the board but not at the ends of the board and, importantly, not where the surfer's feet are usually placed. Another disadvantage of the side rail reinforcement is that carbon fibre can be damaged during production, shaping and handling of the core before the fibre glass is applied and that can compromise the strength of the reinforcement. These types of boards also require further epoxy lamination which adds to the cost of the boards and makes the design more labour intensive.

Reinforcement materials such as carbon, Innegra and Kevlar are currently used to add surface strength to boards and control flex. These materials are applied by hand lamination or vacuum bagging and can be very labour intensive and add further cost to the surfboard.

The epoxy surfboard construction has become very popular and typically use expanded polystyrene blanks (EPS) which can only be laminated with epoxy resin. These blanks are ultra-light and have a lively feel in the water, however they lack structural strength and flex significantly (particularly without any form of stringer). It should also be noted that PU blanks without a traditional stringer also flex significantly and therefore offer a lively feel.

Designing a high performing surfboard or bodyboard of predictable performance is a difficult task. The surfboard interacts with water flows on the face of a wave close to breaking, making water flow along and around them very complex. Competitive surfboard riders demand high speed, quick turning, and manoeuvrability in their surfboards which causes the surfboard to be highly and unpredictably stressed.

Likewise, designing a high performance bodyboard with the right amount of flex and recoil depends on the materials used and the climate. Stiffer boards work better in bigger waves, clean surf and warmer waters, they tend be harder to control in choppy conditions. Having good flex/recoil will fire the bodyboard through turns, spins, rolls and airs. The materials used in construction and the climate you are using the board in will affect the way a board will bend and recoil to its original shape. For example, colder waters and climates require a board with more flex while hotter climates require materials that are stiffer.

Clearly it would be advantageous if an improved foam blank for a surfcraft and method of manufacturing the foam blank for a surfcraft could be devised that helped to at least ameliorate some of the shortcomings described above. In particular, it would be beneficial to provide an improved foam blank for a surfcraft which has the desired flex patterns, strength properties and enhanced performance characteristics to suit any end user.

SUMMARY OF THE INVENTION

In accordance with a first aspect, the present invention provides a foam blank for a surfcraft, the foam blank comprising: a top blank face and an opposed bottom blank face; a pair of shaped rails extending between the opposed top and bottom blank faces at blank face edges; an enclosed core space defined between the opposed top and bottom blank faces and the rails; a midline axis extending between a nose region and a tail region and which divides the foam blank into two substantially equal regions, each of which extend between the midline axis and the rail on sides respectively thereof; at least one longitudinally extending slotted aperture formed in any one or more of the top, the bottom or the rails, such that the slotted aperture extends into the enclosed core space; at least one flexible spine; and wherein the at least one flexible spine is bonded to be fixed within the at least one longitudinally extending slotted aperture.

Preferably, at least one of the slotted apertures may extend substantially from the nose to the tail in the top and/or in the bottom of the foam blank. Alternatively, at least one of the slotted apertures may extend from the nose to the tail in the top and/or in the bottom of the foam blank.

Preferably, at least one of the slotted apertures may extend along the midline axis of the foam blank in the top and/or in the bottom of the foam blank.

Alternatively, a plurality of longitudinally extending slotted apertures may be formed in any one or more of the top, the bottom or the rails of the foam blank and at least one flexible spine is located in each one of the slotted apertures. One of the plurality of slotted apertures may extend substantially from the nose to the tail in the top and/or the bottom of the foam blank and along the midline axis. Other ones of the plurality of slotted apertures may be located in the top and/or the bottom of the foam blank in a position symmetrically either side of the midline axis and extending substantially from the nose to the tail, in a position symmetrically either side of the midline axis and extending a distance from the nose or the tail or both, in groups located symmetrically either side of the midline axis and extending substantially from the nose to the tail, in groups located symmetrically either side of the midline axis and extending a distance from the nose or the tail or both.

Preferably, pairs of the plurality of slotted apertures may be located symmetrically spaced from the midline axis and extend a distance measured from a line passing through the middle of the foam blank and along the foam blank top and/or bottom faces. The distance each of the pairs of slotted apertures extend from the middle of the foam blank may vary in increasing or decreasing lengths.

Preferably, the longitudinally extending slotted aperture located in each rail of the foam blank may extend for substantially the length of each rail and each one of the longitudinally extending slotted apertures has at least one flexible spine bonded and fixed therein.

Preferably, the longitudinally extending slotted apertures may have a length, a depth and a width, such that the flexible spine when located therein sits into the core space and flush with the respective top, bottom or rails surface. Preferably, the longitudinally extending slotted apertures may have different lengths, widths and depths to accommodate different sized flexible spines therein.

Preferably, the at least one longitudinally extending slotted aperture is a mounting recess set into the top and/or bottom face of the blank. The at least one flexible spine may be mounted into the mounting recess such that an upper surface of the flexible spine is flush with the respective face of the blank.

Preferably, the foam blank may further comprise at least one stringer. At least one of the stringers may be located along the midline axis of the foam blank and extending between the nose and tail of the foam blank. The at least one stringer may be selected from any one of a wooden stringer, a carbon fibre stringer, a fibreglass stringer or any combination thereof.

Preferably, the wooden stringer may be selected from the group consisting of a balsa wood, a basswood, a redwood, a cedar wood, a spruce wood, plywood, or a birch wood. The at least one stringer when located within the core of the foam blank may sit below the region defined by the depths of each longitudinally extending slotted aperture or within a region below the at least one flexible spine.

In accordance with a second aspect, the present invention provides a foam blank for a surfcraft, the foam blank comprising: a top blank face and an opposed bottom blank face; a pair of shaped rails extending between the opposed top and bottom blank faces at blank face edges; an enclosed core space defined between the opposed top and bottom blank faces and the rails; a midline axis extending between a nose region and a tail region and which divides the foam blank into two substantially equal regions, each of which extend between the midline axis and the rail on sides respectively thereof; a top section and a bottom section formed by cutting the foam blank through a plane passing substantially horizontally between the top and bottom blank faces and through the core space, the top and bottom sections having opposed adjacent cut surfaces; at least one flexible spine is fixed and located on one of the adjacent cut surfaces of the top or bottom sections of the foam blank and extending substantially along the midline axis; and wherein the at least one flexible spine, the top section and the bottom section of the foam blank are bonded to reform the unitary foam blank with the at least one flexible spine located between the top and bottom sections and within the enclosed core of the foam blank.

Preferably, the plane passing substantially horizontally through the foam blank may cut the foam blank substantially in half to form the top and bottom sections. Preferably, the at least one flexible spine may extend from the nose to the tail of the foam blank.

Alternatively, a plurality of flexible spines may be symmetrically located along and either side of the midline axis in the foam blank, the plurality of flexible spines extend for substantially the length of the foam blank. Alternatively, a plurality of flexible spines may be symmetrically located along and either side of the midline axis in the foam blank, the plurality of flexible spines extend from the nose to the tail of the foam blank.

Preferably, the foam blank may further comprise at least one longitudinally extending slotted aperture formed in one of the adjacent cut surfaces for receiving the at least one flexible spine therein. The at least one longitudinally extending slotted aperture may have a length, a depth and a width, such that the flexible spine when located therein sits into the core space and flush with the respective adjacent cut surface of the top and/or bottom section, such that when the flexible spine and the top and bottom sections are bonded together the flexible spine is enclosed by the adjacent cut surface of the top and/or bottom section of the foam blank.

Alternatively, the foam blank may further comprise at least one longitudinally extending slotted aperture formed in both of the adjacent cut surfaces for receiving the at least one flexible spine therein. The at least one longitudinally extending slotted apertures formed in both adjacent cut surfaces may have a length, a depth and a width, such that the flexible spine when located therein sits into the core space and above the respective adjacent cut surface, such that when the flexible spine and the top and bottom sections are bonded together the flexible spine is enclosed by both of the top and bottom sections and the longitudinally extending slotted apertures in both the top and bottom sections of the foam blank.

Preferably, the slotted apertures may have different lengths, widths and depths to accommodate different sized flexible spines therein.

Preferably, the slotted apertures when formed in one or both of the adjacent surfaces of the top and bottom sections of the foam blank may extend substantially along the midline axis of the top and bottom sections of the foam blank. Alternatively, the slotted apertures may extend substantially from the nose to the tail of the top and/or bottom sections of the foam blank.

Preferably, a plurality of the longitudinally extending slotted apertures may be symmetrically located along and either side of the midline axis in one or both of the adjacent surfaces of the top and bottom sections of the foam blank, the plurality of longitudinally extending slotted apertures extend for substantially the length of the top and/or bottom sections of the foam blank and each one of the plurality of longitudinally extending slotted apertures has at least one flexible spine fixed therein.

Preferably, the slotted apertures formed in the adjacent cut surfaces may be located in corresponding positions on each of the adjacent cut surfaces of the top and bottom sections of the foam blank. The slotted aperture formed in the adjacent cut surface of the top section of the blank may extend into the core space of the top section of the foam blank. The slotted aperture formed in the adjacent cut surface of the bottom section of the blank may extend into the core space of the bottom section of the foam blank.

Preferably, the surfcraft may be selected from the group consisting of: a surfboard, a bodyboard, a stand up paddleboard (SUP), a surf ski, a windsurfing board, a kiteboard, surf lifesaving craft such as a nipper board and a racing mal, a skim board and a wakeboard.

Preferably, the foam blank may be selected from the group consisting of: a polyurethane (PU) foam blank, a polyethylene foam blank, a polypropylene foam blank, a polystyrene foam blank, an expanded polystyrene (EPS) foam blank, and an extruded polystyrene foam blank.

Preferably, the flexible spine may be elastically formed from a composition of fibres and resins. The fibres may be selected from the group consisting of: a glass fibre such as fibreglass, a carbon fibre composite, a basalt fibre, and a synthetic fibre. The synthetic fibre may be a Kevlar fibre or an Innegra fibre. The resins may be selected from the group consisting of: a Vinyl Ester resin, an Epoxy resin, and a Polyester resin.

Preferably, the composition of fibres and resins in the flexible spine may have been designed to have a chemical structure that bonds with the foam blanks materials and resins to ensure a strong unified foam blank that will have a longer life span while providing a desired flex pattern and strength properties to provide an enhanced performance characteristics to suit an end user.

Preferably, the flexible spine may be formed in different lengths, cross-sectional shapes, widths and heights. The flexible spine may be formed using a continuous molding process whereby the fibres are saturated with a liquid polymer resin and then formed and pulled through a heated die to form the flexible spine. Preferably, the continuous molding process may be a unidirectional pultrusion process.

Preferably, the flexible spine may have a plurality of apertures therein which are adapted to allow a chemical bonding agent to pass therethrough to aid in securing the flexible spine to the foam blank or the slotted apertures in the foam blank. Preferably, the apertures may be any one or more of, elongated passages located adjacent a peripheral edge of the flexible spine, elongated passages running parallel with sides of the flexible spine, elongated passages running perpendicular to sides of the flexible spine, elongated passages in groups running perpendicular to sides of the flexible spine, or circular apertures extending along the length or in groups positioned along the length of the flexible spine.

Preferably, the chemical bonding agent may be an adhesive and/or resin.

Preferably, the flexible spine may further comprise a conductive material encapsulated within and extending the length of the composition of fibres and resins forming the flexible spine, the conductive material allows the flow of an electrical current in one or more directions. The conductive material may be selected from the group consisting of: a metal, an electrolyte, a superconductor, a semiconductor, a plasma, and a non-metallic conductor such as a graphite or a polymer. Alternatively, the conductive material may be an insulated copper cable running substantially along the length and within the flexible spine.

Preferably, the rails may have a parabolic shape.

Preferably, the flexible spine and/or the top and bottom sections may be bonded to the foam blank by applying an adhesive and/or resin.

In accordance with a third aspect, the present invention provides a foam blank for a surfcraft, the foam blank comprising: a top blank face and an opposed bottom blank face; a pair of shaped rails extending between the opposed top and bottom blank faces at blank face edges; an enclosed core space defined between the opposed top and bottom blank faces and the rails; a midline axis extending between a nose region and a tail region and which divides the foam blank into two substantially equal regions, each of which extend between the midline axis and the rail on sides respectively thereof; at least one flexible spine located within or formed in or on any one or more of: (i) the top face; (ii) the bottom face; (iii) the rails; or (iv) the enclosed core; wherein the at least one flexible spine is bonded to be fixed within at least one longitudinally extending slotted aperture when formed in or on the top face, the bottom face or the rails, and when the at least one flexible spine is located within the enclosed core, the at least one flexible spine is bonded between a top section and a bottom section formed by cutting the foam blank through a plane passing substantially horizontal between the top and bottom blank faces and through the core space.

Preferably, the foam blank may further comprise any one of the features of the foam blank of the previous aspects.

In accordance with a still further aspect, the present invention provides a method of manufacturing a foam blank for a surfcraft, said method comprising the steps of: (a) providing a foam blank having opposed top and bottom blank faces, a pair of shaped rails extending between the opposed top and bottom blank faces at blank face edges, a midline axis extending between a nose region and a tail region and which divides the blank into two substantially equal regions, each of which extend between the midline axis and the rail on sides respectively thereof, and an enclosed core space defined by the top, bottom and rails; (b) routing at least one longitudinally extending slotted aperture in any one or more of the top, the bottom or the rails, such that the slotted aperture extends into the enclosed core space; and (c) bonding and fixing at least one flexible spine within the routed slotted aperture.

Preferably, the method may further comprise any one of the features of the foam blank of the first aspect.

Preferably, the method may further comprise the steps of: (d) shaping the blank to a desired shape; (e) applying any decals and/or a colour graphic to the shaped foam blank; (f) laminating the foam blank with fibreglass and resin to form a hard outer shell; (g) applying a filler coat of resin to fill any surface imperfections left after the laminating step (e); and (h) sanding and cleaning the foam blank to form the surfcraft.

Preferably, the method may further comprise the steps of: (i) prior to step (h) fitting and attaching at least one fin and a leash rope; and (j) after step (h) applying a final coat of a gloss resin and applying a light polishing to complete the surfcraft.

Preferably, once the foam blank is shaped in step (d) the elastic nature of the flexible spine may allow the foam blank to be bent to fit a shape of a desired surfcraft rocker.

In accordance with a fourth aspect, the present invention provides a method of manufacturing a foam blank for a surfcraft, said method comprising the steps of: (a) providing a foam blank having opposed top and bottom blank faces, a pair of shaped rails extending between the opposed top and bottom blank faces at blank face edges, a midline axis extending between a nose region and a tail region and which divides the blank into two substantially equal regions, each of which extend between the midline axis and the rail on sides respectively thereof, and an enclosed core space defined by the top, bottom and rails; (b) cutting the foam blank through a plane passing substantially horizontal between the top and bottom blank faces in the core space to form a top section and a bottom section with opposing adjacent cut surfaces; (c) fixing at least one flexible spine on one of the adjacent cut surfaces of the top or bottom sections of the foam blank, the flexible spine extending substantially along the midline axis; and (d) bonding the at least one flexible spine, the top section and the bottom section of the foam blank to reform a unitary foam blank with the at least one flexible spine located between the top and bottom sections and within the enclosed core of the foam blank.

Preferably, the method may further comprise any one or more of the features of the foam blank of the second aspect.

Preferably, the surfcraft may be selected from the group consisting of: a surfboard, a bodyboard, a stand up paddleboard (SUP), a surf ski, a windsurfing board, a kiteboard, surf lifesaving craft such as a nipper board and a racing mal, a skim board and a wakeboard.

Preferably, the foam blank may be selected from the group consisting of: a polyurethane (PU) foam blank, a polyethylene foam blank, a polypropylene foam blank, a polystyrene foam blank, an expanded polystyrene (EPS) foam blank, and an extruded polystyrene foam blank.

Preferably, for the surfboard, the stand-up paddleboard (SUP), the surf ski, the windsurfing board, the kiteboard, the surf lifesaving craft such as the nipper board and the racing mal, the skim board and the wakeboard, may further comprise the steps of: (i) shaping the blank to a desired shape; (ii) applying any decals and/or a colour graphic to the surfcraft; (iii) laminating the surfcraft with fibreglass and resin to form a hard outer shell; (iv) applying a filler coat of resin to fill any surface imperfections left after the laminating step (iii); (v) fitting and attaching at least one fin and a leash rope; (vi) sanding and cleaning the surfcraft; and (vii) applying a final coat of a gloss resin and applying a light polishing to complete the surfcraft.

Preferably, for the bodyboard, the method may further comprise the steps of: (i) shaping the blank to a desired shape; (ii) planing and sanding the bodyboard; (iii) laminating a top, a bottom and rails of the bodyboard with a skin or slick material on the bottom, an open or closed cell foam material on the top or deck and rails; (iv) fitting and attaching a leash rope; and (v) applying any decals and/or a colour graphic to the bodyboard.

Preferably, once the board is shaped in step (i) the elastic nature of the flexible spine may allow the surfcraft to be bent to fit a shape of a desired surfcraft rocker.

Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

FIG. 14 illustrates a prior art bodyboard being ridden by a user;

FIG. 15 shows a plan view of a bodyboard foam blank in accordance with an embodiment of the present invention;

FIG. 44 shows the front plan view of the foam blank of FIG. 43;

FIG. 45 shows a front plan view of a flexible spine in accordance with an embodiment of the present invention;

FIG. 46 shows a side view of the foam blank cut along a plane passing horizontally through the foam blank to form the top and bottom sections with a flexible spine positioned between the top and bottom sections;

FIG. 47 shows the foam blank of FIG. 46 reformed with the flexible spine located within the core of the foam blank;

FIG. 48 illustrates a perspective view of the foam blank of FIG. 46;

FIG. 51 shows a sectional perspective top view taken along the line I-I of FIG. 44;

FIG. 52 shows the sectional side view of the sectional perspective view of FIG. 51;

DETAILED DESCRIPTION OF THE INVENTION

The following description, given by way of example only, is described in order to provide a more precise understanding of the subject matter of a preferred embodiment or embodiments.

While the invention will be described with regards to foam blanks for surfboards and bodyboards, it should be appreciated by the person skilled in the art that foam blanks for other surfcraft are not excluded by the present invention. For example the following invention can also be applied to foam blanks for such surfcraft as stand up paddleboards (SUP's), surf skis, and wakesurf boards, kiteboards, skim boards, and surf lifesaving boards such as nipper boards and racing mals.

Figure 1:
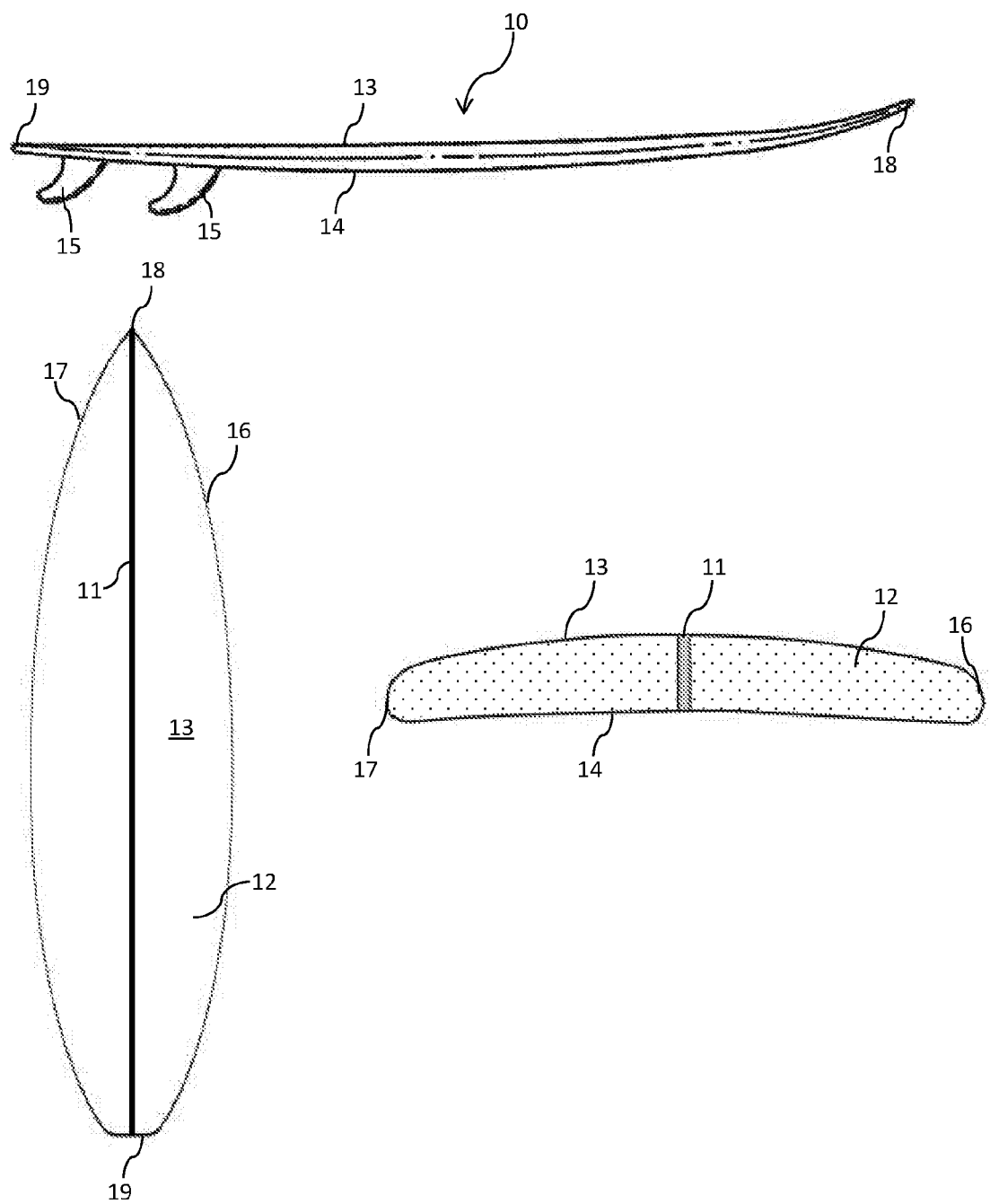
FIG. 1 illustrates a prior art surfcraft showing the component parts of the key elements of the surfcraft.

As illustrated in FIG. 1 (prior art) a surfboard 10 consists of a number of key elements. The stringer 11 is the wooden "backbone" of a surfboard 10, a durable strip of wood which extends down the length of the foam blank 12 that provides a support beam to make the board stronger and sturdier. Some boards don't have a stringer 11, while others have more than one. The interplay of dimensions of a surfboard 10 is the determining factor for a surfboard's performance and speed. The length, width and thickness specifications affect the board 10 in different ways. The length of a board determines how easy it is to paddle and how it manoeuvres. The width and thickness of a board determines its buoyancy and floatation. A wider, thicker board is easier to propel across the water and has more stability than a thinner board.

The curvature of a surfboard is known as its rocker. If you look at a board 10 from the side and you'll notice the upturned nose 18 and the concave shape of the deck 13. The more pronounced the rocker, the easier the board 10 is to turn and manoeuvre in the water. However, a flatter rocker is better for streamlined speed. Fins 15 have a big impact on the way a board 10 rides. The more surface area the fins 15 have, the easier it will be to stabilise and control movements. However, big fins 15 will also drag a board down, so surfers should strike a balance depending on the type of riding they intend to do.

The rails 16, 17 are the sides of a surfboard 10 and have an enormous impact on the way it rides. Turning ease is a factor of the rails' angles, which are often tuned to different measurements as they run from tip or nose 18 to tail 19 of the surfboard 10. A sharper angle means a quicker, tighter turn. A rail 16, 17 with a duller angle will make wider turns, without as much ease. Most surfboards 10 are designed with a sharper angle in the back portion with a more obtuse tuning as the rails edge toward the nose 18. This allows for sharp turning (turns originate in the rear) with a more forgiving transition.

There is always some type of concave contour on the bottom or base 14 of a surfboard 10. While the degree of the contour varies, the idea remains the same: water is forced into a channel underneath the board 10, resulting in a faster ride with improved acceleration.

The present invention provides a foam blank 20 for a surfcraft such as a surfboard, bodyboard or the like. The foam blank 20 is designed to receive at least one flexible spine 50 within a longitudinally extending slotted aperture 60 located on the top 21, bottom 22 or rails 23, 24 of the foam blank 20. Alternatively, the flexible spine 50 can be located within the core 135 of the foam blank 130 between the top section 138 and bottom section 139 of the foam blank 130. Further alternatively, flexible spines 50 can be located both within the core 135 and on any one or more of the top 21, bottom 22 or rails 23, 24 within slotted apertures 60 of the foam cores 20, 130. The positioning and ability of the flexible spine 50 to elastically deform allow a surfcraft designer to improve the tensile and compressive strength of the foam blank 20, 130 in a new and innovative manner The foam blank 20 has a top blank face 21, an opposed bottom blank face 22, and a pair of shaped rails 23, 24 extending between the opposed top and bottom blank faces 21, 22 at blank face edges. An enclosed core space 25 is defined between the opposed top and bottom blank faces 21, 22 and the rails 23, 24. A midline axis 28 extends between the nose region 27 and tail region 28 and which divides the foam blank 20 into two substantially equal regions, each of which extend between the midline axis 28 and the rail 23, 24 on sides respectively thereof. The foam blank 20 has at least one longitudinally extending slotted aperture 60 formed in any one or more of the top 21, the bottom 22 or the rails 23, 24, such that the slotted aperture 60 extends into the enclosed core space 25. The slotted aperture 60 is adapted to receive the at least one flexible spine 50, such that the at least one flexible spine 50 is bonded to be fixed within the at least one longitudinally extending slotted aperture 60.

The flexible spine 50 is bonded into a recess created in the foam blank 20 using an adhesive or a resin or the like. By way of example only, the adhesive or resins may include epoxy resin, polyester resin and vinyl ester resin. The flexible spine 50 is recessed within and under the foam blanks lamination. The flexible spine 50 is elastically deformable in that the flexible spine 50 will change in the shape or size due to an applied force such as the result of tensile (pulling) forces, compressive (pushing) forces, shear, bending or torsion (twisting). The flexible spine 50 is elastically deformable which means the deformation is reversible. Once the forces are no longer applied, the flexible spine 50 will return to its original shape.

The elasticity of the flexible spine 50 is due to the composition of fibres and resins which form the flexible spines 50 of different lengths, widths and thickness or heights. The fibres are selected from the group consisting of: a glass fibre such as fibreglass, a carbon fibre composite, a basalt fibre, and a synthetic fibre such as Innegra and an aromatic polyamide such as Aramid, and environmentally friendly fibres such as cellulose, hemp, bamboo, flax and tencel. For example, fibreglass is a type of fibre-reinforced plastic where the reinforcement fibre is specifically glass fibre. The glass fibre may be randomly arranged, flattened into a sheet (called a chopped strand mat), or woven into a fabric. The plastic matrix may be a thermosetting plastic—most often epoxy, polyester resin—or vinyl ester, or a thermoplastic. The glass fibres are made of various types of glass depending upon the fiberglass use. These glasses all contain silica or silicate, with varying amounts of oxides of calcium, magnesium, and sometimes boron.

The synthetic fibres are made from synthesized polymers or small molecules. The compounds that are used to make fibres are derived from raw materials such as petroleum based chemicals or petrochemicals. These materials are polymerized into a long, linear chemical that bond two adjacent carbon atoms. Differing chemical compounds will be used to produce different types of fibres. By way of example only and by no way limiting, the types of synthetic fibre used in the flexible spine 50 are the Aramid fibre or the Innegra fibre and polypropylenes. Other natural plant based fibres could also be utilised for the flexible spine 50. For example, natural plant based fibres that are or have the potential to be used as a reinforcement fabric for surfboard constructions including but not limited only to cellulose, hemp, bamboo, flax and tencel.

The resins used in the flexible spine 50 are typically a solid or highly viscous substance, which are typically convertible into polymers. Such viscous substances can be plant-derived or synthetic in origin. They are often mixtures of organic compounds. By way of example only and by no way limiting on the type of resin used in the flexible spine 50, the resins could be selected from the group consisting of: a Vinyl Ester resin, an Epoxy resin, and a Polyester resin.

The composition of fibres and resins in the flexible spine 50 have been designed to have a chemical structure that bonds with the foam blanks materials and resins to ensure a strong unified foam blank 20 that will have a longer life span while providing a desired flex pattern and strength properties to provide an enhanced performance characteristics to suit an end user or surfer. The flexible spine 50 is bonded to the foam blank 20 through the use of adhesives and/or resins. Namely but only not limited to, an epoxy resin, a polyester resin and a vinyl ester resin.

By way of example only and by no way limiting the flexible spine 50 can be manufactured using a continuous molding process whereby the fibres are saturated with a liquid polymer resin and then formed and pulled through a heated die to form the flexible spine 50. The continuous molding process is a standard unidirectional pultrusion process were the fibres are impregnated with resin, possibly followed by a separate preforming system, and pulled through a heated stationary die where the resin undergoes polymerisation. The impregnation is either done by pulling the fibres through a bath or by injecting the resin into an injection chamber which typically is connected to the die. Many resin types may be used in pultrusion including polyester, polyurethane, vinylester and epoxy. Resin provides the resistance to the environment, (i.e., the corrosion resistance, the UV resistance, the impact resistance, etc.) and the glass provides strength for the flexible spine 50.

The present invention came about due to a long felt need in the marketplace to increase the physical strength and durability of surfboards by improving the tensile and compressive strength of the foam blank 20 in a new and innovative manner. It was also found that by using the flexible spine 50 improved surfboard performance through optimising flex. By controlling the flex pattern of foam blanks 20 (the core of the surfboard) will ultimately affect the way a surfboard or bodyboard flexes and surfs. The most important variants such as a surfboards or bodyboards ability to accelerate, drive, maintain speed and flow through the water can then be controlled. In surfing it is common that surfboards lose their spring or pop over time. In other words, the surfboards responsiveness lessens over time. The present invention has been found to provide surfboards with better responsiveness from the beginning, but will also maintain this level of responsiveness for longer period of time which is a significant benefit for the user.

An embodiment of the present invention as illustrated in FIGS. 2 to 5 and in its most general terms provides an improved foam blank 20 for a surfcraft and method of manufacturing the same which is suitable for riding waves. The foam blank 20 has opposed top 21 and bottom 22 blank faces. Pair of shaped rails 23, 24 extend between the opposed top 21 and bottom 22 blank faces at blank face edges. A midline axis 28 extends between a nose region 27 and a tail region 28 and divides the foam blank 20 into two substantially equal regions, each of which extend between the midline axis 28 and the rail 23, 24 on sides respectively thereof. The top 21, bottom 22 and rails 23, 24 form an enclosed core space 25. At least one longitudinally extending slotted aperture 60 is formed in any one or more of the top 21, the bottom 22 or the rails 23, 24, such that the slotted aperture 60 extends into the enclosed core space 25. At least one flexible spine 50 is bonded to be fixed within the at least one longitudinally extending slotted aperture 60.

In order to better understand the advantages of the present invention we must understand the importance of flex in a foam blank 20 for a surfcraft. There are two main flex classifications that define a surfcrafts performance: longitudinal (vertical) and torsional (horizontal). These flex characteristics determine the responsiveness of the surfcraft and for improved performance should be tailored to a surfer's ability, surf conditions, style and bodyweight amongst others.

There is a high correlation between longitudinal flex and rider weight that must be considered when designing a surfcraft. Longitudinal flex can be progressive or continuous. Progressive flex means that the flex in the centre of the foam blank 20, the nose 27 and the tail 26 could all have different levels of flex governed by the positioning of the flexible spine 50. For a light surfer, a stiff board is difficult to control and won't be very responsive. A stiffer board tends to deliver more continuous drive and speed. Boards with softer flex lengthwise are better for freestyle surfing, such as landing aerial manoeuvres.

Torsional flex measures the stiffness of a surfcraft from its rail 23 to rail 24. Softer-flex boards are easier to turn and are much more responsive to rider input. Torsional flex deserves more attention as a softer torsional flex will help with sharper turns and a stiffer torsional flex will increase rail 23, 24 engagement and is preferred for powerful surfing.

For optimising performance, a balance of longitudinal and torsional flex needs to be considered and customised to the wants and needs of surfcraft shapers and surfers. Traditionally this area in surfcraft construction has received limited new research and development. The inventors strongly believe that controlled flex patterns are an integral part to the progression of surfcraft and surfing (rider experience). Therefore governing how and when a board or foam blank 20 flexes which therefore helps determine the feel of the board as important factors such as speed and manoeuvrability can be controlled. It is important to also reinforce that the flexible spine 50 improves the dynamic feel of the surfcraft. It will flex to absorb force, distributing and storing energy and then respond back to its natural position. This response (or rate of return) provides a whip effect, creating acceleration and generating drive. The flexible spine 50 is designed to flex in unity with the surfer and the wave, for example holding speed whilst going straight (minimal flex) and flexing when manoeuvring.

Figure 2:
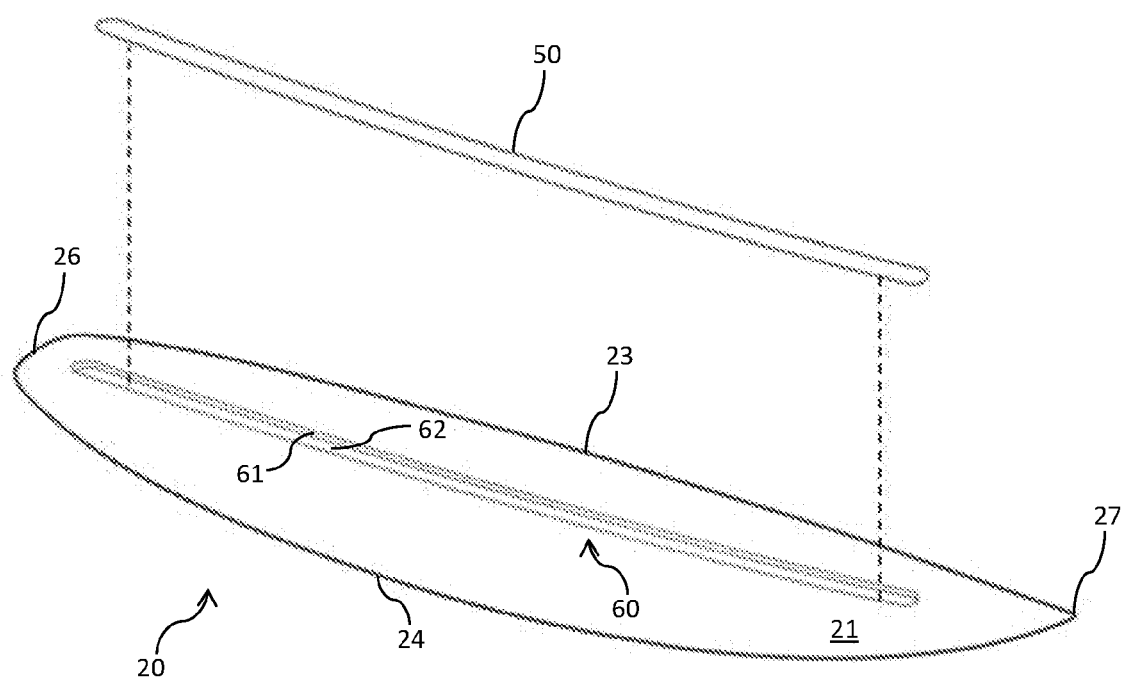
FIG. 2 shows an exploded perspective view of a foam blank in accordance with an embodiment of the present invention showing the flexible spine.

As shown in FIG. 2 a foam blank 20 has an elongated platform which is relatively light, but is strong enough to support an individual standing on them while riding an ocean breaking wave. Surfcraft, such as surfboards, bodyboards, surf skis, paddleboards, wakeboards, and windsurfing boards are traditionally made through a standard production technique in which polyurethane foam blank 20 is cut to a desired shape and then encased in a fibre-reinforced plastic skin, such as fiberglass. The foam blank 20 has a single longitudinally extending recess or slotted aperture 60. The recess or slotted aperture 60 is formed with two side walls 61 and a substantially flat bottom or floor 62. The recess or slotted aperture 60 extends for substantially the length of the deck 21 and is aligned with the midline axis 28 of the foam blank 20. The slotted recess or aperture 60 is spaced a distance away from both the nose 27 and tail 26 of the foam blank 20. Likewise the longitudinally extending slotted aperture 60 is spaced an equal distance from both rails 23, 24. The ends of the slotted recess or aperture 60 can be squared, rounded or any other shape and likewise the ends of the flexible spine 50 which fits into the slotted aperture or recess 60 will have a complementary shape to that of the slotted recess or aperture 60.

The longitudinally extending slotted aperture 60 is formed in the top or deck 21 of the foam blank 20. Typically a mechanical router, electric hand router, hand plane or CNC machine is used to hollow out an area in the face of the top or deck 21 of the foam blank 20 to accurately create the recessed area for installation of the flexible spine 50. In FIG. 2 the flexible spine 50 is located along the midline axis 28 of the foam blank 20. As will be described below the placement of the flexible spine 50 is not limited to only the deck 21. The flexible spine 50 can be placed in any one or more of the top or deck 21, bottom 22, the rails 23, 24 or within the core 25. Likewise, multiple flexible spines 50 may be placed in one or more of the surfaces 21, 22, 23, 24 or the core 25 of the foam blank 20. The nature and design of the present invention allows the user or surfer to customise the flex pattern of their board through the placement of the flexible spine 50 within the foam blank 20. The placement of the flexible spine 50 can also increase the overall strength while providing the controlled desired flex pattern.

The flexible spine 50 placement is also particularly significant for stringerless blanks. For example polystyrene blanks 20 such as EPS (expanded polystyrene) and extruded polystyrene foam blanks (XPS). As discussed above the stringer 11 is the wooden "backbone" of a surfboard 10, a durable strip of wood which extends down the length of the foam blank 20 that provides a support beam to make the board stronger and sturdier. Without the stringer 11 other methods of preventing the foam blank 20 from breaking or snapping is required. While EPS and extruded polystyrene boards are stronger and lighter they typically have poor flex patterns and they are more susceptible to dents caused by compression. In addition, EPS and XPS blanks typically have excessive (or unfavourable) flex patterns and therefore to optimise performance need to be reinforced to govern and create a beneficial flex pattern. The addition and placement of the flexible spine 50 to both the EPS and extruded polystyrene boards allows the user or surfer to customise the flex pattern of their board.

Figure 3:
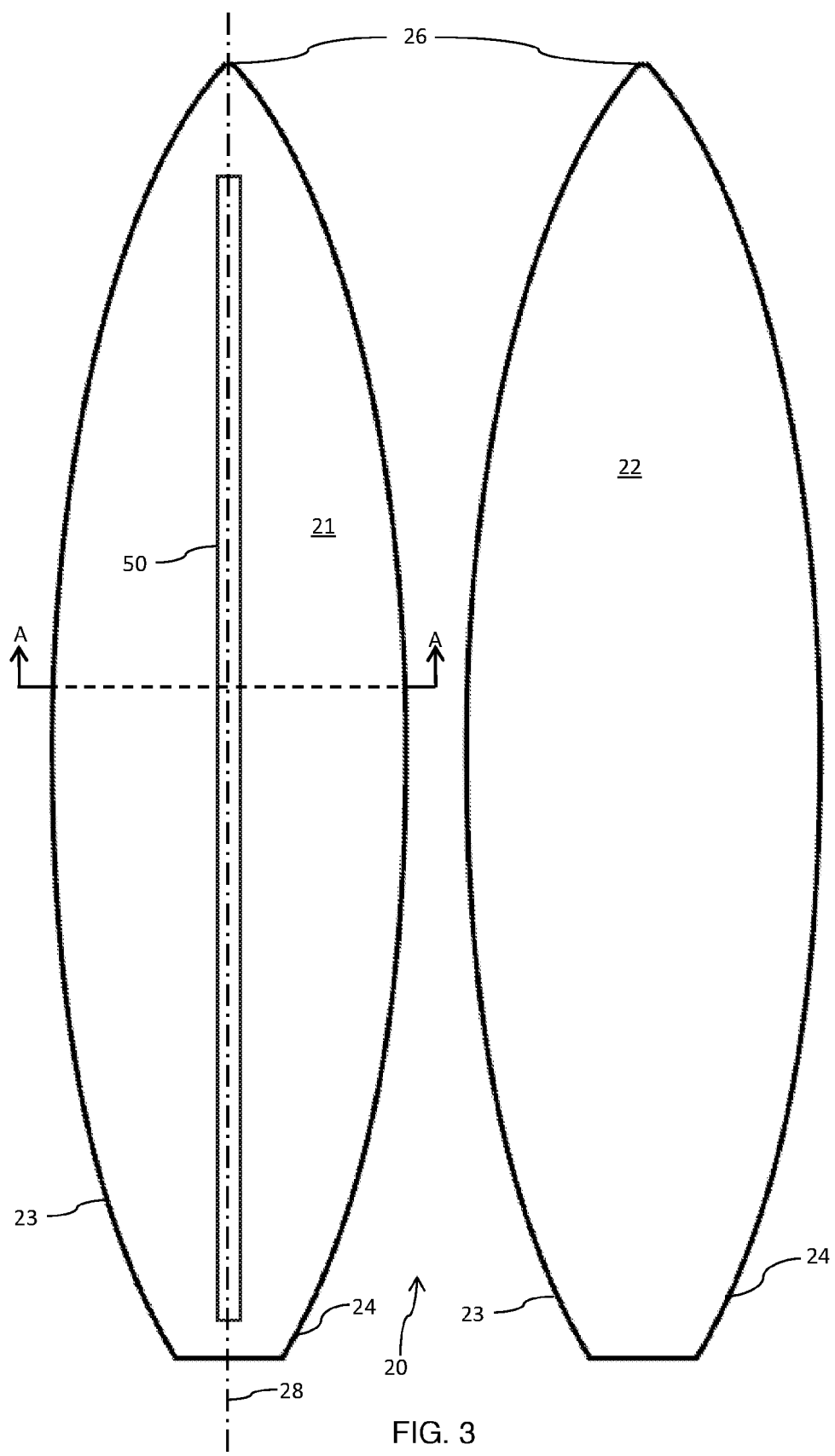
FIG. 3 shows the front and rear plan views of the foam blank of FIG. 2.

FIG. 3 shows a plan view of the top or deck 21 and the bottom 22 of the foam blank 20 for a surfcraft. The midline axis 28 passes through the centre of the foam blank 20.

Figure 4:
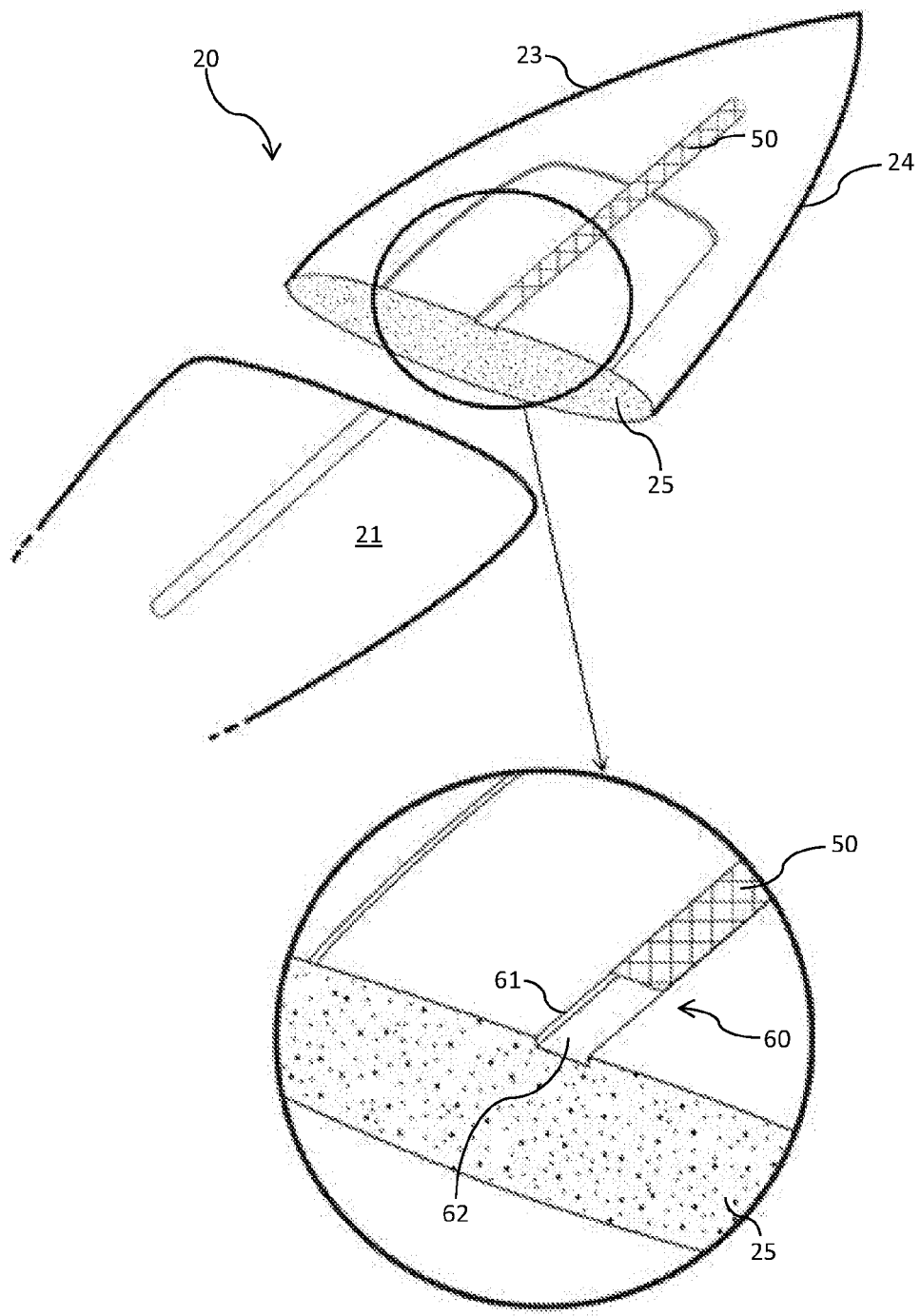
FIG. 4 shows a perspective sectional view taken along the line A-A of the foam blank of FIG. 3 and further showing a detailed view of the section with the flexible spine installed.

FIG. 4 shows a sectional drawing showing an exploded detailed view of the flexible spine 50 located and fixed within the longitudinally extending recess 60 within the top or deck 21 of the foam blank 20 in accordance with the present embodiment of the invention. The longitudinally extending recess or aperture 60 is shown in the sectional view as a C-shaped recess with two side walls 61 extending upwardly from either end of the substantially flat bottom 62. Both the recess 60 and the flexible spine 50 are of a complementary shape so that the flexible spine 50 fits precisely within the recess 60. The depth of the recess 60 is such that the flexible spine 50 when seated within the recess 60 will sit flush with the respective surface, in this case the deck or top 21. While a C-shaped recess 60 is shown in FIG. 4 other shaped recesses can be utilised, with the shape varying dependent upon the shape of the flexible spine 50 received therein.

Given the varying requirements for different weight, style and ability of the user or surfer the flexible spine 50 comes in a number of varied shapes, lengths, widths and thicknesses. This allows for the customising of the foam blank 20 to suit the surfcraft user or surfers requirements.

Figure 5:
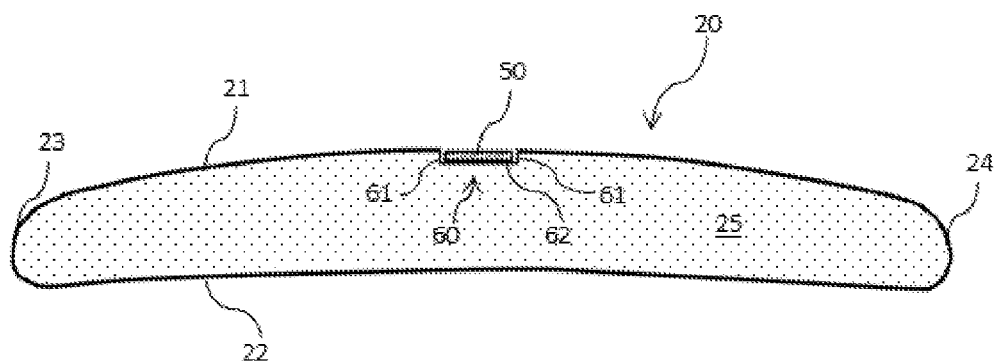
FIG. 5 shows a cross-sectional view taken along the line A-A of FIG. 3.

FIG. 5 further shows a cross-sectional view of this exemplary embodiment of the present invention. This figure further illustrates the longitudinally extending slotted aperture 60 extending into the core 25 of the foam blank 20. As discussed above while the aperture 60 is shown as a C-shaped recess other shapes are not excluded by the present invention. For example, the aperture 60 could have rounded walls 61, 62 to accommodate a substantially cylindrically shaped flexible spine 50. Alternatively the recess 60 may be formed or shaped as any quadrilateral or triangular shape for receiving a complementary shaped flexible spine 50. Typically the ends of the flexible spine 50 are curved or semicircular, however the ends could simply be squared off or any other shape to fit within the complementary shaped ends of the aperture 60.

Figure 6:
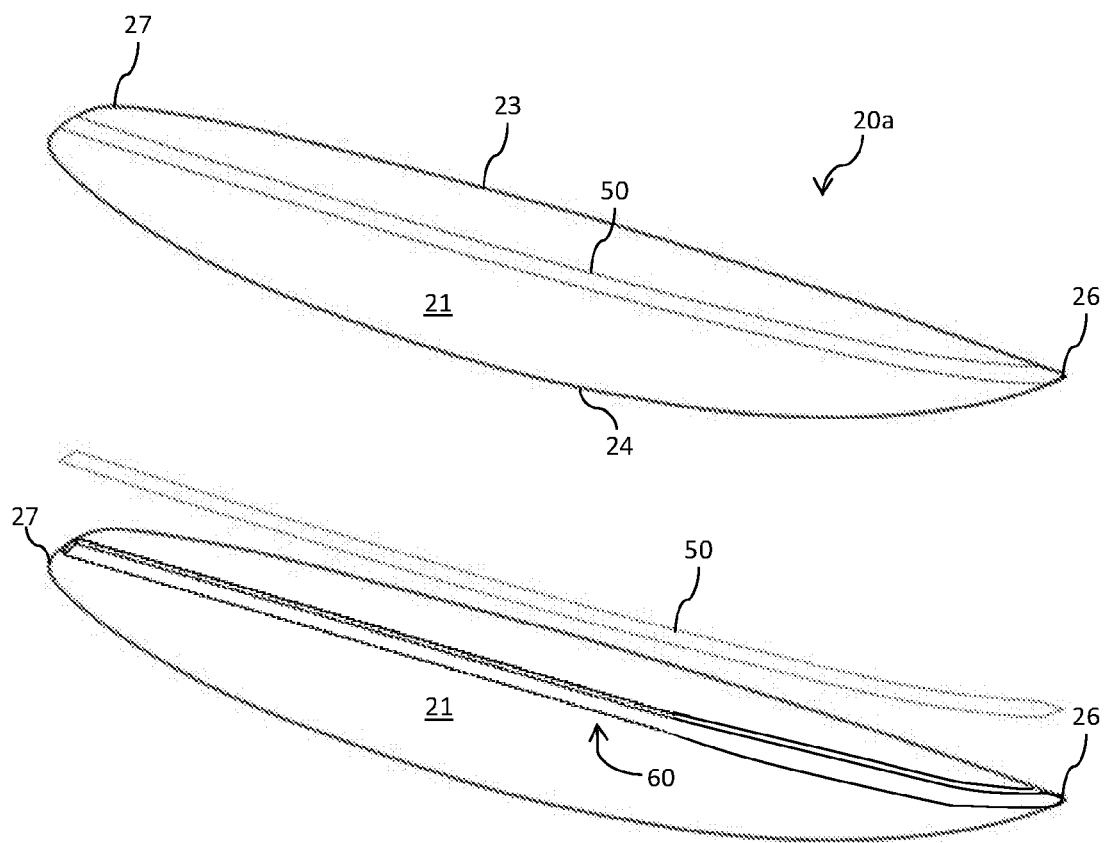
FIG. 6 illustrates a perspective view of a foam blank in accordance with a further embodiment of the present invention with the flexible spine extending from the nose to the tail of the foam blank.
Figure 10:
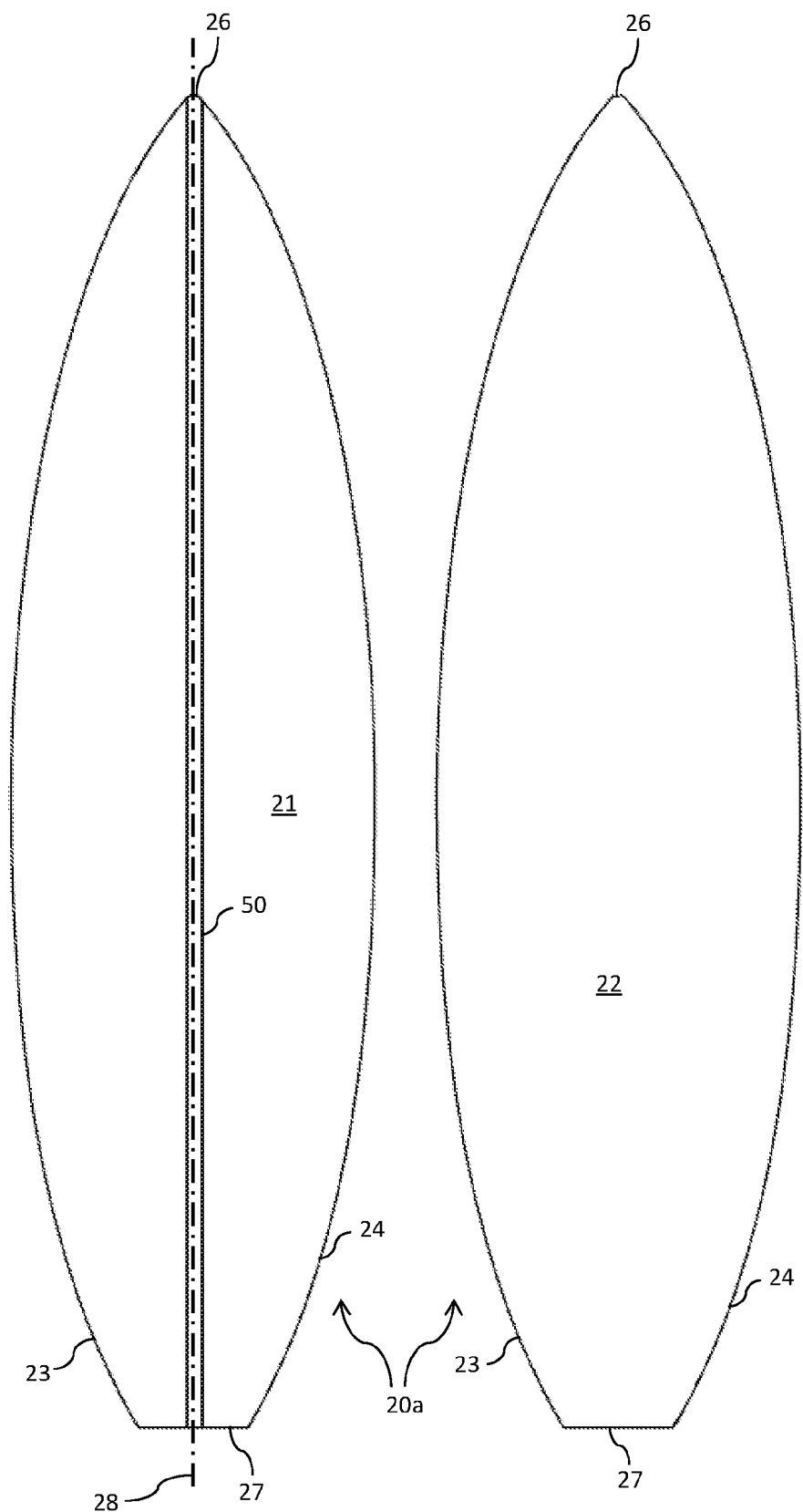
FIG. 10 shows the front and rear plan views of the foam blank of FIG. 6.

FIGS. 6 and 10 illustrate a further embodiment of a foam blank 20a for a surfcraft in accordance with the present invention. The foam blank 20a differs in that the longitudinally extending slotted aperture 60 and the flexible spine 50 extend the complete length of the deck 21 of the foam blank 20a. That is, the flexible spine 50 extends from the nose 26 to the tail 27 of the foam blank 20a.

Figure 7:
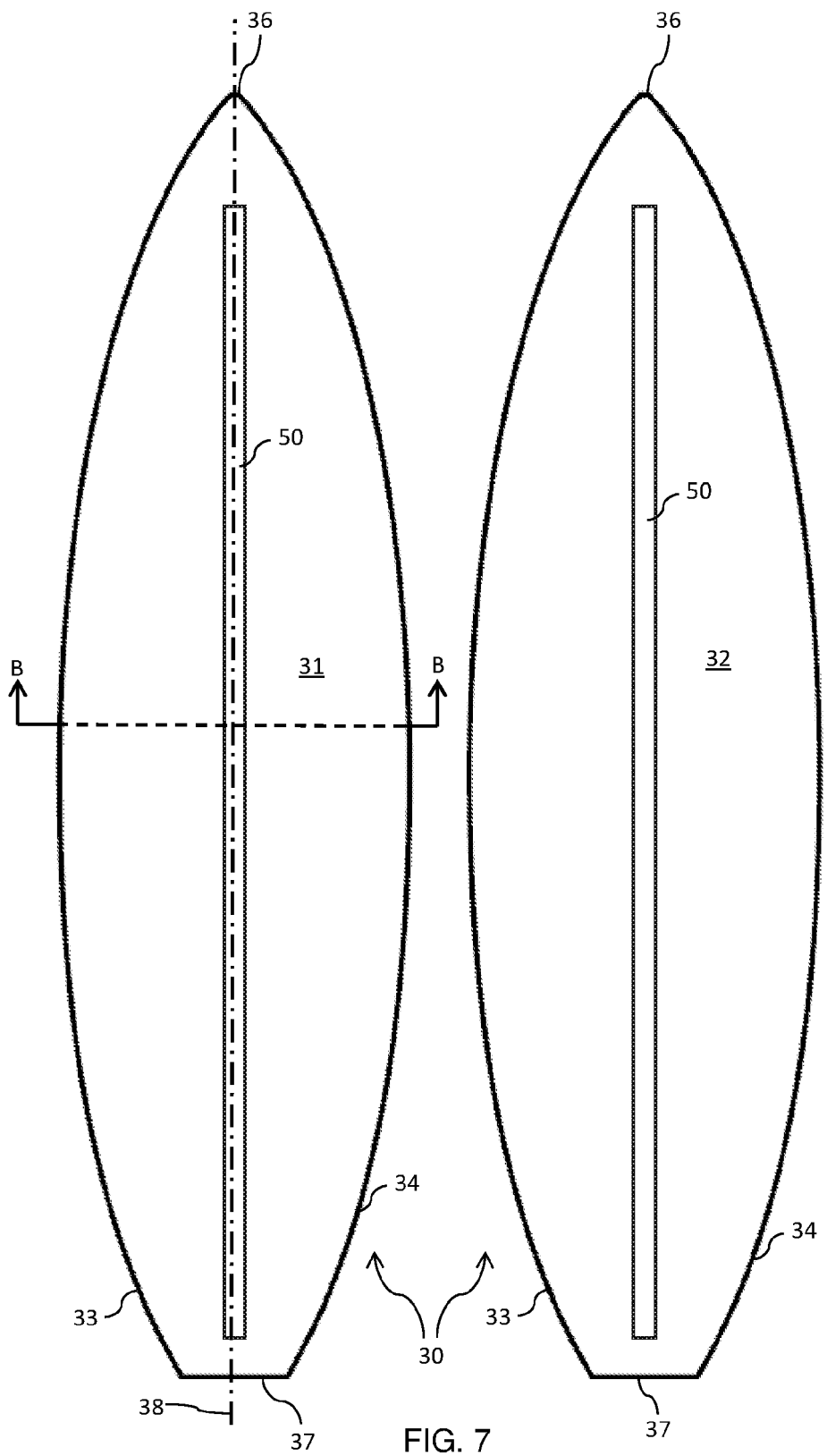
FIG. 7 shows the front and rear plan views of a foam blank in accordance with an embodiment of the present invention with flexible spines located on both the top and bottom surfaces of the foam blank.
Figure 8:
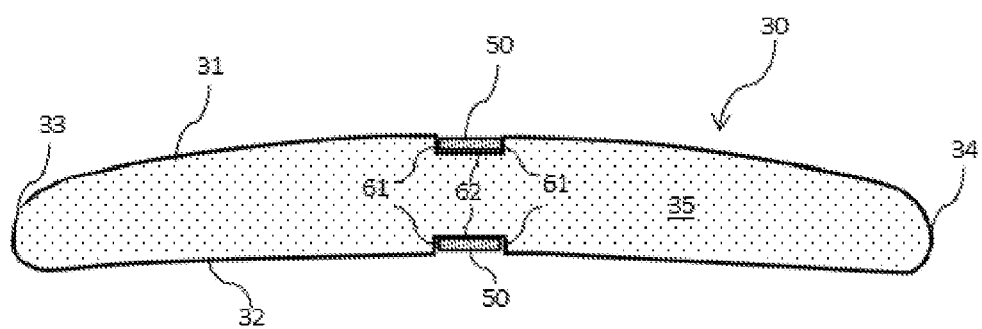
FIG. 8 shows a cross-sectional view taken along the line B-B of FIG. 7.

FIGS. 7 and 8 illustrate a further embodiment of the present invention. The foam blank 30 for a surfcraft in this embodiment has a longitudinally extending slotted aperture 60 formed in both the top or deck 31 and the bottom 32. Both apertures 60 are designed to house a flexible spine 50 therein. Like all other embodiments the foam blank 30 has a top or deck 31, bottom 32, rails 33, 34, a nose 36 and a tail 37. In this embodiment both flexible spines 50 are installed on the midline axis 38 and extend a distance into the core 35 of the foam blank 30. That distance is typically determined by the height or thickness of the flexible spine 50 and should be sufficient to allow the flush mounting of the flexible spine 50 with the surfaces 31, 32. FIG. 8 shows a cross-sectional view taken along the line B-B of FIG. 7.

With the stringerless design the flexible spines 50 are mounted in the deck 31 and bottom 32 on either side of the foam blank 30. In order to achieve a beam effect at least one hole can be drilled though the core 35 on the midline axis 38 and below the two flexible spines 50. The holes can then be filled with resin to form a link between the flexible spines 50 and the core 35 to give the stringerless foam blank 30 a beam effect. This can also be achieved when more than one flexible spine 50 is installed in a different position and not necessarily on the midline axis 38 in the top or deck 31 and bottom 32 of the foam blank 30. This in effect anchors the deck flexible spine 50 through to the bottom flexible spine 50, creating a solid dual strength from the deck 31 through to the bottom 32 of the foam blank 30 for a surfcraft.

Figure 9:
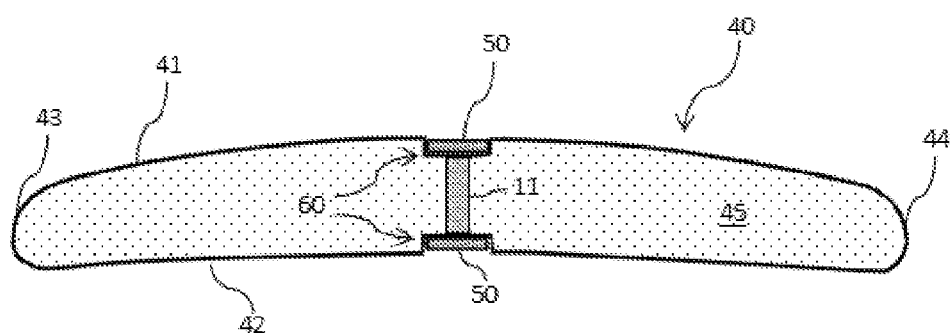
FIG. 9 shows a cross-sectional view taken along the line B-B of FIG. 7 when the foam blank has a centre stringer installed.

While primarily the present invention has been designed to suit the stringerless design of the EPS and extruded polystyrene foam blanks, it is also useful in foam blanks which have a stringer 11. For example, FIG. 9 shows a cross-sectional view of a foam blank 40 with a stringer 11 and two flexible spines 50 installed along the midline axis of the foam blank 40 and on either side of the stringer 11. Like FIGS. 7 and 8 the flexible spines 50 are recessed into the aperture 60 located on both the deck 41 and the bottom 42 of the foam blank 40. By way of example only this foam blank 40 is formed from polyurethane foam with a core 45. To maintain the structural integrity of the foam blank 40 a stringer 11 is embedded in the middle of the foam blank 40 extending substantially from the tail to the nose. As described previously the foam blank 40 is spilt and the stringer 11 is glued between the two halves of the foam blank 40 and the blank is then re-joined to form the unitary foam blank 40.

Typically the stringer 11 is designed to sit flush with the top 41 and bottom 42 surfaces of the board 40 and passes through the board from top to bottom. The foam blank 40 is then routed to form the longitudinally extending slotted apertures 60. This also means a portion of the top and bottom of the stringer 11 is also routed to allow the forming of the recess 60. With the flexible spines 50 bonded to both the core 45 and the stringer 11 an I-beam effect is achieved. Like all other embodiments the foam blank 40 has a top or deck 41, bottom 42, rails 43, 44, a nose and tail (not shown). In this embodiment both flexible spines 50 are installed on the midline axis on either side of the stringer 11 and extend a distance into the core 45 of the foam blank 40. To achieve a specified flex pattern within the foam blank 40, flexible spines 50 can also be located in any one or more of the top 41, bottom 42, rails 43, 44 of the foam blank 40.

Figure 11:
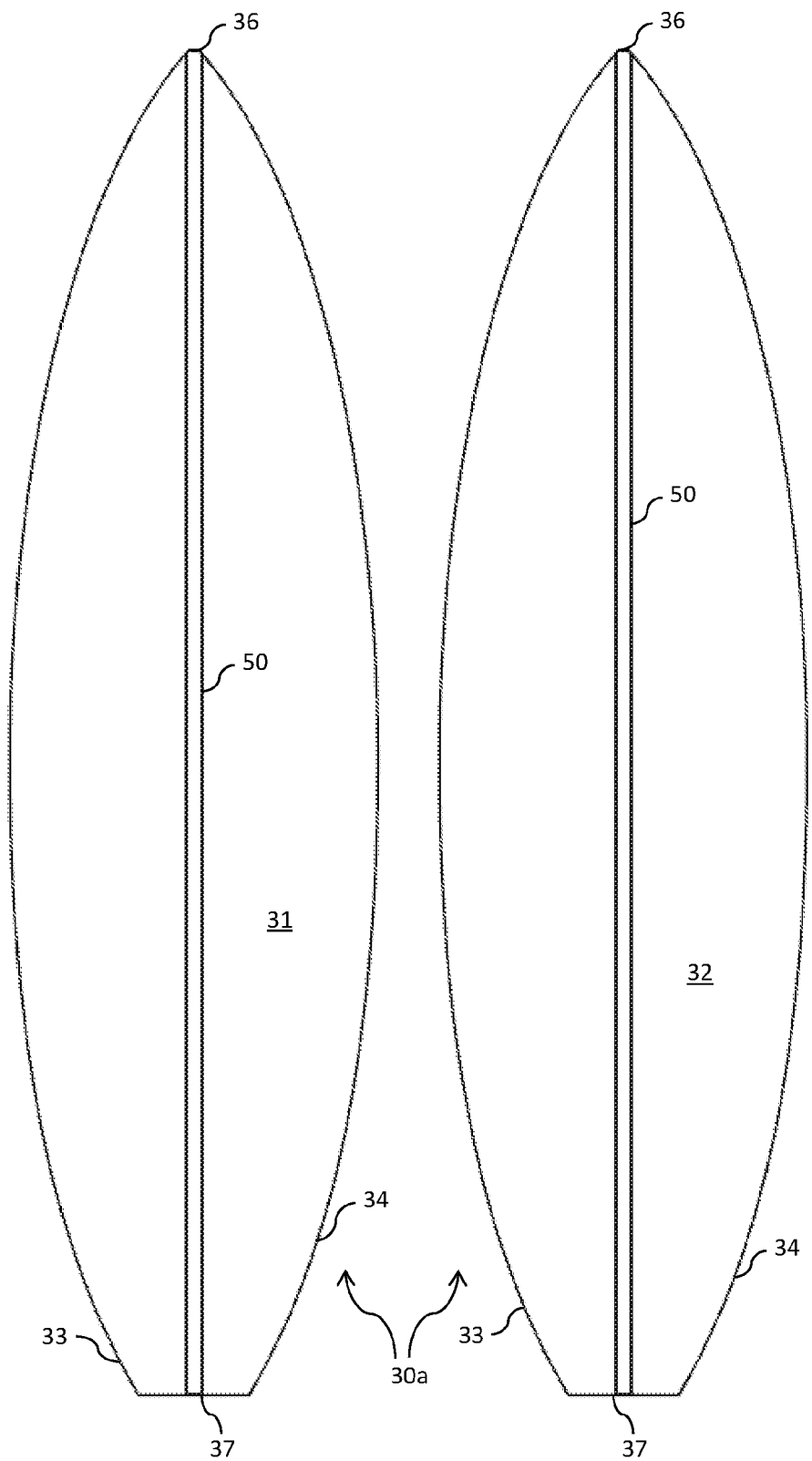
FIG. 11 shows the front and rear plan views of a foam blank in accordance with a further embodiment of the present invention showing flexible spines extending from the nose to the tail and located on both the top and bottom surfaces of the foam blank.

FIG. 11 shows a further variation of the foam blank 30 illustrated in FIGS. 7 and 8. The foam blank 30a differs only in that the flexible spines 50 and the recessed apertures 60 in the deck 31 and bottom 32 extend the complete length of the foam blank 30a. That is, from the nose 36 to the tail 37 of the foam blank 30a.

Figure 12:
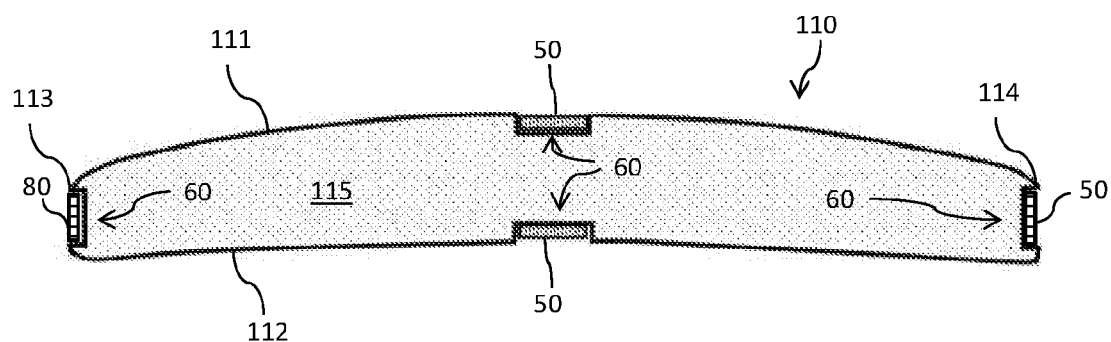
FIG. 12 shows a sectional view of a foam blank in accordance with a further embodiment of the present invention with further flexible spines located on or around the rail of the foam blank.
Figure 13:
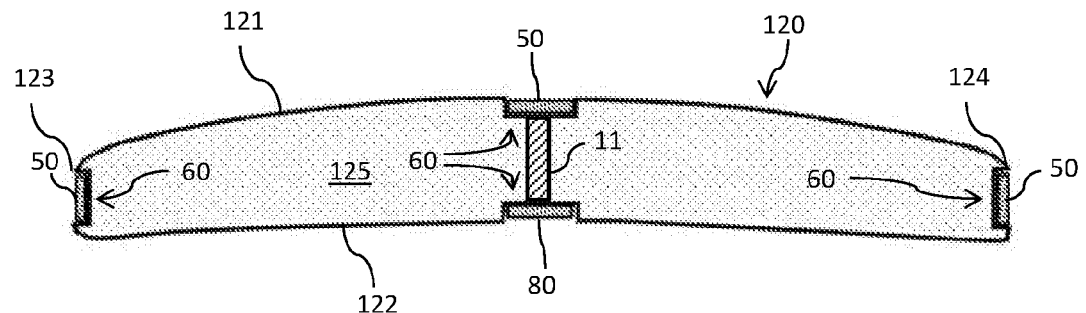
FIG. 13 shows the sectional view of FIG. 12 with a central stringer installed.
Figure 16:
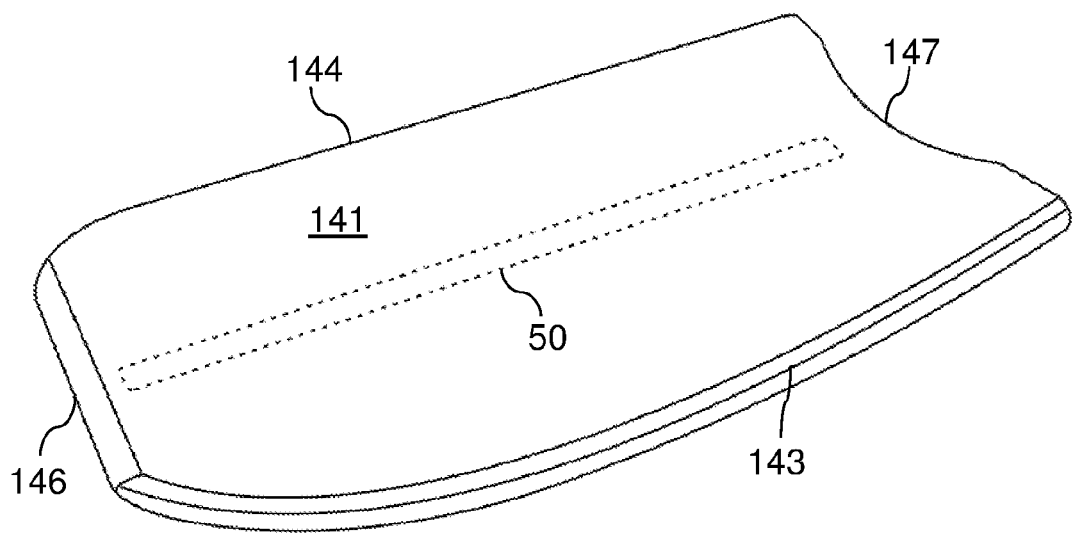
FIG. 16 shows a perspective view of the bodyboard foam blank of FIG. 15.
Figure 17:
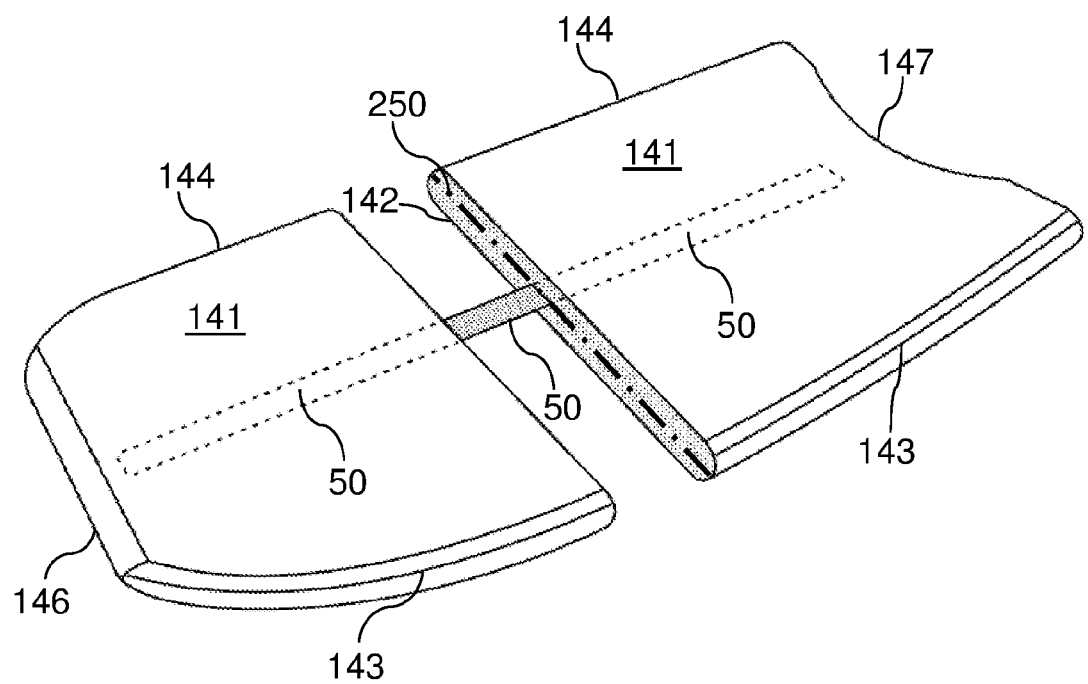
FIG. 17 shows an exploded perspective sectional view taken along line C-C of FIG. 15.

FIGS. 12 and 13 show a further embodiment of the present invention in which the flexible spines 50 are utilised on the rails 113, 114, 123, 124 of the foam blanks 110 and 120. This effectively provides a frame around the cores 115, 125 of the foam blanks which control twisting, therefore helping to provide the foam blank and the surfcraft with more responsiveness. This is particularly appealing as an option for surfboards that do not have a traditional stringer such as EPS boards 110. As shown in FIG. 13 the flexible spines 50 can also be utilised on the rails 123, 124 in PU foam blanks 120 with a stringer 11. Using the flexible spine 50 in/on the rails 123, 124 creates a structural frame and minimises twisting of the foam blank 120, hence controlling flex. This technique will make the foam blank and surfcraft respond quicker (increased reaction time), which also results in more speed and drive.

In accordance with a further embodiment the foam blank may also be utilised as a foam blank 140 for a bodyboard. FIG. 14 shows a bodyboard being ridden by a surfer 200 on their stomach. Typically when riding on their stomach the user's waist should be lying on the tail 147 of the bodyboard with their hands positioned on the nose 146 or rail 144 of the board and the feet and legs in the water with the bodyboard held flat. The bodyboard is another type of surfcraft which is traditionally made through a standard production technique in which a foam blank 140 of polyethylene foam, polypropylene foam or expanded polystyrene foam is cut to a desired shape to form the core of the bodyboard. The core is then encased by a bottom skin material 152, a deck material 151 which extends to the rails or side edges 143, 144 of the bodyboard.

As shown in FIGS. 15 to 28 the foam blank 140 has a flexible spine 50 inserted between two sections 153, 154 of the foam blank 140 or within a longitudinal slotted aperture 160 in the top 141, bottom 142 or rails 143, 144 of the foam blank 140. Alternatively, more than one flexible spine 50 can be located within or on any combination of the above sections or surfaces. For example, one flexible spine 50 may be located between two sections 153, 154 and a further flexible spine 50 may be located within a slotted aperture 160 in both the top 141 and bottom surfaces 142 of the foam blank 140.

The foam blank 140 has opposed top 141 and bottom 142 blank faces with a pair of shaped rails 143, 144 extending between the opposed top 141 and bottom 142 blank faces at blank face edges. A midline axis 148 extends between a nose region 146 and a tail region 147 and divides the foam blank 140 into two substantially equal regions, each of which extend between the midline axis 148 and the rail 143, 144 on sides respectively thereof. The top 141, bottom 142 and rails 143, 144 forms and an enclosed core space 150.

The foam blank 140 is cut into two sections through a plane 250 which passes horizontally through the foam blank 140 from the nose 146 to the tail 147. The two sections formed are the top section 153 and the bottom section 154. The top section 153 is formed between the deck or top face 141 and the cut face 155 formed by the cutting plane 250. The bottom section 154 is formed between the bottom face 142 and the cut face 156 formed by cutting plane 250. The cut faces 155, 156 of the top and bottom sections 153, 154 are located adjacent and opposing the cutting plane 250. The flexible spine 50 is inserted in between the top and bottom sections 153, 154 on the cut faces 155, 156 and along the midline axis 148 passing between the nose 146 and the tail 147 of the foam blank 140.

The flexible spine 50 can be placed, fixed or retained on one of the cut faces 155, 156 of the top or bottom sections 153, 154 and along the midline axis 148 of the foam blank 140. The flexible spine 50, the top section 153 and the bottom section 154 of the foam blank 140 are then bonded to reform the unitary foam blank 140 with the flexible spine 50 located between the top and bottom sections 153, 154 and within the enclosed core 150 of the foam blank 140.

Figure 19:
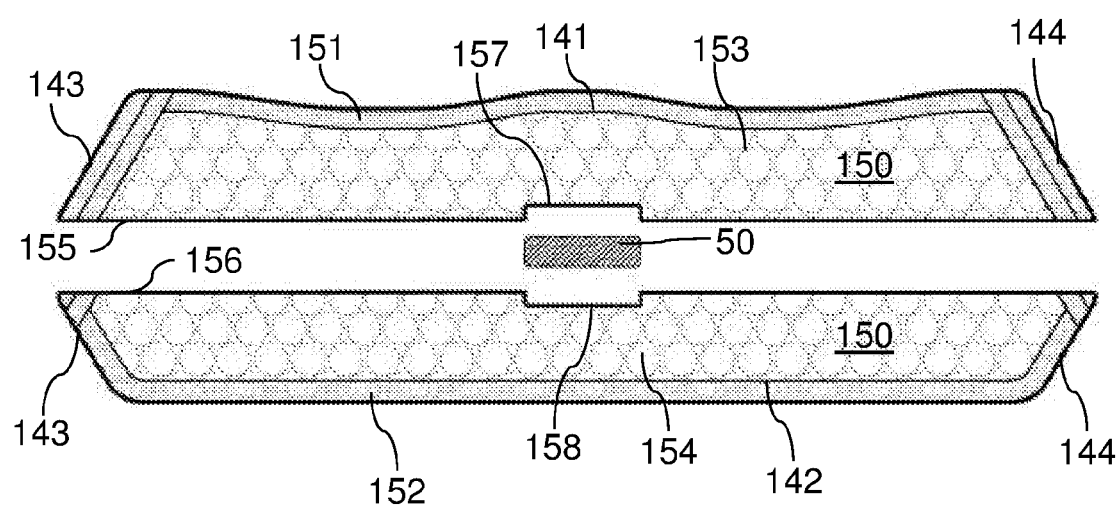
FIG. 19 illustrates a further embodiment of the bodyboard foam blank of FIG. 15 showing a sectional view taken along line C-C with the top and bottom sections having the slotted aperture located in opposing cut surfaces of the foam blank.

Like the foam blank 130 (FIG. 43), the bodyboard foam blank 140 and FIG. 19 shows a further embodiment of the present invention in which longitudinal slotted apertures 157, 158 are utilised in one or both of the adjacent cut surfaces 155, 156 for receiving the flexible spine 50 therein. As illustrated in FIG. 19, the longitudinally extending slotted aperture 158 is located within the second cut surface 156 and extending along and either side of the midline axis passing between the nose 146 and tail 147 of the foam blank 140. Likewise, the longitudinally extending slotted aperture 157 is located within the first cut surface 155 and extending along and either side of the midline axis passing between the nose 146 and tail 147 of the foam blank 140.

The slotted apertures 157, 158 are shaped to correspond substantially to the shape of the flexible spine 50. Therefore the shape, depth, length and width of the slotted apertures 157, 158 will vary dependent upon the corresponding flexible spine 50. Likewise, more than one aperture 157, 158 may be located in the second cut surface 156 or the first cut surface 155 to provide for more than one flexible spine 50. Each slotted aperture 157, 158 has a depth which extends into the core 150 of each or one of the first and second sections 153, 154 of the foam blank 140. That depth depends upon the depth or thickness of the flexible spine 50 and as discussed below the position of the slotted aperture 157, 158.

The depth of the slotted apertures 157, 158 can also vary dependent upon if only one or both cut surfaces 155, 156 are to be slotted. For example, if as in FIG. 19 both the first and second cut surfaces 155, 156 have a longitudinally extending slotted aperture 157, 158 the depth of the slotted apertures 157, 158 will typically equate to half of the depth or thickness of the flexible spine 50. This means that during manufacture the flexible spine 50 when fixed into the slotted aperture 158, the flexible spine will sit in the slotted aperture 158 and above the level of the second cut surface 156. To reform the unitary foam blank 140 the top section 153 is placed over and encloses the flexible spine 50 within the core 150 of the foam blank 140. Alternatively, the flexible spine 50 can be fixed into the slotted aperture 157, the flexible spine 50 will sit in the slotted aperture 157 and above the level of the first cut surface 155. To reform the unitary foam blank 140 the bottom section 154 is placed over and encloses the flexible spine 50 within the core 150 of the foam blank 140. In this configuration the corresponding slotted apertures 157, 158 are located in a mirrored image of each other. For example, the slotted aperture 158 in the second cut surface 156 is a reflected duplication that appears in the first cut surface 155 as slotted aperture 157, but is reversed in the direction perpendicular to the horizontal cut plane 250.

In a further alternate embodiment only one slotted aperture 157 or 158 may be routed into the first or second cut surfaces 155, 156. In this embodiment the depth of the slotted aperture 157 or 158 will equate to substantially the same depth or thickness as the flexible spine 50. This means that when the flexible spine 50 is fixed into the slotted aperture 157 or 158, the top of the flexible spine 50 will sit flush with the first or second cut surface 155, 156. To reform the unitary foam blank 140 the section 153, 154 without the slotted aperture 157, 158 is placed over and encloses the flexible spine 50 within the slotted aperture 157, 158 in the section 153, 154 of the foam blank 140.

Figure 18:
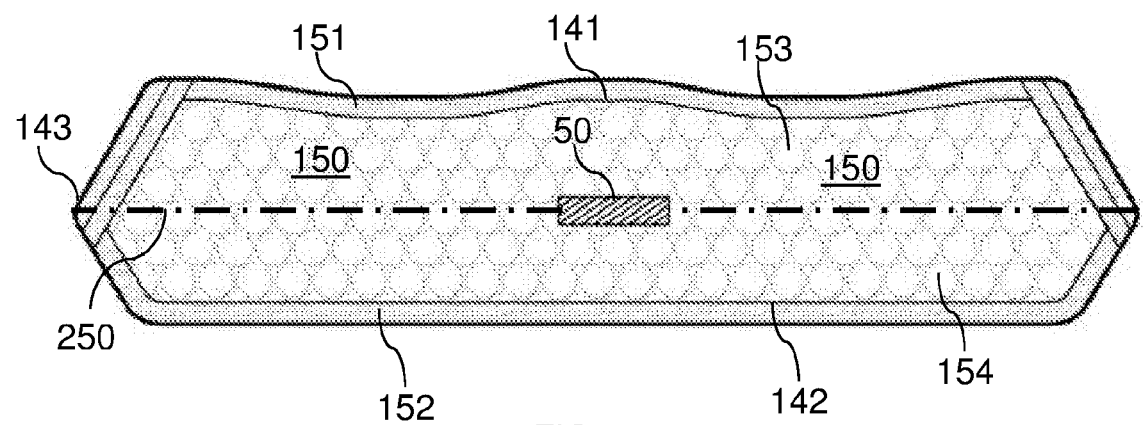
FIG. 18 shows a sectional view taken along line C-C of FIG. 15.

FIGS. 18 and 19 show sectional views when taken along the line C-C of FIG. 15. FIG. 18 shows the embodiment were no longitudinal slotted aperture is provided and the flexible spine 50 is simply inserted between the two sections 153, 154 and bonded together to form the unitary foam blank 140. FIG. 19 shows a different embodiment in which two longitudinally extending slotted apertures 157, 158 are positioned in each cut surface 155, 156 as described above.

The top and bottom sections 153, 154 of the foam blank 140 are separated along the cutting plane 250, which cuts the two sections 153, 154 substantially in half. In some embodiments the cutting plane 250 can be located more into one section 153, 154 than the other, therefore allowing the position of the flexible spine 50 to be varied within the core 150 of the foam blank 140. As previously discussed the position of the flexible spine 50 within the core 150 of the foam blank 140 can increase the physical strength and durability of the bodyboard produced from the foam blank 140. It was also found that by using the flexible spine 50 has improved bodyboard performance through optimising flex. By controlling the flex pattern of foam blanks 140 (the core of the bodyboard) will ultimately affect the way the bodyboard flexes and surfs.

As discussed above the foam blank 140 is cut substantially in half to form the top and bottom sections 153, 154. Any type of foam cutter can be used, for example a hot-wire foam cutter or saw can be used to cut along the horizontal plane 250 running the length of the foam blank 140 from the nose 146 to the tail 147. A hot-wire foam cutter consists of a thin, taut metal wire, often made of nichrome or stainless steel, or a thicker wire preformed into a desired shape, which is heated via electrical resistance to approximately 200° C. As the wire is passed through the foam blank 130, the heat from the wire vaporises the foam just in advance of contact.

The flexible spine 50 utilised in the foam blank 140 differs only in the length of the flexible spine when compared with the flexible spine 50 used in the foam blanks 20, 130.

Figure 20:
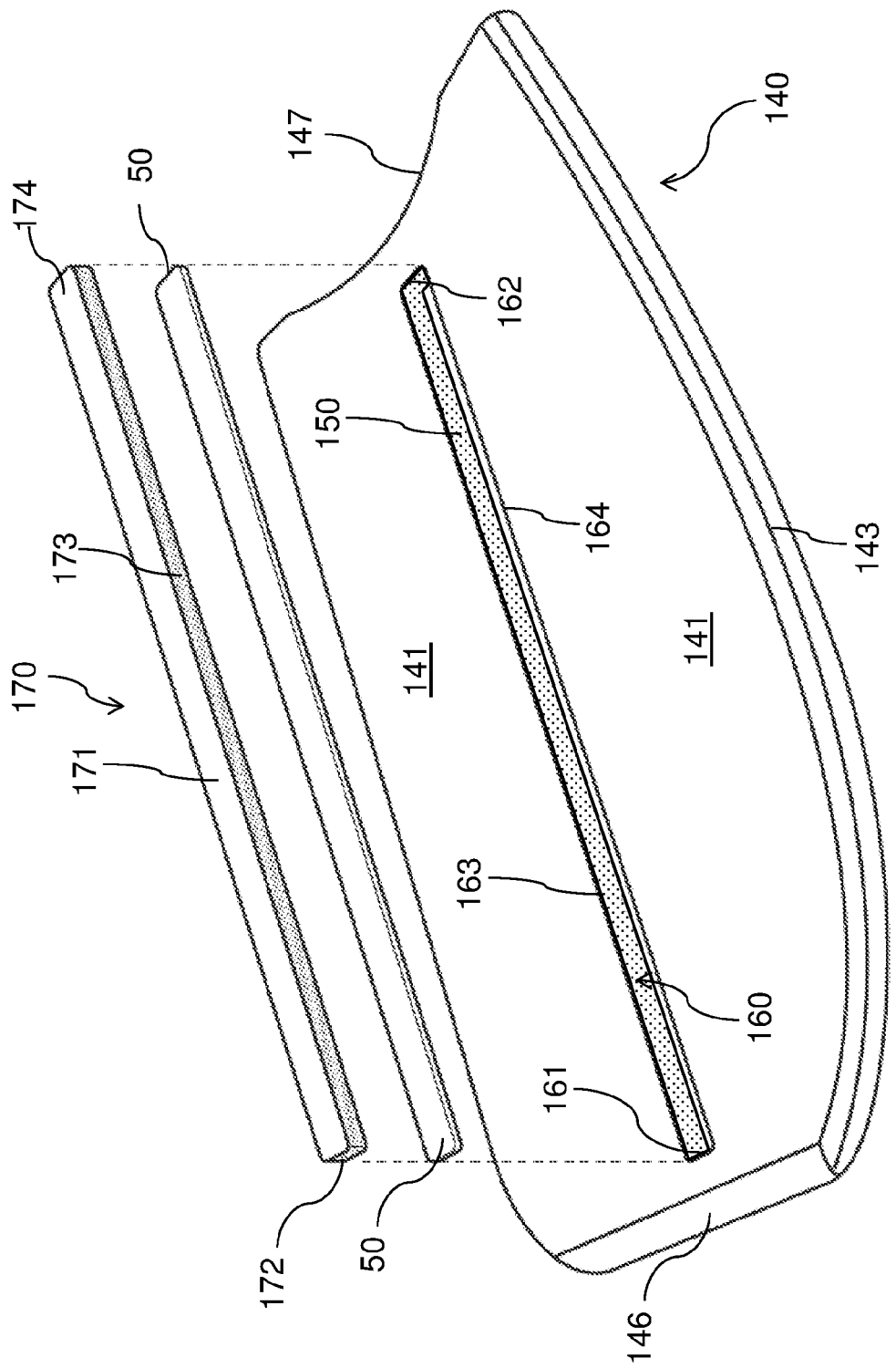
FIG. 20 illustrates an exploded perspective view of a further embodiment of the present invention showing the location of the flexible spine when located adjacent the deck of the bodyboard foam blank.

FIGS. 20 to 24 show some alternate placement of the flexible spine 50 in the foam blank 140. FIG. 20 shows a single longitudinally extending recess or slotted aperture 160. The recess or slotted aperture 160 is formed with two side walls 163, 164, first and second ends 161, 162 and a substantially flat bottom or floor for receiving the flexible spine 50. The recess or slotted aperture 160 extends for substantially the length of the deck 141 and is aligned with the midline axis of the foam blank 140. The slotted recess or aperture 160 is spaced a distance away from both the nose 146 and tail 147 of the foam blank 140. Likewise the longitudinally extending slotted aperture 160 is spaced an equal distance from both rails 143, 144. The ends 161, 162 of the slotted recess or aperture 160 can be squared or rounded and likewise the ends of the flexible spine 50 which fits into the slotted aperture or recess 160 will have a complementary shape to that of the slotted recess or aperture 160. Alternatively, the ends 161, 162 can be any shape corresponding to the ends of the flexible spine 50.

The longitudinally extending slotted aperture 160 is formed in the top or deck 141 using a mechanical router, electric hand router, hand plane or CNC machine to hollow out an area in the face of the top or deck 141 to accurately create the recessed area for installation of the flexible spine 50. Alternatively, the aperture 160 may be formed using any type of foam cutter, for example a hot-wire foam cutter. When using the hot-wire foam cutter the piece 170 which is cut from the deck 141 can be utilised when reforming the top surface of the foam blank 140. FIG. 20 shows the cut piece 170 which has a top wall 171, end walls 172, 174 and bottom section 173 which on assembly of the completed foam blank 140 can be inserted over the flexible spine 50 and bonded along with the flexible spine 50 to the core 150.

The flexible spine 50 is located along the midline axis of the foam blank 140. The placement of the flexible spine 50 is not limited to only the deck 141. The flexible spine 50 can be placed in any one or more of the top or deck 141, bottom 142, or the rails 143, 144. Likewise, multiple flexible spines 50 may be placed in one or more of the surfaces 141, 142, 143, 144 of the foam blank 140. The nature and design of the present invention allows the user or surfer to customise the flex pattern of their board through the placement of the flexible spine 50 in the foam blank 140. The placement of the flexible spine 50 can also increase the overall strength while providing the controlled desired flex pattern.

Figure 21:
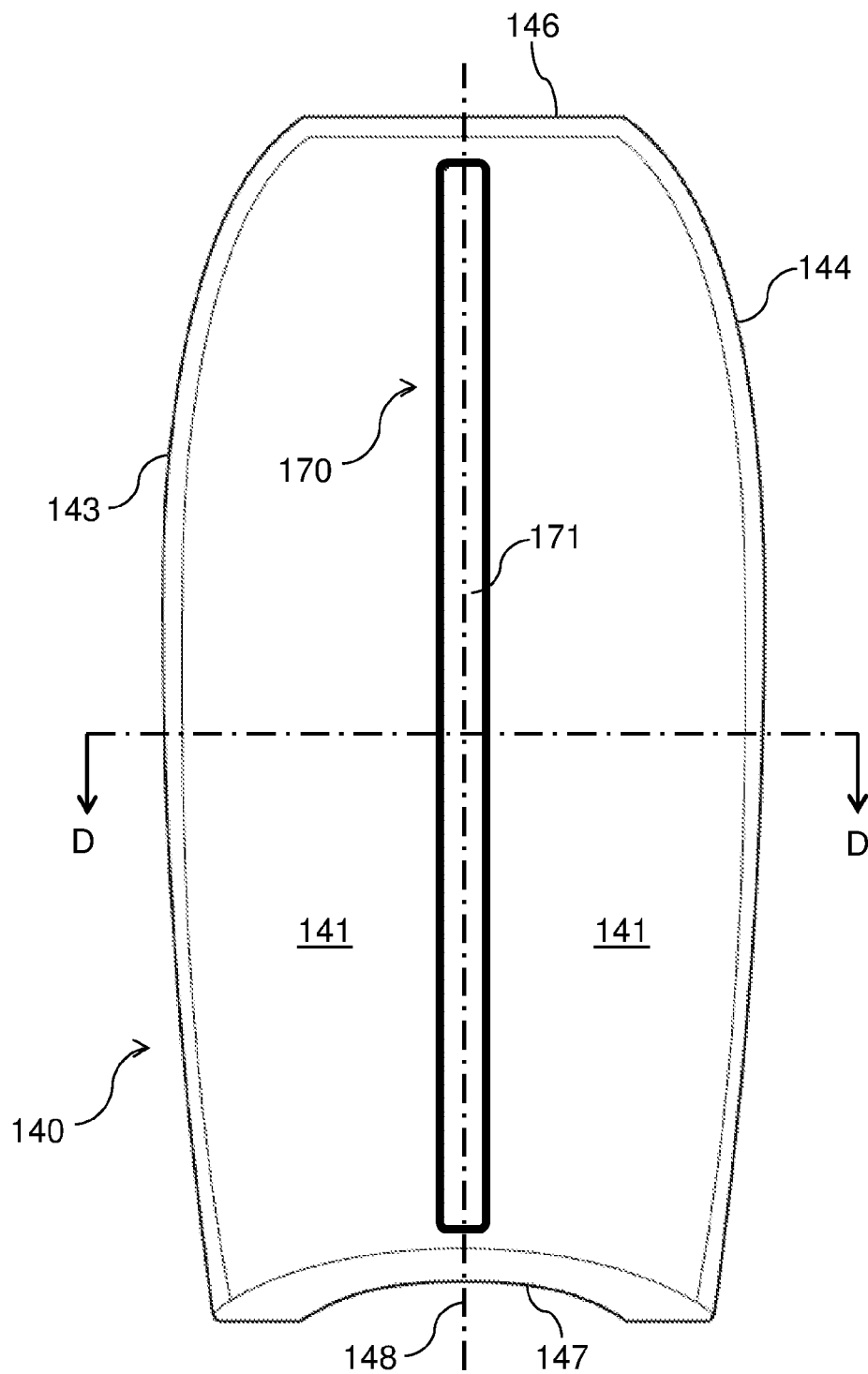
FIG. 21 shows a plan view of the bodyboard foam blank of FIG. 20.
Figure 22:
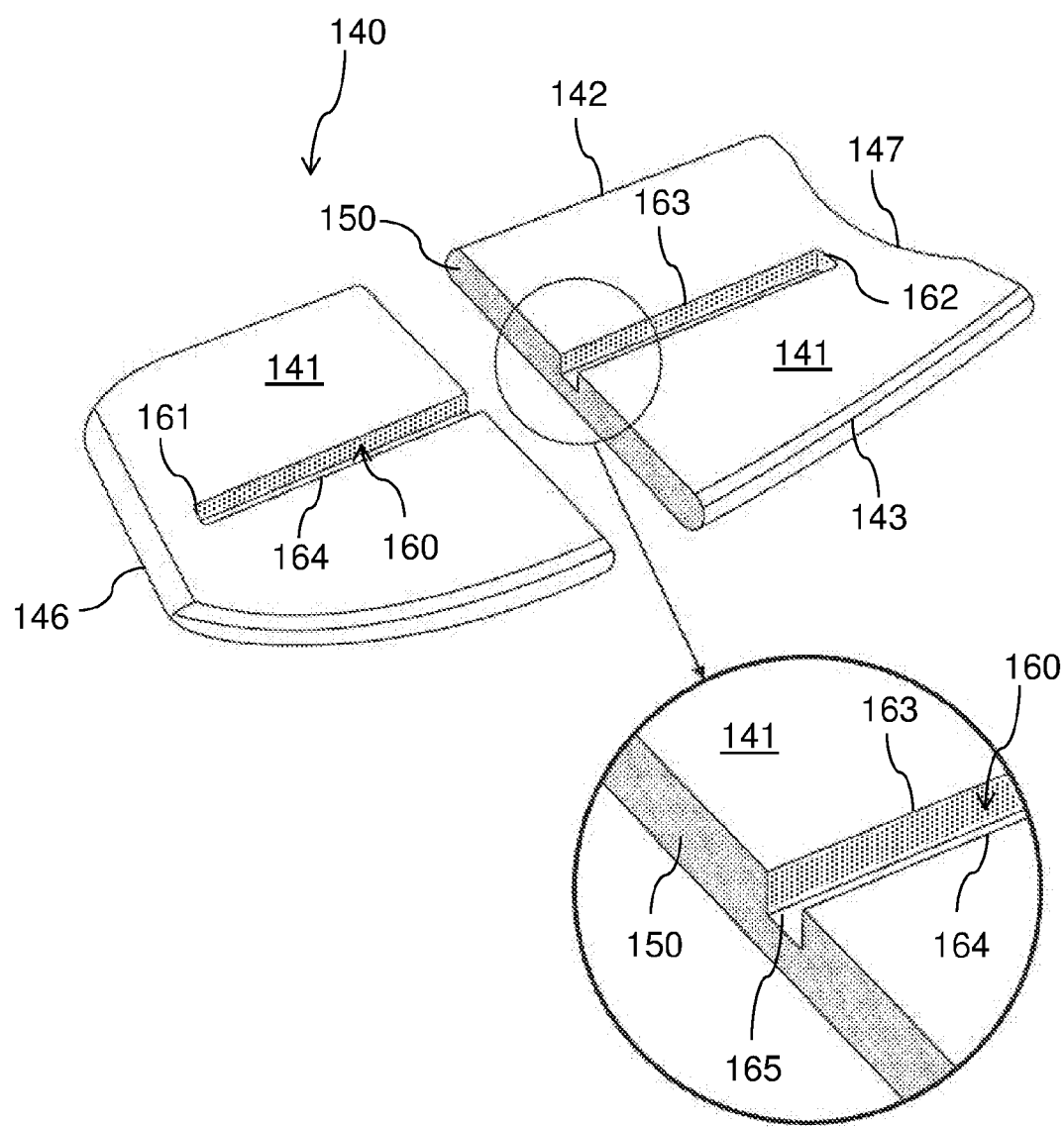
FIG. 22 shows a perspective view of the bodyboard foam blank of FIG. 21 showing a sectional view along line D-D with the slotted aperture in the deck of the foam blank and the flexible spine removed for clarity.

FIG. 21 shows a plan view of the foam blank 140 with the flexible spine 50 and the insert 170 bonded to form the unitary foam blank 140. FIG. 22 shows a perspective view of the foam blank 140 with the flexible spine 50 and the insert 170 removed for clarity of the longitudinally extending aperture or recess 160. As described above the recess or slotted aperture 160 is formed with two side walls 163, 164, first and second ends 161, 162 and a substantially flat bottom or floor 165 for receiving the flexible spine 50 therein. The recess or slotted aperture 160 extends for substantially the length of the deck 141 and is aligned with the midline axis 148 of the foam blank 140. The slotted recess or aperture 160 is spaced a distance away from both the nose 146 and tail 147 and extends into the core 150 of the foam blank 140.

Figure 23:
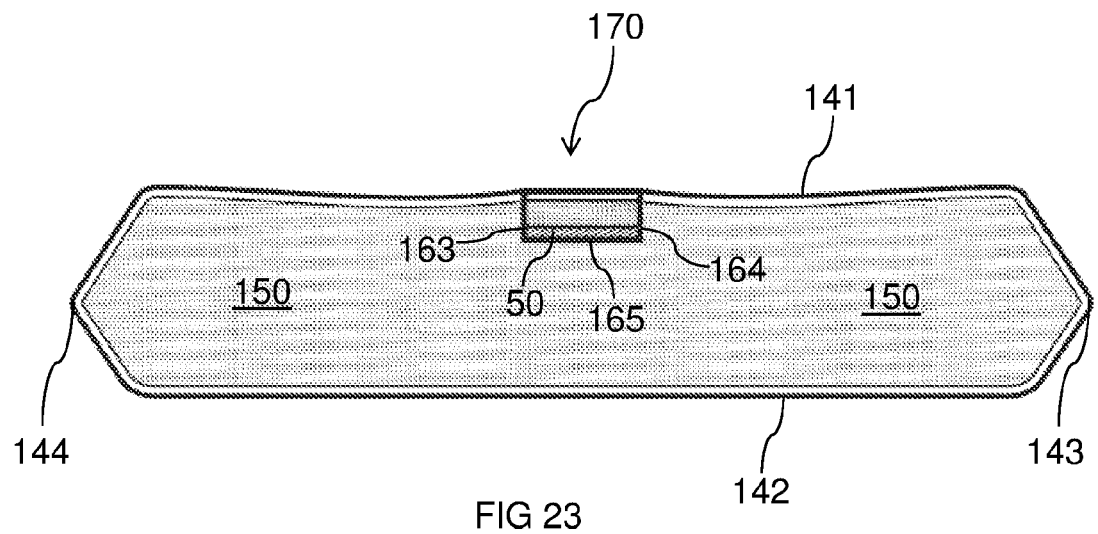
FIG. 23 shows the sectional view along line D-D of FIG. 21.

FIG. 23 illustrates a section taken along the line D-D of FIG. 21 of the foam blank 140. The insert 170 and the flexible spine 50 are shown bonded to the core 150. The flexible spine 50 is located within the longitudinally extending aperture 160 and surrounded by the walls 163, 164 and floor or bottom wall 165.

Figure 24:
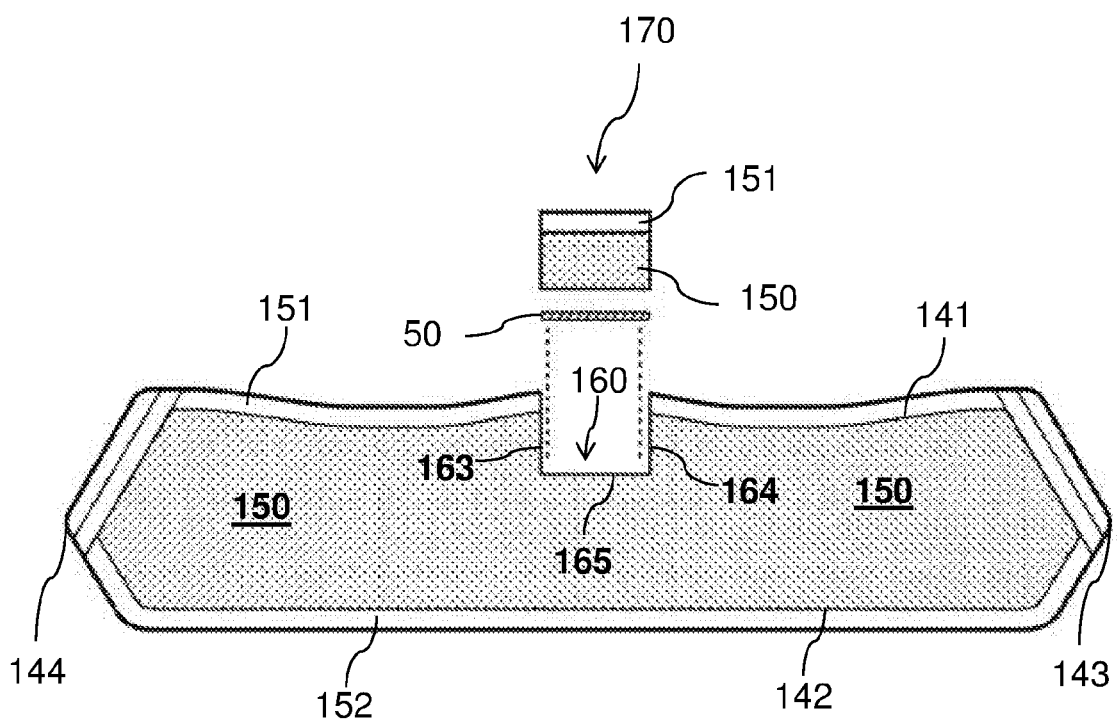
FIG. 24 shows an exploded sectional view of FIG. 23.

FIG. 24 shows the same section with the insert 170 and the flexible spine 50 in an exploded view. Also illustrated in FIG. 24 the foam blank 140 is encased by a bottom skin material 152 and a deck material 151 which also extends to the rails or side edges 143, 144 of the bodyboard. The bottom skin or slick material 152 is typically a high density polyethylene (HDPE) or on the better types of bodyboard can be Surlyn made by DuPont. The deck material 151 and rails can be made from a closed cell or crosslinked polyethylene or polypropylene material or an open cell foam material.

Figure 25:
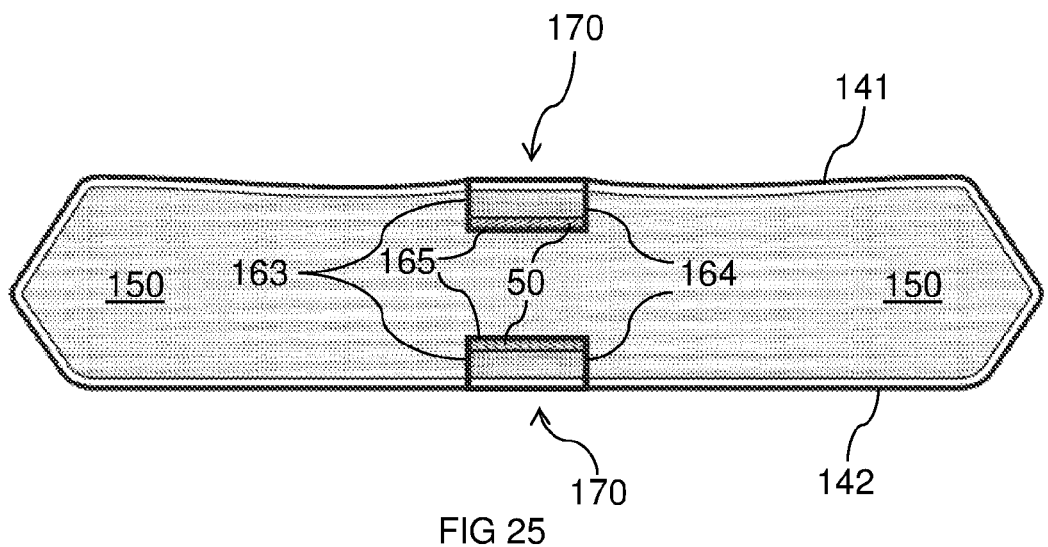
FIG. 25 shows a sectional view of a further embodiment of the present invention showing a bodyboard foam blank with a flexible spine located adjacent both the top and bottom surfaces of the foam blank.

FIG. 25 illustrates a further embodiment of a similar section taken along the line D-D of FIG. 21 of the foam blank 140 but in this embodiment there are two longitudinally extending apertures 160, one located in the top or deck 141 and the second located in the bottom 142. In each aperture 160, the insert 170 and the flexible spine 50 are shown bonded to the core 150. The flexible spine 50 is located within the longitudinally extending apertures 160 and surrounded by the walls 163, 164 and floor or bottom wall 165.

Figure 26:
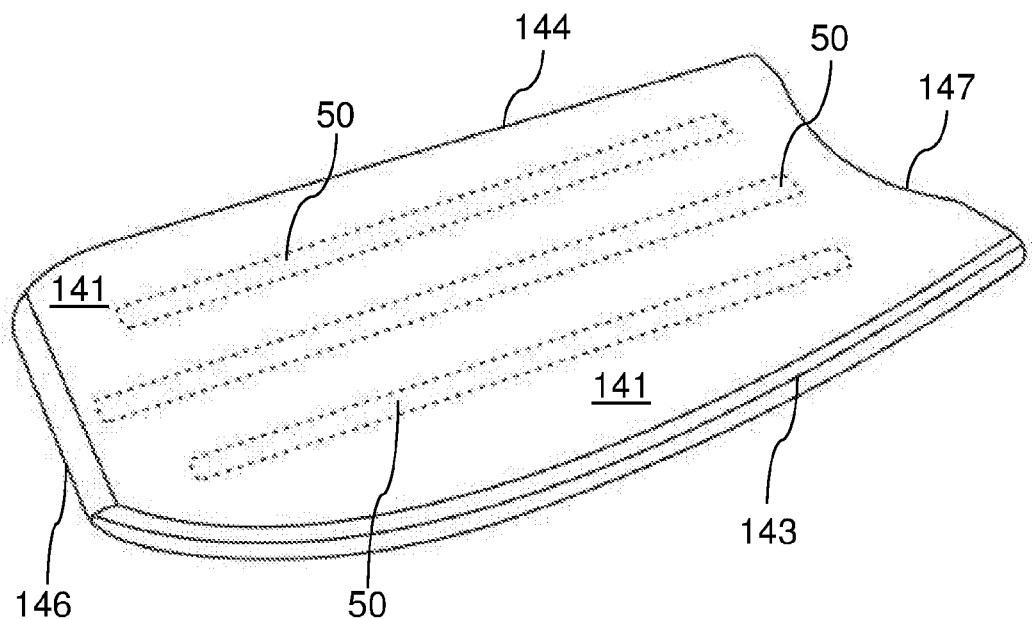
FIG. 26 shows a perspective view of a bodyboard foam blank with three flexible spines located adjacent the top surface of the foam blank in accordance with a further embodiment of the present invention.
Figure 27:
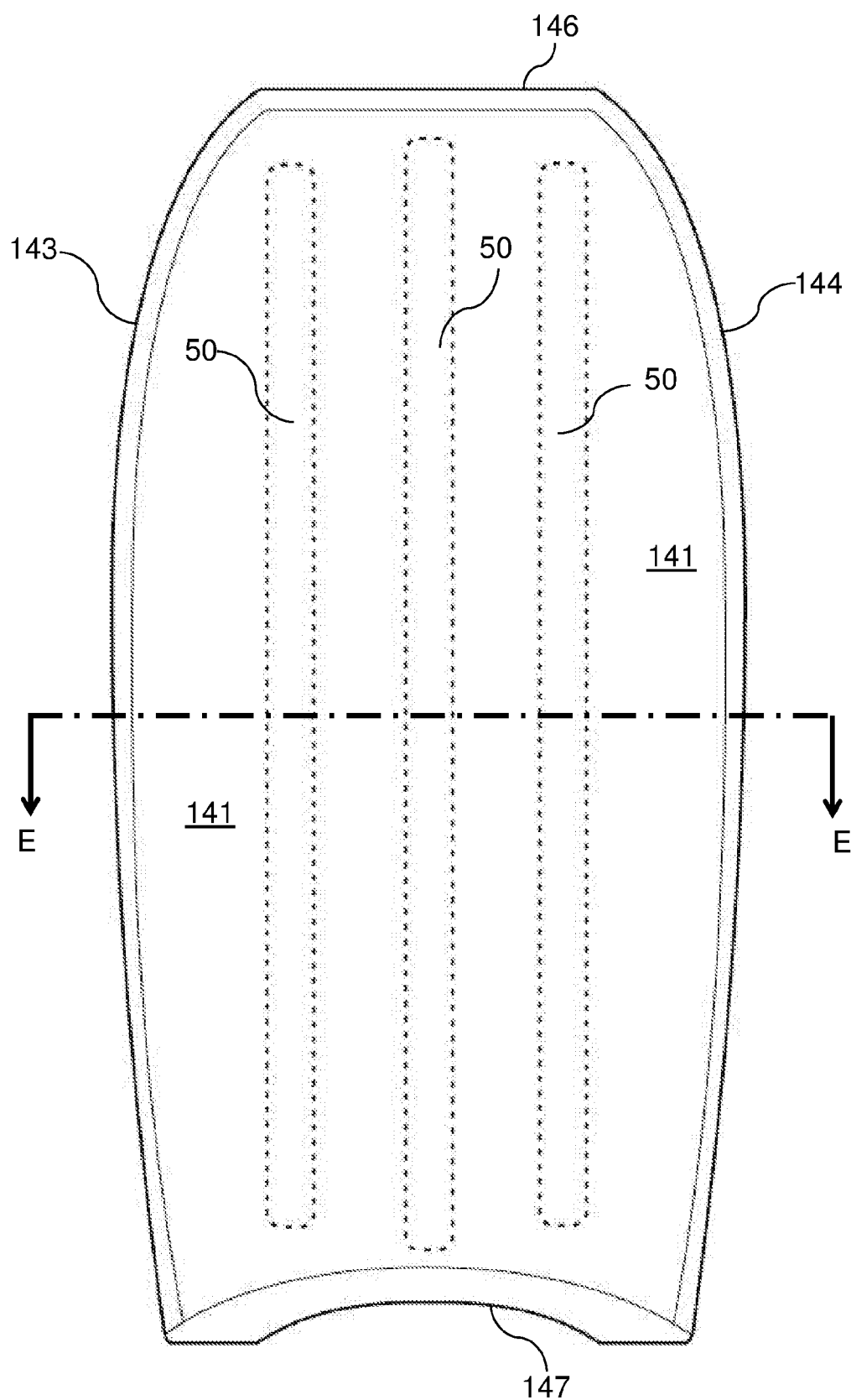
FIG. 27 shows a plan view of the bodyboard foam blank of FIG. 26.
Figure 28:
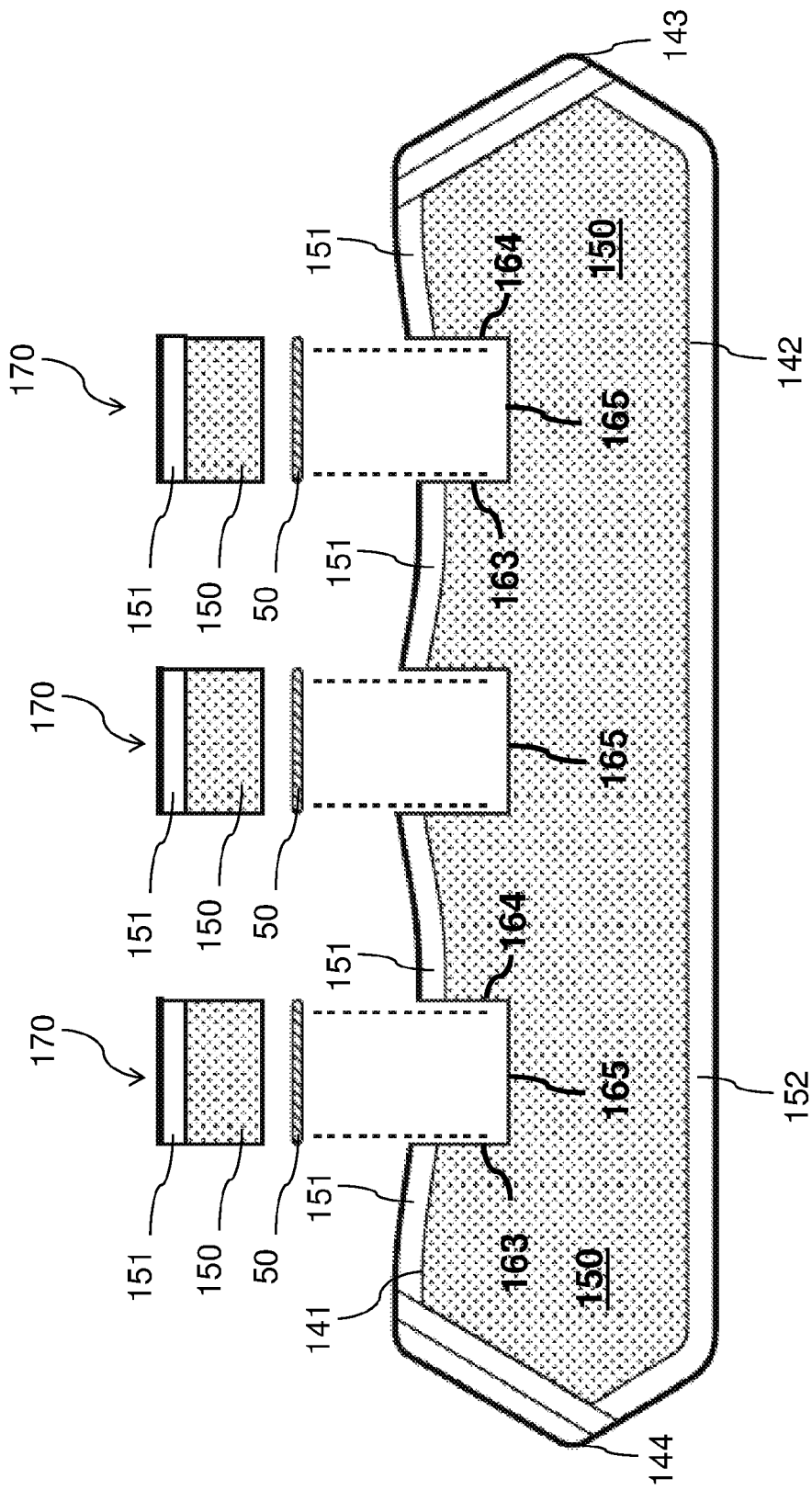
FIG. 28 illustrates an exploded sectional view taken along line E-E of FIG. 27.

FIGS. 26 to 28 illustrate a further embodiment in which three flexible spines 50 are inserted into the core 150 of the foam blank 140. A first flexible spine 50 is located as described above along the midline axis 148 and extending substantially for the length of the foam blank 140 from the nose 146 to the tail 147 of the foam blank 140. The remaining two flexible spines 50 are located and spaced symmetrically on both sides of the midline axis 148 and positioned between the first flexible spine 50 and the rails 143, 144. The length of the outer flexible spine 50 is slightly shorter than the midline axis flexible spine 50.

FIG. 28 like FIG. 24 shows the complete bodyboard with the foam blank 140 and the three flexible spines 50.

While not illustrated a further embodiment of the present invention utilising the foam blank 140 of FIG. 23 or 25 with flexible spines 50 further located on the rails 143, 144 of the foam blank 140. This effectively provides a frame around the core 150 of the foam blank 140 which controls twisting, therefore helping to provide the foam blank and bodyboard with more responsiveness. This is particularly appealing as an option for bodyboards that do not have a stringer. Using the flexible spine 50 in/on the rails 143, 144 creates a structural frame and minimises twisting of the board, hence controlling flex. This technique will make the board respond quicker (increased reaction time), which also results in more speed and drive.

FIGS. 29 to 37 show some of the different options and configurations available for the flexible spine 50. In order to provide a better bond between the flexible spine 50, the core 135, the longitudinally extending apertures 255, 256 and the chemical bonding material, passages 55 that extend entirely through the flexible spine 50, so that upon the flexible spine 50 being secured or fixed to the foam blank 130 by the chemical bonding material, the chemical bonding resin is able to pass through the passages 55 to further aid in securing the flexible spine 50 to the foam blank 130.

Figure 29:
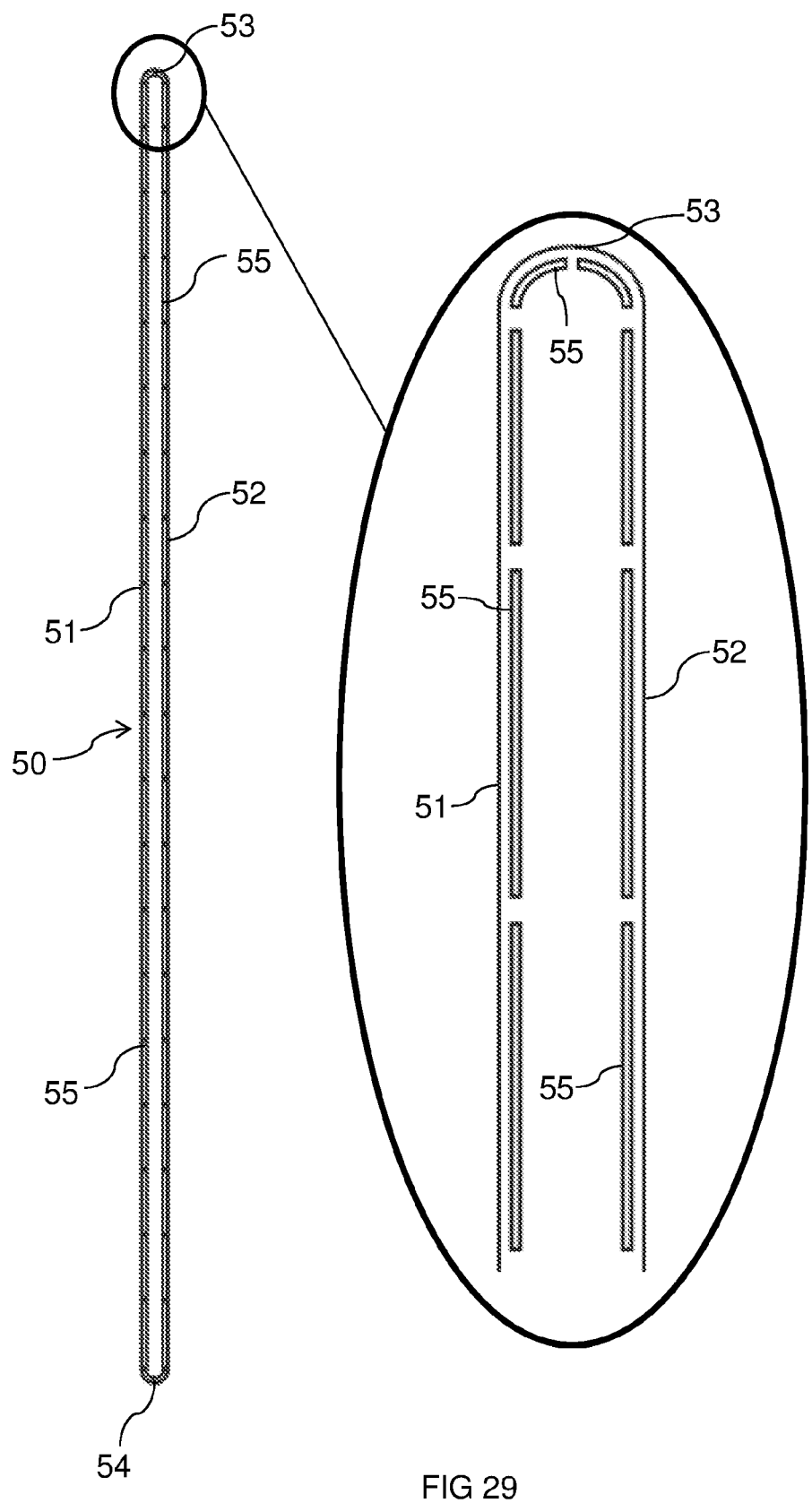
FIGS. 29 to 36 show plan views of flexible spines in accordance with an embodiment of the present invention and showing an enlarged view of one end of the flexible spine providing detail of the apertures in the flexible spine.

As shown in FIG. 29 the passages or apertures 55 are generally elongated, with the majority extending generally parallel to a midline axis passing longitudinally through the middle of the flexible spine 50. As shown the elongated apertures 55 are generally located adjacent the outer periphery of the flexible spine 50 and between the long sides 51, 52 and the ends 53, 54.

Figure 30:
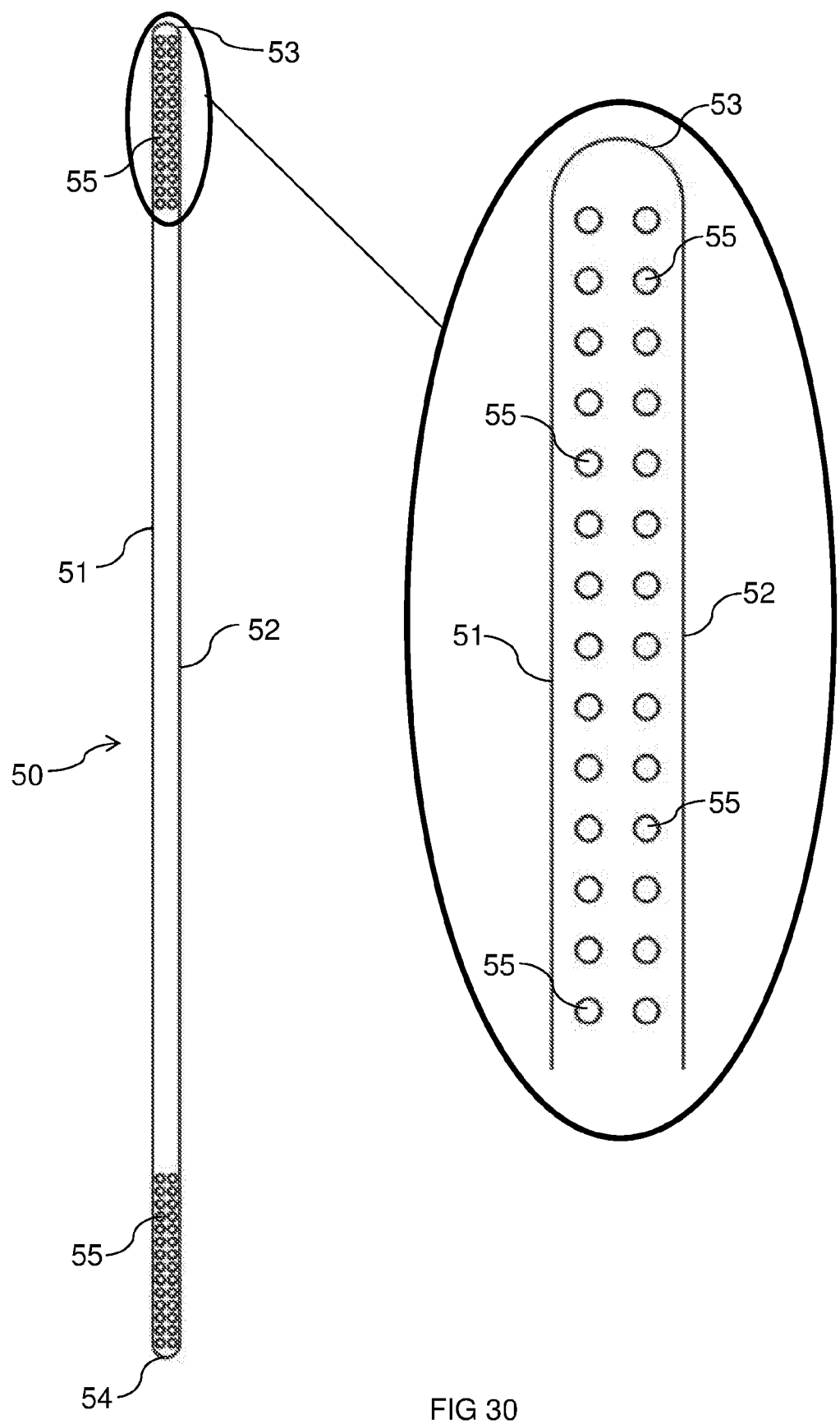
Figure 31:
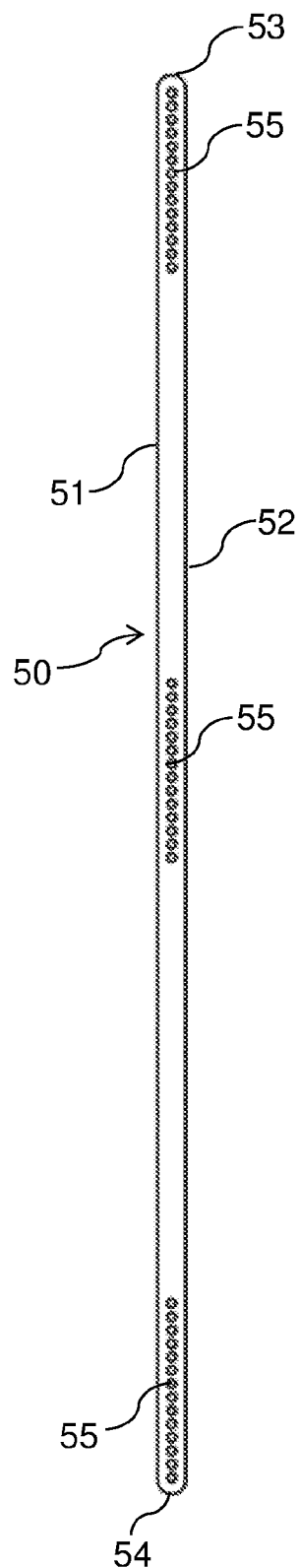
Figure 32:
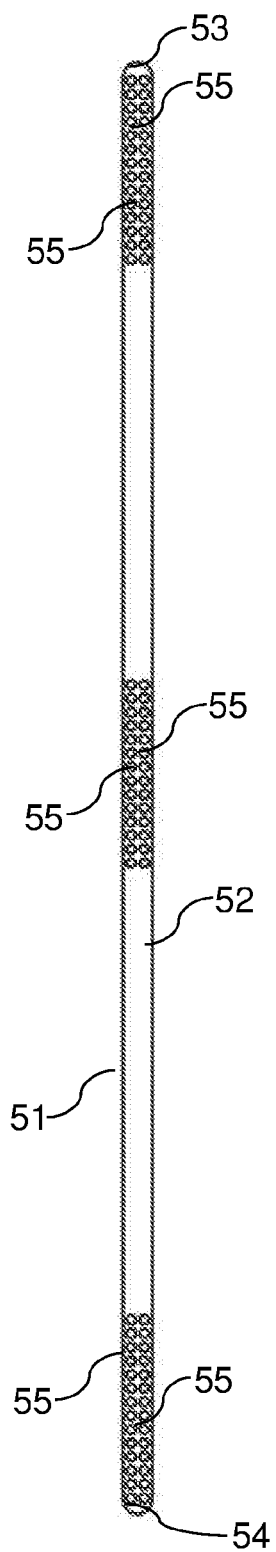

Alternatively and as illustrated in FIGS. 30 to 32 the apertures 55 are more circular and located in groups extending along the flexible spine 50. In particular, the circular apertures 55 can be located on either end and in the middle of the flexible spine 50 and extending a distance along the flexible spine 50. Like the passages the circular apertures 55 extend entirely through the flexible spine 50.

Figure 33:
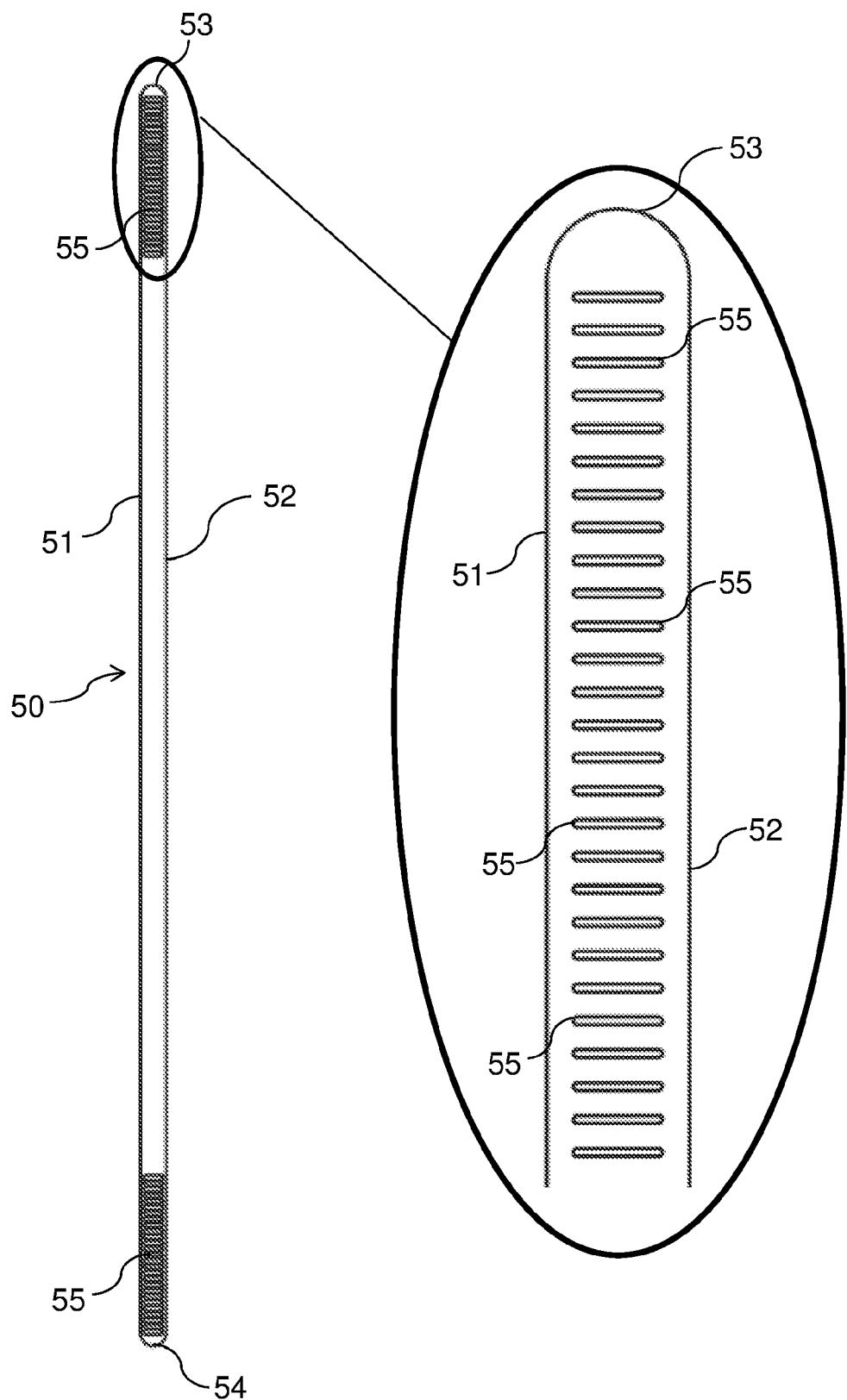
Figure 34:
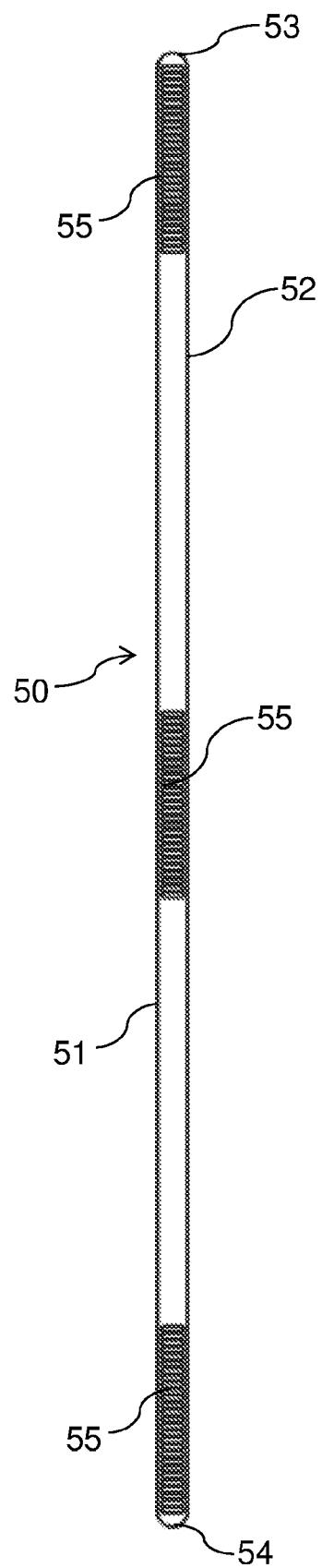

FIGS. 33 and 34 shows a further alternative passage 55 in which the passages 55 extend across the width or perpendicular to the sides 51, 52 of the flexible spine 50. Either end of the passages 55 are located adjacent to the sides 51, 52 of the flexible spine 50. The passages 55 can be located in groups situated at either end 53, 54 of the flexible spine 50 or also as shown in FIG. 34 located substantially in the middle section of the flexible spine 50. Like all previous passages or apertures 55 they extend entirely through the flexible spine 50.

Figure 35:
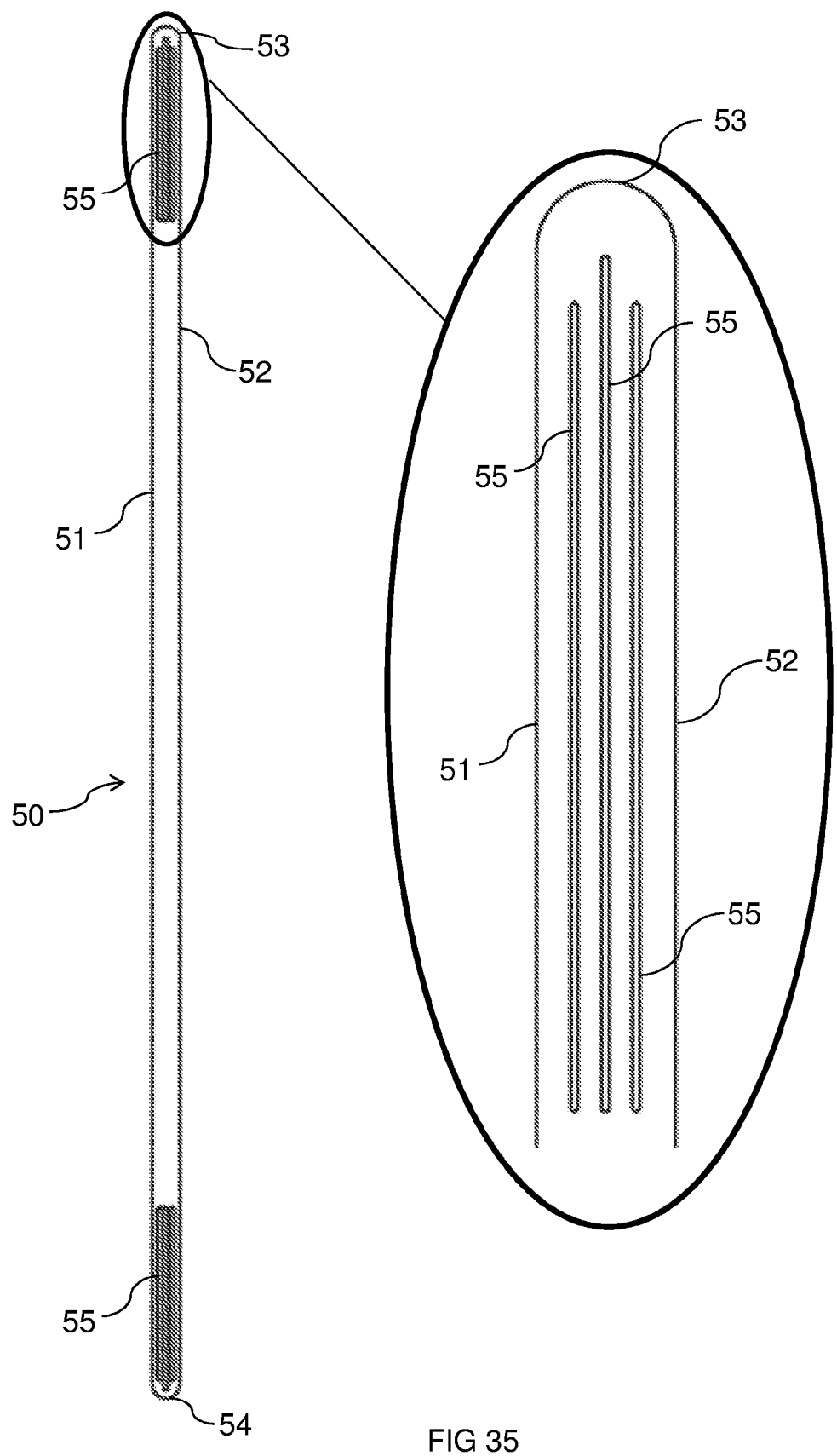
Figure 36:
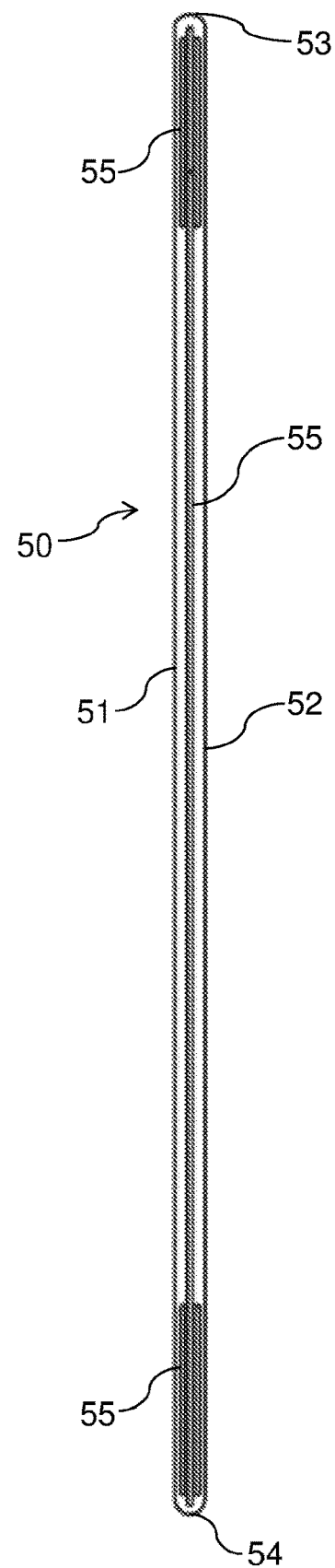

FIGS. 35 and 36 show another alternative or configuration for the passages 55. In this configuration longitudinally extending apertures 55 are located extending a distance along the flexible spine from either end 53, 54 as shown in FIG. 35. In this arrangement, three passages 55 extend from each end 53, 54 a distance along the flexible spine 50. The middle passage 55 extends along the midline axis of the flexible spine 50 and closer to the ends 53, 54 than the other two passages 55. The other two passages 55 are located adjacent the sides 51, 52 and all three passages run parallel with the sides 51, 52 of the flexible spine 50. FIG. 36 illustrates a further embodiment of the flexible spine 50 similar to that of FIG. 35. The middle passage 55 extends for substantially the length of the flexible spine 50 along the midline axis of the flexible spine. Like all previous passages or apertures 55, the passages 55 of FIGS. 35 and 36 extend entirely through the flexible spine 50.

Figure 37:
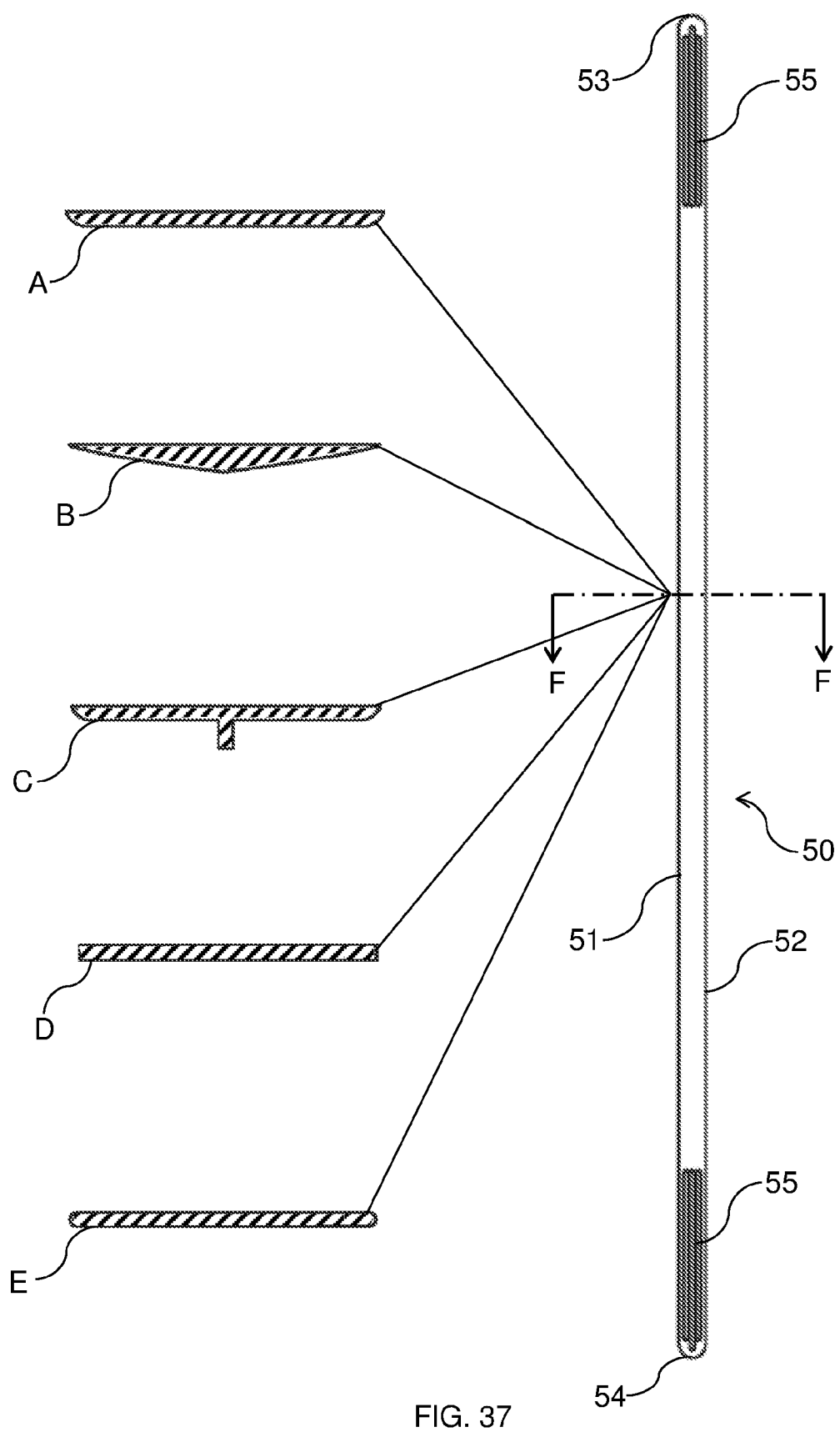
FIG. 37 shows a plan view a flexible spine with a cross-section taken along line F-F and illustrating some of the different cross-sectional shapes available for the flexible spine in accordance with the present invention.

FIG. 37 shows the flexible spine 50 of FIG. 35 with a variety of different cross-sectional shapes available for the flexible spine 50 as illustrated and taken through the line F-F. While the flexible spine 50 has been largely shown as having a rectangular cross-sectional shape other options are available and any shape is not excluded from the present invention. Some of the different cross-sectional shapes are shown and referenced as A-E in FIG. 37.

Figure 38:
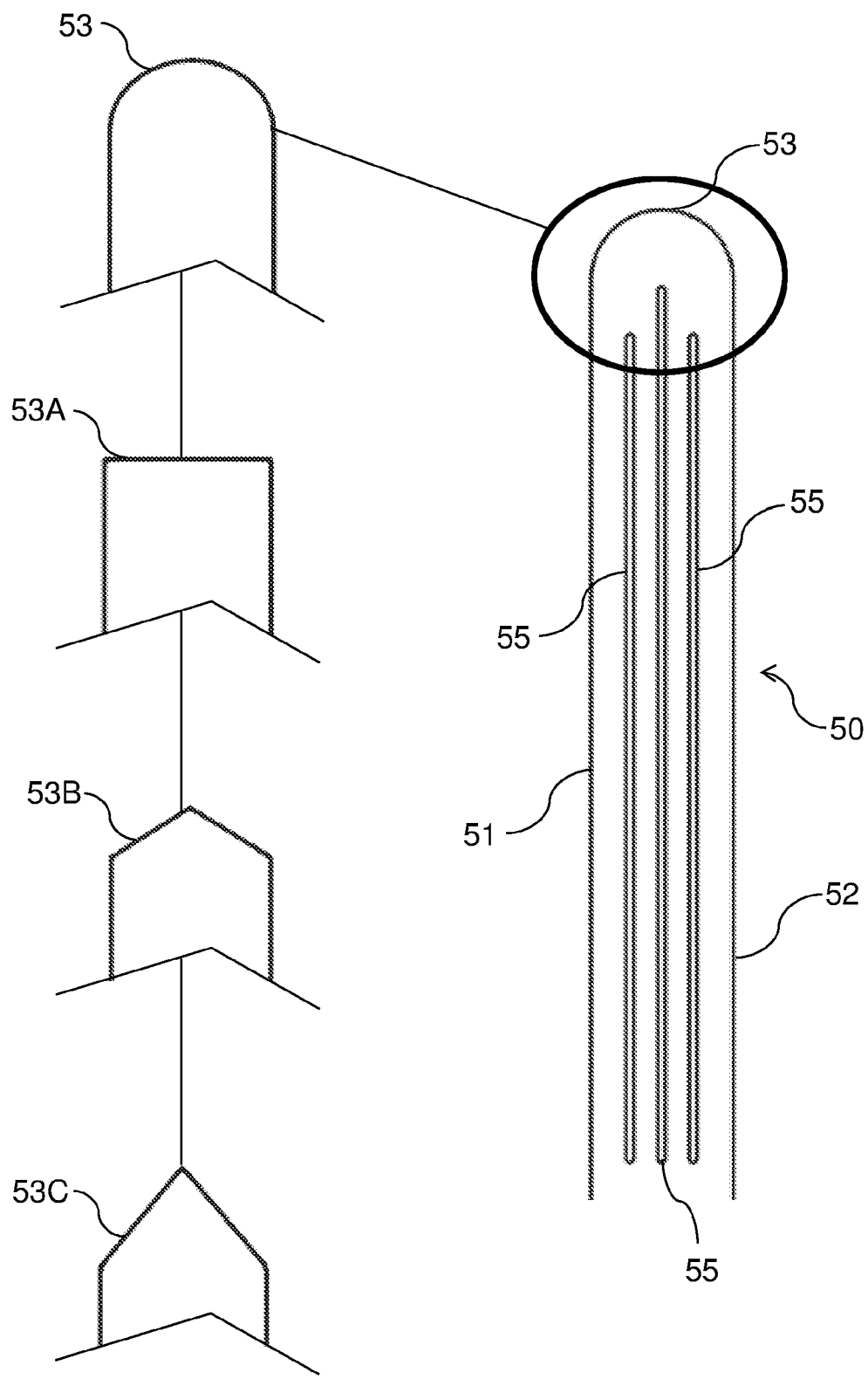
FIG. 38 shows an enlarged plan view of one end of a flexible spine with the circled reference highlighting different options available for the shape of the ends of the flexible spine.

As also shown in FIG. 38 the ends 53, 54 of the flexible spine 50 can be any shape as illustrated and referenced as 53-53C.

Figure 39:
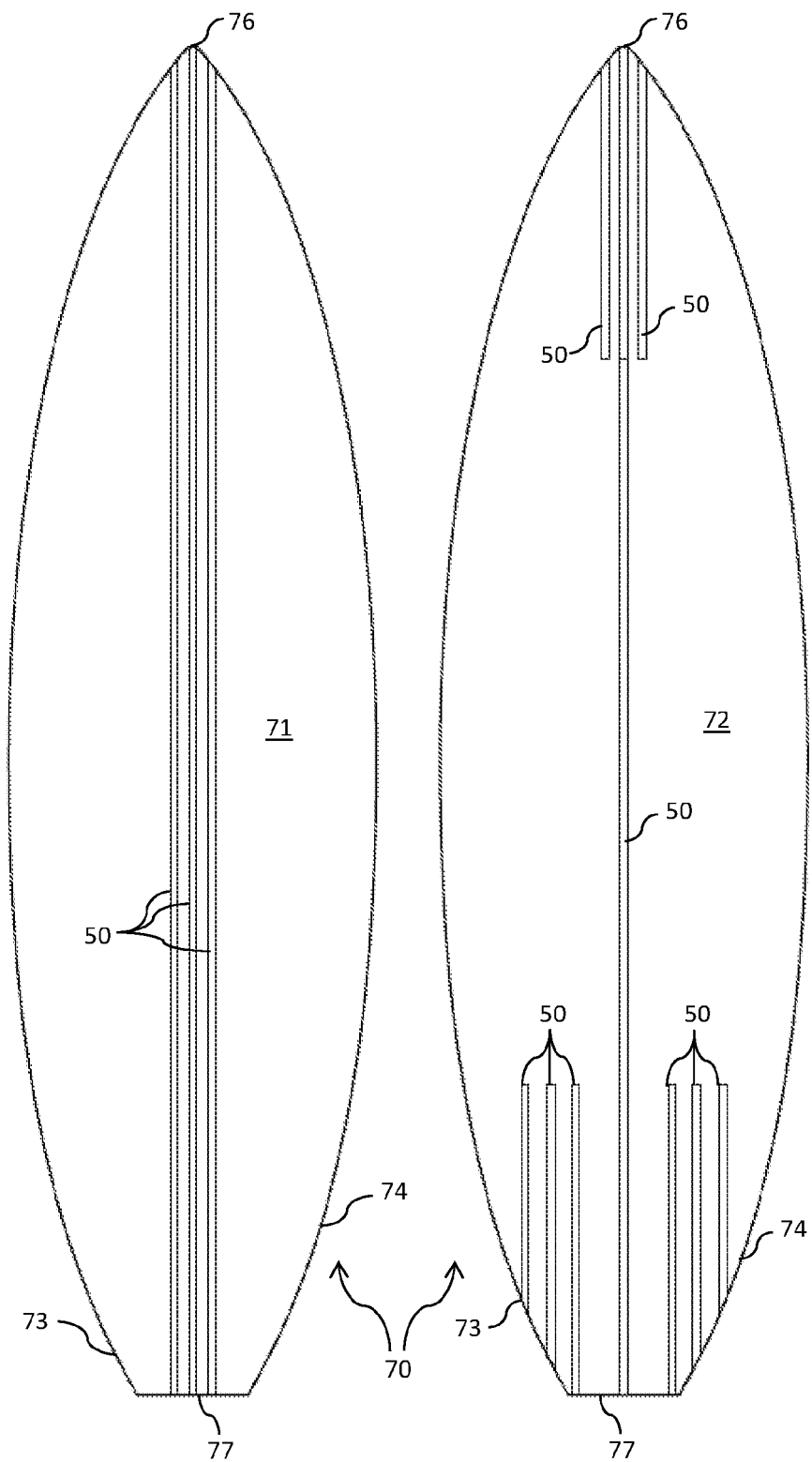
FIGS. 39 to 42 show front and rear plan views of further embodiments of the foam blank showing various location combinations of the flexible spine.

FIGS. 39 to 42 show some further exemplary embodiments which are possible for the foam blank with the flexible spine 50 of the present invention. FIG. 39 shows a foam blank 70 which has three flexible spines 50 installed in the recessed apertures 60 on the deck 71 of the foam blank 70 and running the length of the foam blank 70 from the nose 76 to the tail 77. One flexible spine 50 located along the midline axis of the foam blank 70 with two further flexible spines 50 located spaced apart and symmetrically on either side of the midline axis. On the bottom 71 of the foam blank 70 a single flexible spine 50 runs the length of the foam blank 70 form the nose 76 to the tail 77. Located adjacent the nose 76 and extending a distance along the bottom 72 of the foam blank 70 a further two flexible spines 50 reinforce the bottom of the foam blank 70 at the nose 76. Located adjacent the tail 77 and extending a distance along the bottom 72 of the foam blank 70 are two further sets of flexible spines 50, with a total of three flexible spines 50 on either side of the midline axis. These flexible spines 50 are used to reinforce the bottom 72 of the foam blank 70 at the location of where a surfer would place their feet.

Figure 40:
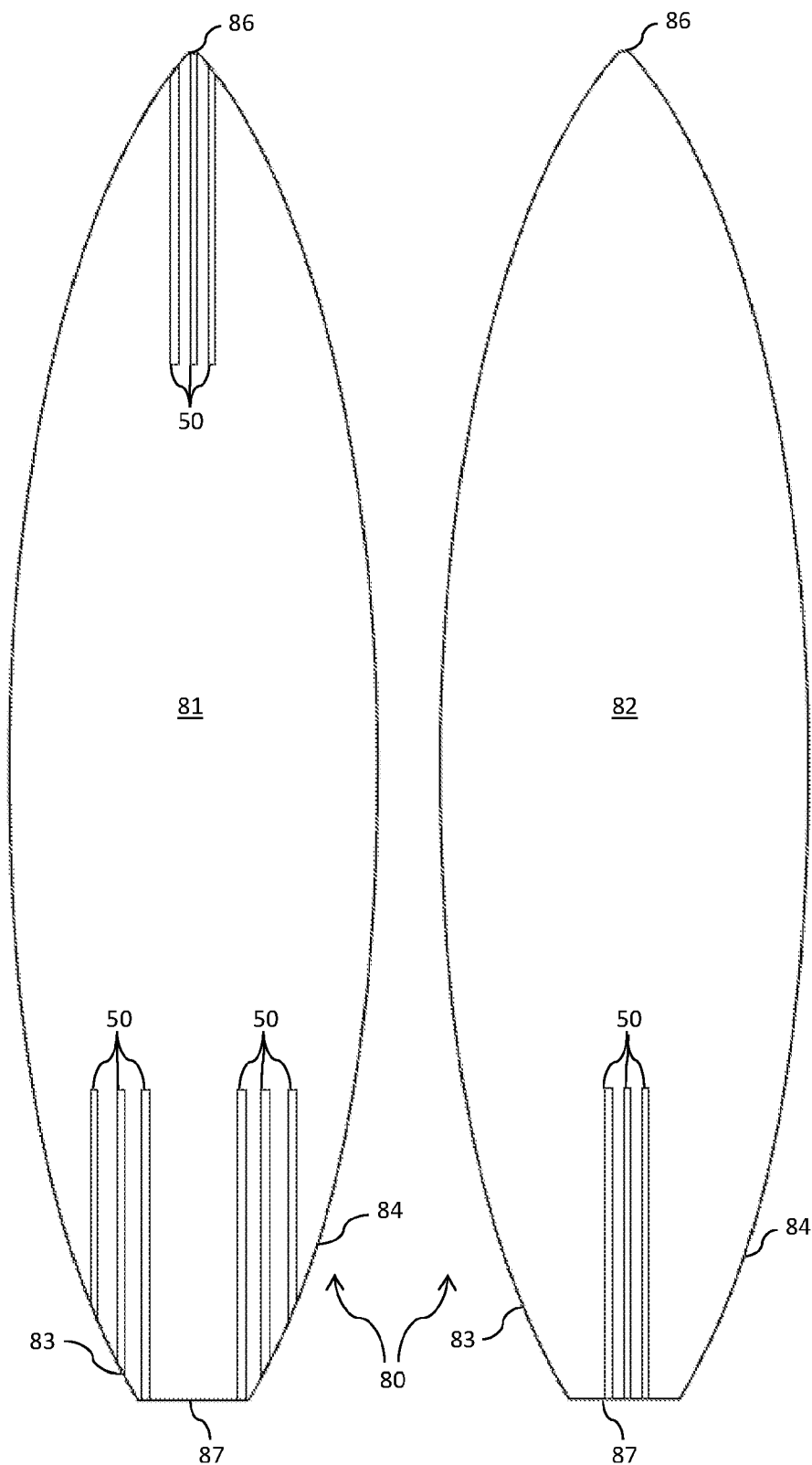

FIG. 40 illustrates a further exemplary combination of flexible spines 50 on the foam blank 80 for a surfcraft. In this embodiment the flexible spines 50 are only located adjacent and extending a distance from the nose 86 and the tail 87 on the deck 81. At the nose 86 three flexible spines 50 are located within respective recessed apertures 60, one running along the midline axis of the foam blank 80 and a further two symmetrically located on either side of the midline axis. At the tail 87 two sets of three flexible spines 50 are symmetrically located and fitted into recessed apertures 60 in the deck 81 and on either side of the midline axis. On the bottom 82 of the foam blank 80 a single set of three flexible spines 50 are located adjacent and extending a distance along the foam blank 80 from the tail 87.

Figure 41:
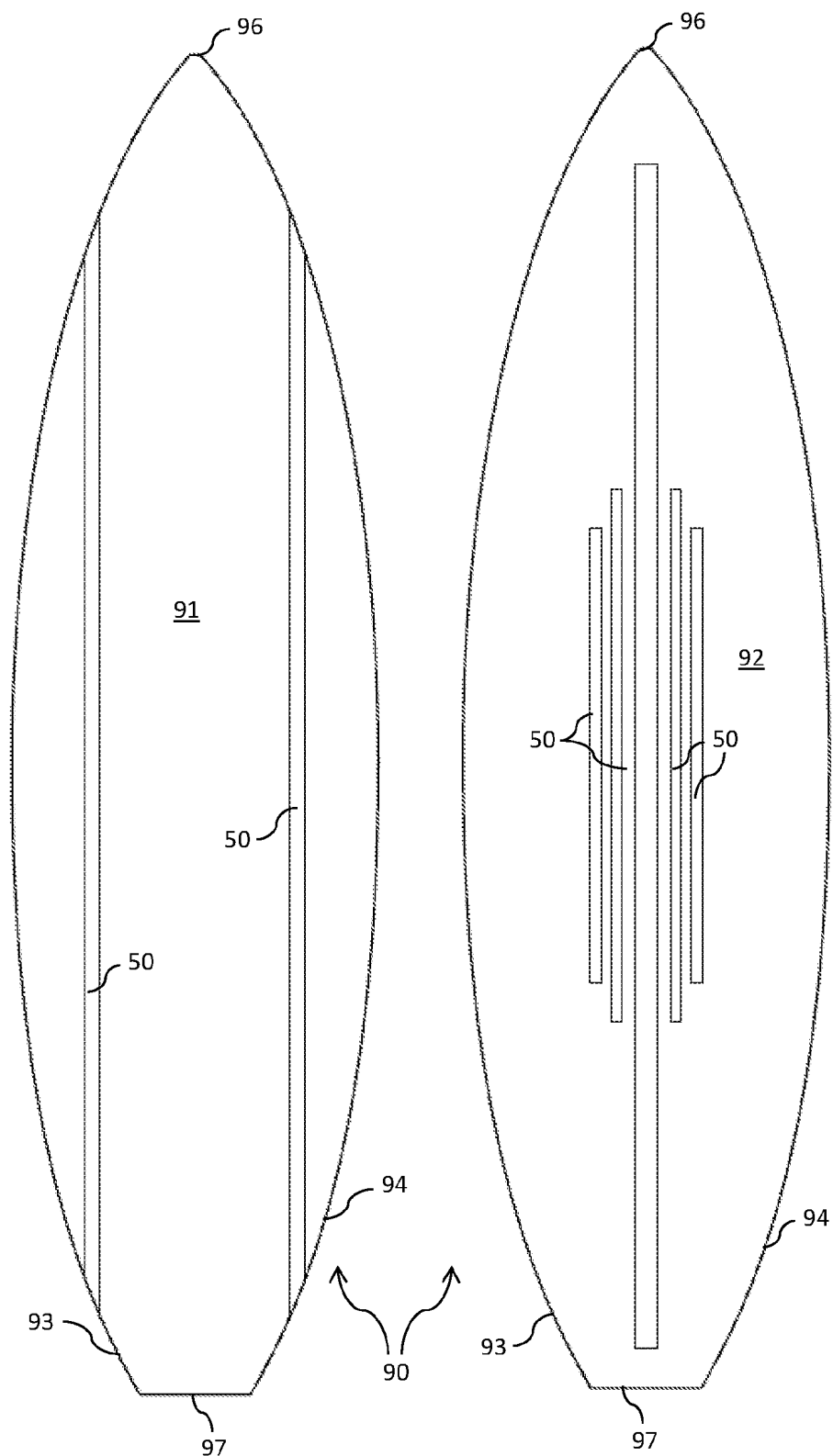

FIG. 41 shows a further exemplary embodiment of the present invention. In this embodiment on the deck 91 of the foam blank 90, two flexible spines 50 are located symmetrically on each side and a distance away from the midline axis of the foam blank 90 for a surfcraft. Both flexible spines 50 extend proximate the tail 97 to the nose 96 of the foam blank 90. On the bottom 92 of the foam blank 90 a centre flexible spine 50 runs substantially for the length of the foam blank 90 and along the midline axis of the foam blank 90. Two further sets of flexible spines 50 are located symmetrically on each side of the midline axis and extend a distance away from the centre of the foam blank 90 towards the nose 96 and tail 97.

Figure 42:
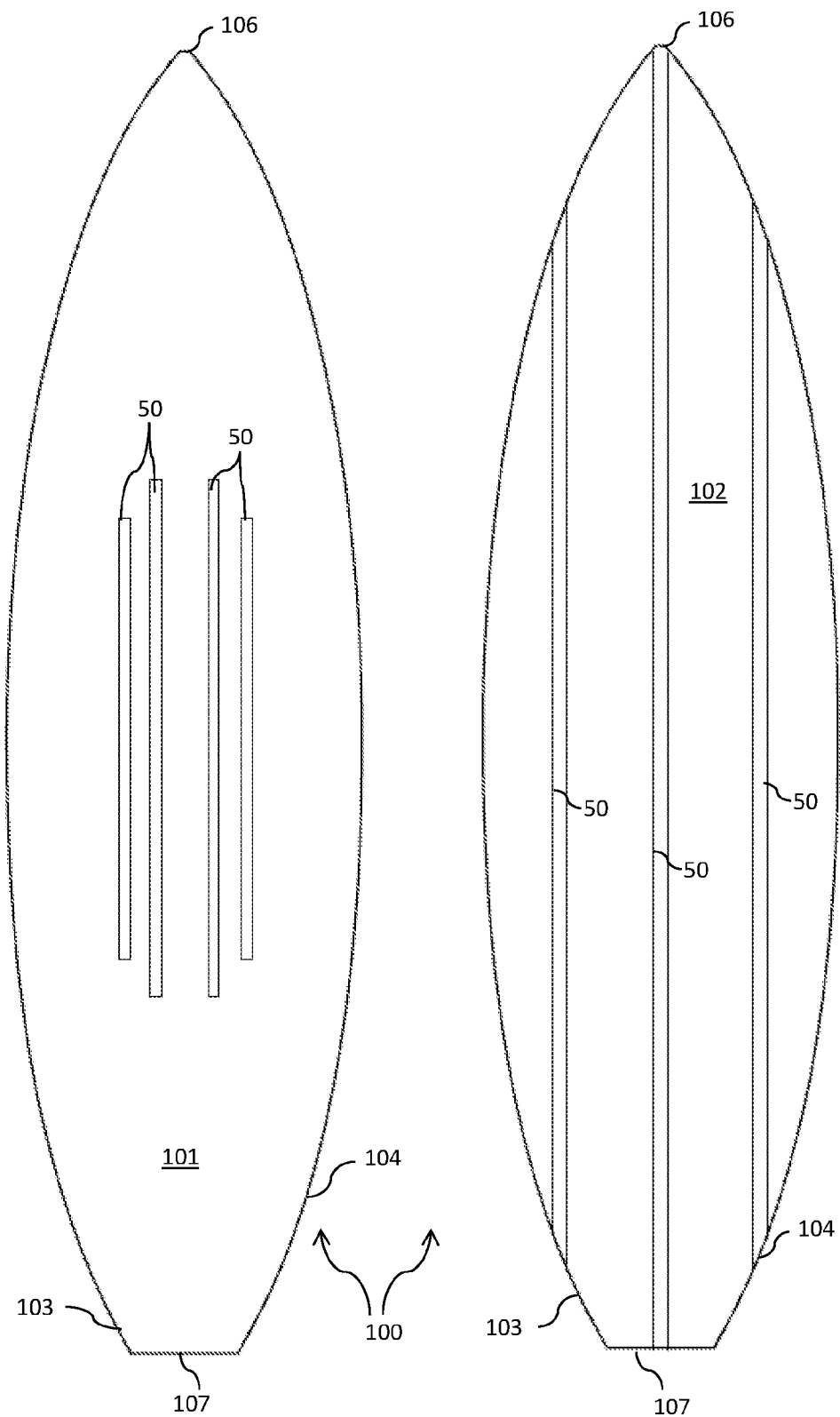

FIG. 42 illustrates a further exemplary embodiment of the present invention. The foam blank 100 has a combination of flexible spines 50 located within the recessed apertures 60 in the deck 101 and bottom 102. Like all other embodiments the foam blank 100 has a top or deck 101, bottom 102, rails 103, 104, a nose 106 and tail 107. In this embodiment like all previous embodiments the flexible spines 50 are installed in the top and bottom and extend a distance into the core 105 of the foam blank 100 for a surfcraft.

Figure 43:
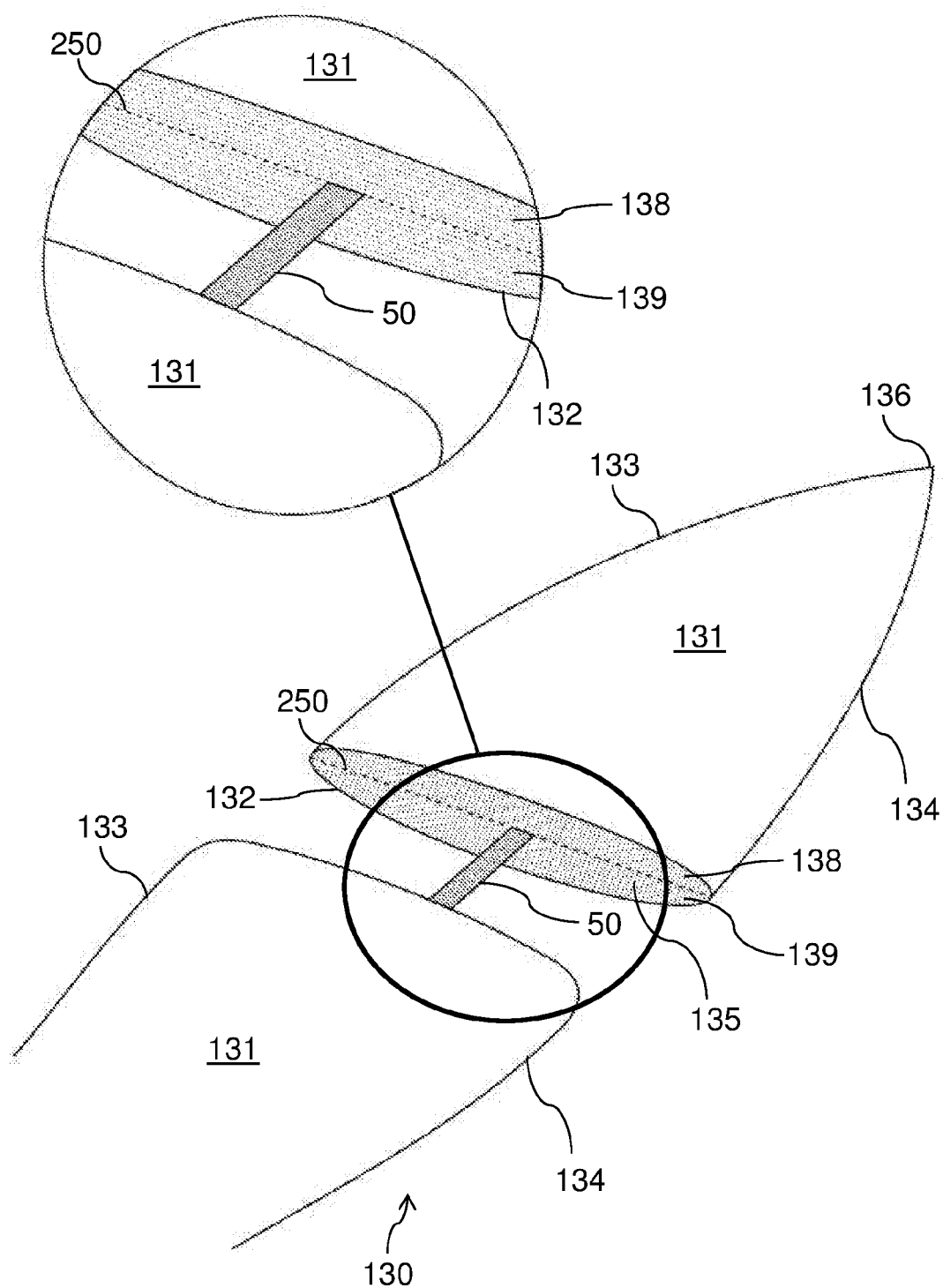
FIG. 43 illustrates a perspective sectional view of a foam blank in accordance with an embodiment of the present invention and further showing a detailed view of the section with the flexible spine exposed.

The present invention also provides a foam blank 130 for a surfcraft in accordance with a further embodiment. As illustrated in FIG. 43 the foam blank 130 is for a surfboard. The foam blank 130 has opposed top 131 and bottom 132 blank faces with a pair of shaped rails 133, 134 extending between the opposed top 131 and bottom 132 blank faces at blank face edges. A midline axis extends between a nose region 136 and a tail region 137 and divides the foam blank 130 into two substantially equal regions, each of which extend between the midline axis and the rail 133, 134 on sides respectively thereof. The top 131, bottom 132 and rails 133, 134 forms and an enclosed core space 135.

The foam blank 130 is cut into two sections through a plane 250 which passes horizontally through the foam blank 130 from the nose 136 to the tail 137. The two sections formed are the top section 138 and the bottom section 139. The top section 138 is formed between the deck or top face 131 and the cut face formed by the cutting plane 250. The bottom section 139 is formed between the bottom face 132 and the cut face formed by cutting plane 250. The cut faces of the top and bottom sections 138, 139 are located adjacent and opposing the cutting plane 250. The flexible spine 50 is inserted in between the top and bottom sections 138, 139 on the cut faces and along the midline axis passing between the nose 136 and the tail 137 of the foam blank 130.

The flexible spine 50 can be placed, fixed or retained on one of the cut faces of the top or bottom sections 138, 139 and along the midline axis of the foam blank 130. The flexible spine 50, the top section 138 and the bottom section 139 of the foam blank 130 are then bonded to reform the unitary foam blank 130 with the flexible spine 50 located between the top and bottom sections 138, 139 and within the enclosed core 135 of the foam blank 130.

The embodiment provides a fibre-reinforced resin spine 50 which is inserted within the foam core 135 of the foam blank 130 of the surfcraft. The flexible spine 50 is bonded in between the two cut opposing faces of the foam blank 130 using an adhesive or a resin or the like. The adhesive, resin or the like, effectively re-joins the top and bottom sections 138, 139 along with the flexible spine 50 to form the unitary foam blank 130. The adhesive or resins may include epoxy resin, polyester resin and vinyl ester resin. More than one flexible spine 50 can be placed between the adjacent cut surfaces in any number of positions dictated by the required flex pattern desired by the user.

As described above, the flexible spine 50 is elastically deformable in that the flexible spine 50 will change in the shape or size due to an applied force such as the result of tensile (pulling) forces, compressive (pushing) forces, shear, bending or torsion (twisting). The flexible spine 50 is elastically deformable which means the deformation is reversible. Once the forces are no longer applied, the flexible spine 50 will return to its original shape.

The above embodiment is illustrated in FIGS. 43 to 53 and in its most general terms provides an improved surfcraft foam blank 130 and method of manufacturing the same which is suitable for riding waves. As shown in FIG. 44, the foam blank 130 is an elongated platform which is relatively light, but is strong enough to support an individual standing on them while riding an ocean breaking wave. As previously described a number of different surfboard blanks 130 are now available in the marketplace. For example, the typical surfboard blanks 130 are selected from the group consisting of polyurethane (PU) foam blanks, polystyrene foam blanks, expanded polystyrene (EPS) foam blanks, or extruded polystyrene foam blanks.

One of the main decisions when choosing a surfboard is its weight. A lighter board means more buoyant and floatable. Each type of foam can have different density levels depending on how much the material has been compressed. Typically EPS is the lighter of the two polystyrene options and polystyrene is lighter than polyurethane foam.

In order to insert the flexible spine 50 within the foam blank 130 the blank needs to be cut to form the top and bottom sections 138, 139. Any type of foam cutter can be used, for example a hot-wire foam cutter or saw can be used to cut along the horizontal plane 250 running the length of the foam blank 130 from the nose 136 to the tail 137.

FIGS. 46 and 48 show the foam blank 130 after being cut to form the two sections, the top 138 and the bottom 139. The top section 138 is formed by the deck or top face 131 and the first cut face 251 enclosing the foam core. The bottom section 139 is formed by the bottom face 132 and the second cut surface 252 enclosing the foam core. The first and second opposing adjacent cut surfaces 251, 252 are formed after the foam blank is cut. The cutting of the foam blank 130 forms two substantially equal sections 138, 139 such that the foam blank 130 is cut substantially in half. The flexible spine 50 extends substantially the length of the foam blank 130 between the nose 136 and the tail 137. The foam blank 130 can be cut through many different horizontal planes which cut the sections 138, 139 in to non-equal sized sections. Once again, the positioning of the flexible spine 50 is dependent upon the flex pattern requirements of the end user. As such, there are numerous different positions for the location of the flexible spine 50.

FIG. 47 shows the reformed or re-joined foam blank 130 with the flexible spine 50 located and bonded between the first and second sections 138, 139 to form the unitary foam blank 130.

Figure 49:
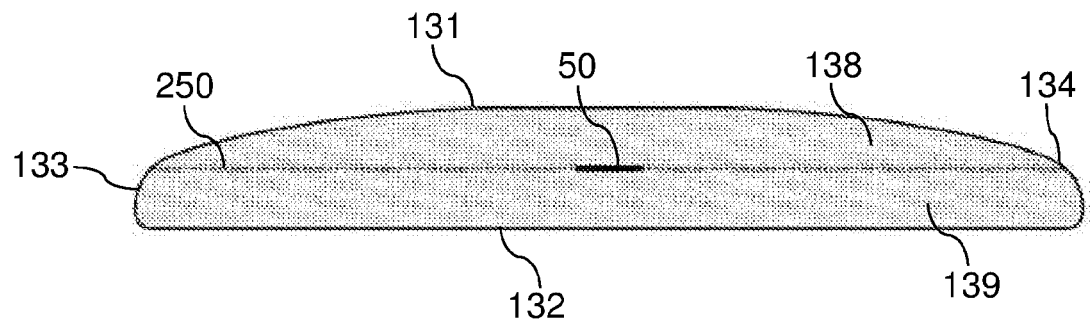
FIG. 49 shows a sectional view of the foam blank taken along line H-H of FIG. 44.
Figure 50:
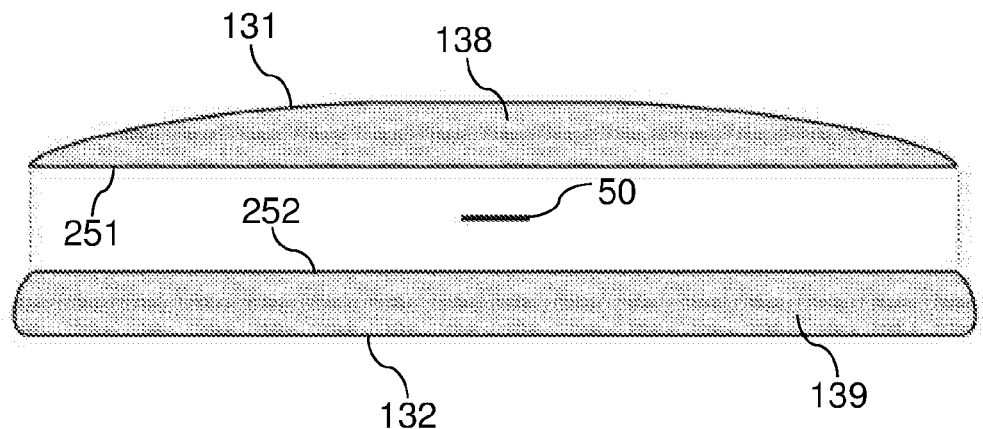
FIG. 50 shows an exploded cross-sectional view of the sectional view of FIG. 49.

FIGS. 49 and 50 show cross-sectional views taken along the line H-H of FIG. 44. FIG. 49 shows the reformed foam blank 130 with the flexible spine 50 located within and FIG. 50 showing the exploded view with the top and bottom sections 138, 139 and the flexible spine 50 prior to being reformed and bonded together.

FIGS. 51 and 52 show the top plan and side views of the section taken along the line I-I of FIG. 44 of the reformed foam blank 130. As shown in FIG. 51 the flexible spine 50 extends either side of the midline axis passing between the nose 136 and tail 137 of the foam blank 130. FIG. 52 shows the flexible spine 50 extends substantially the length of the foam blank 50 between the nose 136 and tail 137 and is positioned running parallel between the deck or top face 131 and the bottom face 132. Due to the flexible nature of the flexible spine 50, FIG. 52 also shows that the flexible spine 50 can be bent to provide a more dramatic rocker. A more dramatic rocker will make it easier to handle steep drops, facilitate tighter turns, but also slow the board down if it is heading in a straight line. The placement of the flexible spine 50 allows the surfcraft shaper to make a more precision or specific rocker in the surfcraft. The flexible nature of the flexible spine allows the board to be bent to accommodate the particular needs of the surfer. The versatility allows a multitude of design possibilities. While primarily being designed for the stringerless board the introduction of the flexible spine 50 in a board to adjust the rocker can also be achieved for a board with a stringer. The rocker of the board can be adjusted through the use of a bending mechanism such as a stringer bending frame.

Figure 53:
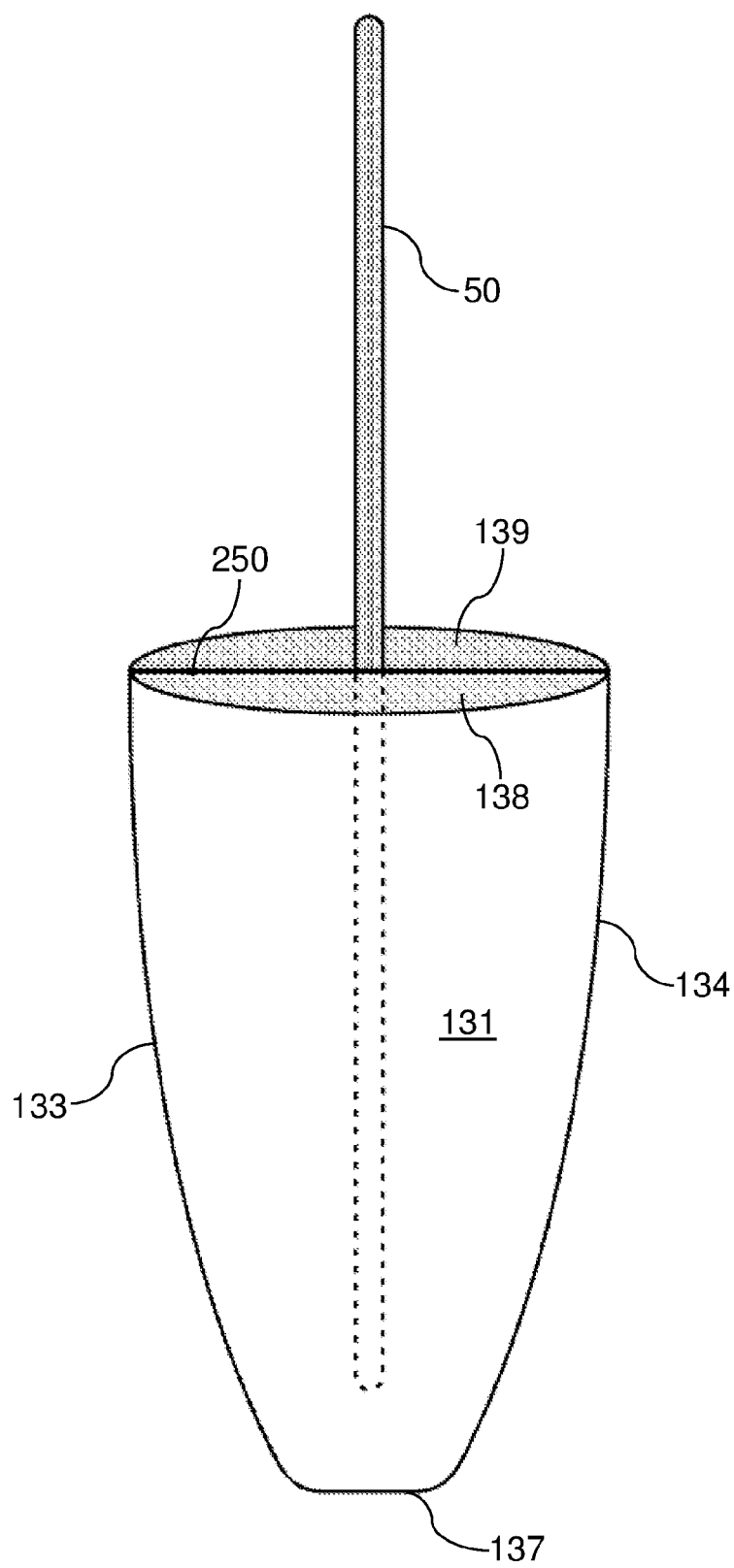
FIG. 53 shows a sectional perspective view taken along line H-H of FIG. 44 with half of the foam blank removed for clarity to show the flexible spine extending from within the remaining foam blank.

FIG. 53 shows another sectional view taken along the line H-H of FIG. 44 with the top half including the nose section removed to further show the location of the flexible spine 50 enclosed between top and bottom sections 138, 139 in the lower tail section of the foam blank 130.

Figure 54:
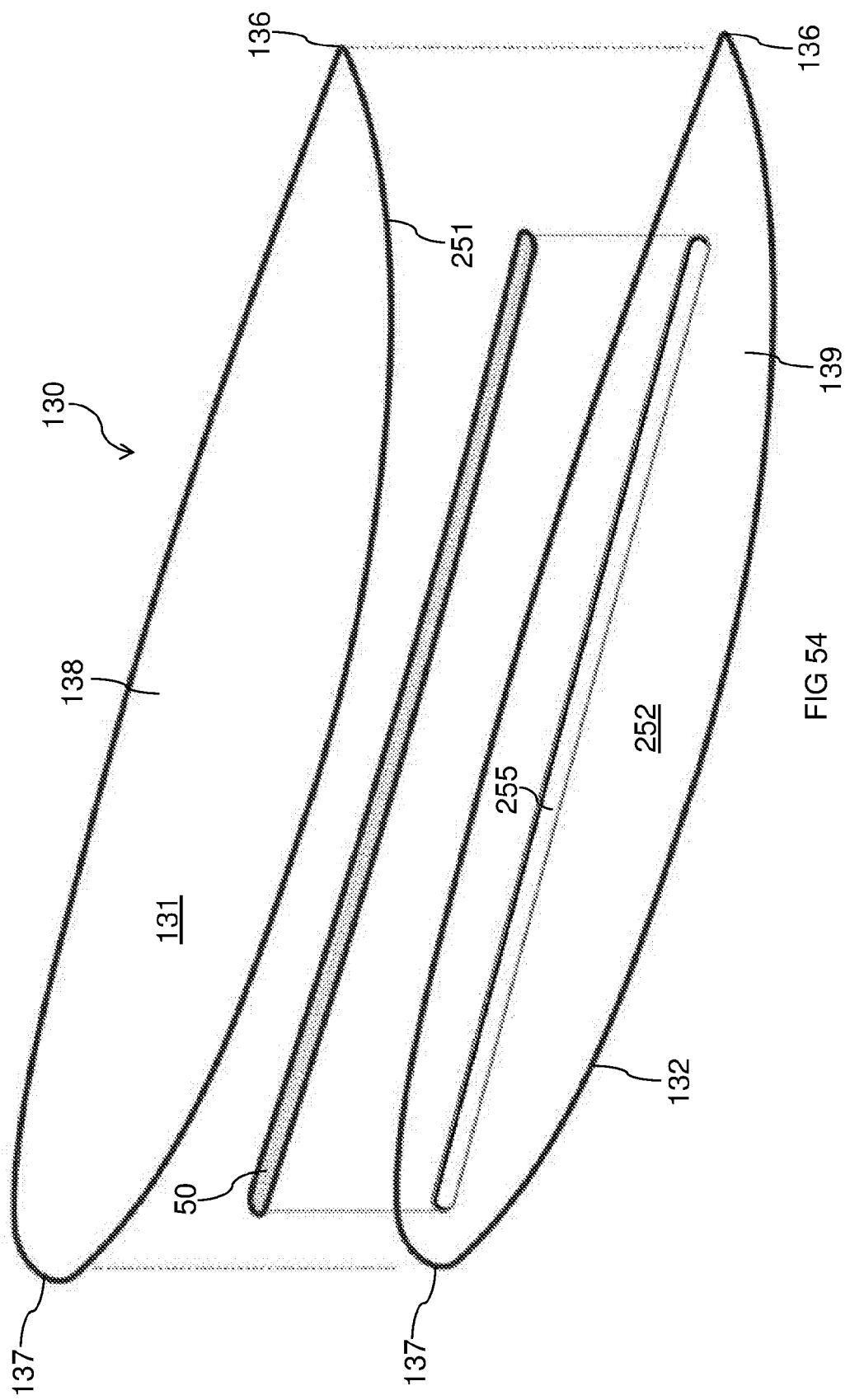
FIG. 54 shows a perspective exploded view of a further embodiment of the foam blank with a slotted aperture located in the bottom section of the foam blank with a flexible spine to be located within the slotted aperture.
Figure 55:
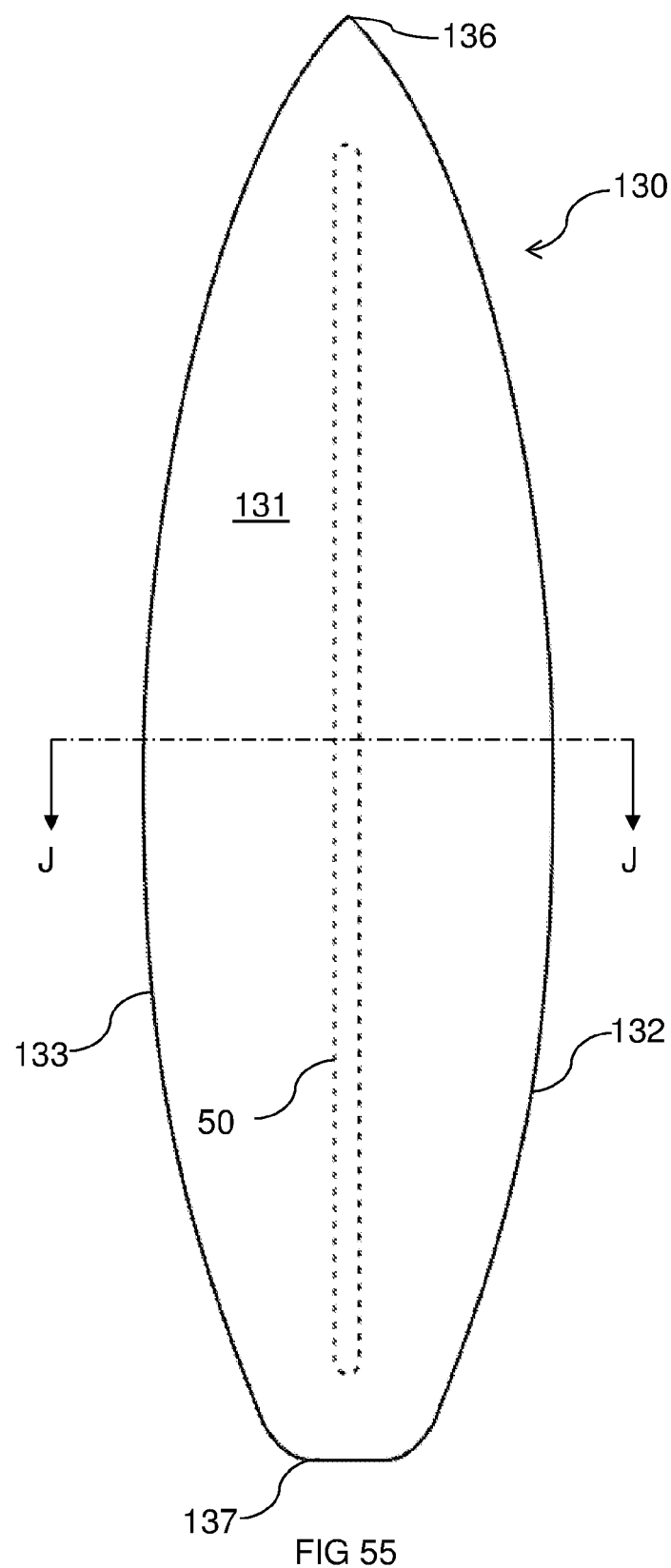
FIG. 55 illustrates a top plan view of the foam blank of FIG. 54.
Figure 56:
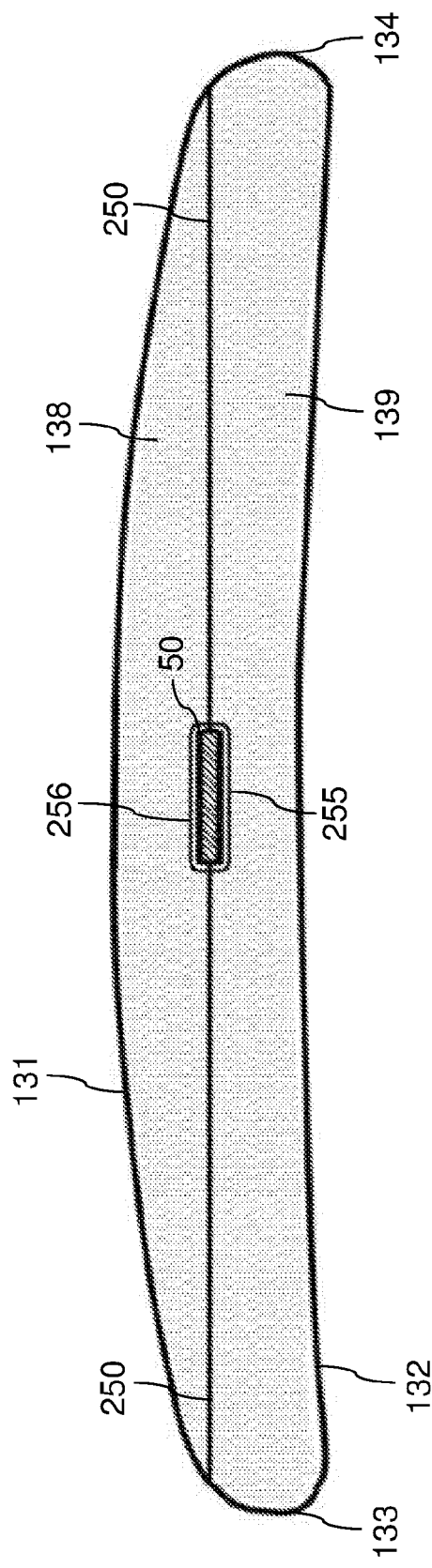
FIG. 56 shows a sectional view taken along line J-J of FIG. 55.

FIGS. 54 to 56 show a further embodiment of the present invention in which longitudinal slotted apertures 255 are utilised in one or both of the cut surfaces 251, 252 for receiving the flexible spine 50 therein. As illustrated in FIG. 54, the longitudinally extending slotted aperture 255 is located within the second cut surface 252 and extending along and either side of the midline axis passing between the nose 136 and tail 137 of the foam blank 130. The slotted aperture 255 is shaped to correspond substantially to the shape of the flexible spine 50. Therefore the shape, depth, length and width of the slotted aperture 255 will vary dependent upon the corresponding flexible spine 50. Likewise, more than one aperture 255 may be located in the second cut surface 252 or the first cut surface 251 to provide for more than one flexible spine 50.

Each slotted aperture 255, 256 has a depth which extends into the core 135 of each or one of the first and second sections 138, 139 of the foam blank 130. That depth depends upon the depth or thickness of the flexible spine 50 and as discussed below the position of the slotted aperture 255, 256.

The depth of the slotted aperture 255 can also vary dependent upon if only one or both cut surfaces 251, 252 are to be slotted. For example, FIG. 56 both the first and second cut surfaces 251, 252 have a longitudinally extending slotted aperture 255, 256 the depth of the slotted apertures 255, 256 will typically equate to half of the depth or thickness of the flexible spine 50. This means that during manufacture the flexible spine 50 when fixed into the slotted aperture 255, the flexible spine will sit in the slotted aperture 255 and above the level of the second cut surface 252. To reform the unitary foam blank 130 the top section 138 is placed over and encloses the flexible spine 50 within the core of the foam blank 130. Alternatively, the flexible spine 50 can be fixed into the slotted aperture 256, the flexible spine will sit in the slotted aperture 256 and above the level of the first cut surface 251. To reform the unitary foam blank 130 the bottom section 139 is placed over and encloses the flexible spine 50 within the core of the foam blank 130. In this configuration the corresponding slotted apertures 255, 256 are located in a mirrored image of each other. For example, the slotted aperture 255 in the second cut surface 252 is a reflected duplication that appears in the first cut surface 251 as slotted aperture 256, but is reversed in the direction perpendicular to the horizontal cut plane 250.

In a further alternate embodiment only one slotted aperture 255 or 256 may be routed into the first or second cut surfaces 251, 252. In this embodiment the depth of the slotted aperture 255 or 256 will equate to substantially the same depth or thickness as the flexible spine 50. This means that when the flexible spine 50 is fixed into the slotted aperture 255 or 256, the top of the flexible spine 50 will sit flush with the first or second cut surface 251, 252. To reform the unitary foam blank 130 the section 138, 139 without the slotted aperture 255, 256 is placed over and encloses the flexible spine 50 within the slotted aperture 255, 256 in the section 138, 139 of the foam blank 130.

FIG. 56 shows a sectional view taken along the line J-J of FIG. 55 showing the two longitudinally extending slotted apertures 255, 256 positioned in each cut surface 251, 252. The top and bottom sections 138, 139 of the foam blank 130 are separated along the cutting plane 250, which cuts the two sections 138, 139 substantially in half. In some embodiments the cutting plane 250 can be located more into one section 138, 139 than the other, therefore allowing the position of the flexible spine 50 to be varied within the core 135 of the foam blank 130. As previously discussed the position of the flexible spine 50 within the core 135 of the foam blank 130 can increase the physical strength and durability of surfcraft produced from the foam blank 130. It was also found that by using the flexible spine 50 has improved surfcraft performance through optimising flex. By controlling the flex pattern of foam blanks 130 (the core of the surfboard) will ultimately affect the way a surfcraft flexes and surfs.

While the above embodiments have been illustrated it should be understood that the present invention can be implemented in a number of different configurations to suit the most skilled or novice surfer. The different positioning options for the flexible spine 50 are summarised by the advantages provided by the respective locations on the foam blanks. For example, when applied longitudinal (lengthways of the foam blank) the flexible spine 50 can be applied to the foam blanks deck, bottom or both. In smaller foam blanks for wave boards compression is often an issue and therefore the flexible spine 50 can be located on the deck. In foam blanks for surfboards for larger waves, breakage often occurs on the bottom of the board therefore a flexible spine 50 is a good option to add flexural strength.

When the flexible spines are located on the rail of the foam blank (FIGS. 12 and 13) they create a frame around the foam blank which controls twisting, therefore helping to provide the foam blank with more responsiveness. This is particularly appealing as an option for surfboards that do not have a traditional stringer (such as EPS boards). When the flexible spine 50 is applied across the width of the foam blank they provide both added rigidity and strength. Likewise when the flexible spines 50 are placed just inside the rails this provides the ability to fine tune the strength and flex of the foam blank for a surfcraft.

When the flexible spines 50 are placed in sectioned lengths this provides for directional flex wherever strength and flex may be desired. An example in this regard is on the tail of the surfboard, where the flexible spines 50 are inserted into the recessed apertures 60 on the deck to provide compression strength under the area where most pressure is applied 'heal and toe'. In addition to compression strength this positioning would create more stiffness in the tail which is also beneficial in creating more drive out of the surfboard. Therefore, achieving flex in different areas of the surfboard to suit specific surfers and surf conditions.

As also described above the flexible spine 50 can be utilised in conjunction with a traditional PU blank with a timber stringer 11 or high density foam stringer, for example, an EPS blank with a high density foam stringer 11. The flexible spine 50 will simply further reinforce the blank and add structural strength (a beneficial option for big wave boards). It can also be used in conjunction by positioning in smaller surface areas such as for tail strengthening. Currently for adding strength to tails, board manufacturers are using laminated materials such as, but by no means limited to carbon, Innegra, Basalt, polypropylene (PP) and Kevlar. The flexible spine 50 offers a much more effective alternative and is effectively part of the foam blank core rather than a deck lamination. The flexible spine 50 can also be used in combination with surface laminations such as composite skins such as timber style skins and aero-space composite reinforcement skins, woven fabrics such as carbons, PP (Polypropylene) Basalt, Innegra, Aramid, multi-direction weaves, general fibreglass, S2 glass and also non-woven fabrics (both uni and multi-directional utilising reinforcement fibres such as PP (Polypropylene), carbon, Innegra, Basalt and Aramid.

With conventional stringer boards the rocker shape is determined by the placement of the stringer and is not easily changeable after the stringer has been installed. Typically the foam blank comes with a particular rocker that the shaper can alter a bit, but not drastically. A more dramatic rocker will make it easier to handle steep drops, facilitate tighter turns, but also slow the board down if it is heading in a straight line.

The rocker manufactured into the blank when you buy it is referred to as natural rocker, and may be changed through the shaping process only if the foam blank is thick enough to accommodate such changes. Most of today's "close tolerance" foam blanks are generally too thin to make major bottom rocker adjustments. However, minor changes can be made, particularly in the tail and nose. In most cases, rocker is adjusted by moving the board's template forward or backward until the desired rocker shape "fits" into the foam blank, and foam from either end of the foam blank is removed until the endpoint rocker measurements are reached. The endpoint rockers are then blended into the middle of the foam blank's natural rocker, minimizing the possibility of creating flat spots and abrupt transitions in the rocker that create turbulence and drag.

The present invention through the placement of the flexible spines 50 allows the surfcraft shaper to make a more precision or specific rocker in the surfcraft. The flexible nature of the flexible spine 50 allows the board to be bent to accommodate the particular needs of the surfer. The versatility allows a multitude of design possibilities. While primarily being designed for the stringerless board the introduction of the flexible spine 50 in a foam blank to adjust the rocker can also be achieved for a foam blank with a stringer. The rocker of the board can be adjusted through the use of a bending mechanism such as a stringer bending frame.

In the present invention in relation to bonded or bonding and in particular, in relation to surfcraft manufacturing, we are referring to the ability of two different parts of the craft to be bonded together. Certain materials have a chemical bond whereas others require a mechanical bond (for example a product may need to be sanded to create groove marks to help resin etch in and hold/bond better). The flexible spine 50 is manufactured as a composite material that bonds very well with the existing resins used for surfcraft manufacturing. The flexible spine 50 has been designed to be user friendly and purpose built for working with typical surfboard manufacturing materials.

The flexible spine 50 can be utilised to provide the foam blank for a surfcraft with an enhanced aesthetic to provide a user or surfer with a unique designed board. The flexible spine 50 can be provided in a range of popular colours which can match common logos, fins plugs and leash plugs used by the market for colour syncing. The design is further enhanced due to the use of flexible spines 50 of different widths, lengths, thicknesses and weights for complete compatibility with the surfboard manufacturer and surfers needs. They are further enhanced by the apertures in the flexible spine which can provide a further visual aesthetic which is unique to the flexible spine 50. Given that the flexible spine 50 is bonded underneath the product there are no traces of glue ups being visual under on top or around the flexible spine 50. This is different to existing timber stringers placed in foam blanks where the resin or foam adhesive is visual both on the sides and above the stringer. The flexible spine 50 is recessed into or within the core of the foam blanks. When only utilised in the surface faces in slotted apertures the foam blank does not need to be cut fully through either vertically or horizontally such as existing timber stringers. However when the flexible spine 50 is located within the core of the foam blank the foam blank is cut in half or wherever required by the end user.

By way of example only the flexible spine 50 may be offered in any one or more of the following variations:
1. One or two is a soft flexible spine;
2. Three to five is a medium flexible spine;
3. Six to eight is a stiff flexible spine; and
4. Nine or ten is a very stiff flexible spine.

Based on the composition of materials in the flexible spine 50 determines the flex pattern of the actual flexible spine 50. Therefore whilst the flexible spine 50 positioning will help determine flex control in the board, the actual composition of the flexible spine 50 plays an important role also. For example, two flexible spines 50 in exactly the same position on the surfcraft 20, but with different compositions, will give a different flex outcome.

The present invention also includes methods of manufacturing a surfcraft from a foam blank with at least one flexible spine located within the core or on one of the external surfaces and extending into the core of the foam blank or any combination thereof.

As described previously the surfcraft can be any one of the group consisting of a surfboard, a bodyboard, a stand up paddleboard (SUP), a surf ski, a windsurfing board, a kiteboard, surf lifesaving craft such as a nipper board and a racing mal, a skim board and a wakeboard. For most of the above the typical surfcraft has a rigid polyurethane foam core with an outer shell of fiberglass cloth and polyester resins. In comparison the bodyboards have a rigid polyurethane foam core and bottom skin or slick material is typically a high density polyethylene (HDPE) with the deck material and rails can be made from a closed cell or crosslinked polyethylene or polypropylene material or an open cell foam material.

The method of manufacturing of the foam blank remains comparable for both a bodyboard foam blank and the surfcraft foam blank, it differs only in how the surfcraft are finished, as described below.

For the surfcraft blank, the first step is to provide the desired surfcraft foam blank. As described above a number of different surfcraft blanks are now available in the marketplace. For example, the typical surfcraft blanks are selected from the group consisting of polyurethane (PU) foam blank, polystyrene foam blank, an expanded polystyrene (EPS) foam blank, or extruded polystyrene foam blank.

Once the type of foam blank has been chosen the next step is to shape the blank. A rough outline of a desired board shape is cut from the blank and that outline is machined, hand planed and then sanded. As described above at least one and/or a plurality of flexible spines 50 can be located in a number of different positions around and within the core of the foam blank. By way of example only, when located within the core of the foam blank the first step is to cut the foam blank along the cutting plane 250. This can be by either hand saw, or preferably by a hot-wire foam cutter. The flexible spine 50 is then inserted and/or fixed onto the surface of one of the two sections 138, 139 at approximately the midline axis of the foam blank 130. Alternatively, a longitudinally extending aperture 255, 256 may be routed into one of the cut surfaces 251, 252 of the sections 138, 139 and the flexible spine inserted and/or fixed within the aperture 255, 256. In order to reform the unitary blank the two sections 138, 139 and the flexible spine 50 are bonded to reform the core of the surfcraft blank 130. The flexible spine 50 is effectively bonded between the two sections 138, 139 within the core 135 of the surfcraft blank 130.

When the flexible spine 50 is located around the core of the foam blank 20, 130 the surface into which the flexible spine 50 is to be inserted will be routed to provide the longitudinal aperture for receiving the flexible spine 50 therein.

With the flexible spine 50 installed within the core 135 or around the core 135 of the surfcraft blank 130 the shaped blank 130 is then coated with various layers, finishing with a glass fabric layer covered with resin for structural support. This includes laminating the foam blank with fibreglass and resin to form a hard outer shell and then applying a filler coat of resin to fill any surface imperfections left after the laminating step. The next step is the fitting and attaching of the required fins and the leash rope. Finally after sanding, cleaning the surfcraft and applying any decals and/or a colour graphic to the surfcraft a final coat of a gloss resin is applied followed by a light polishing to complete the surfcraft.

For the bodyboard blank 140, the above final steps differ in that the bodyboard blank 140 is shaped to the desired or required shape and a final plane and sand is performed. The bottom, deck and rails of the bodyboard blank 140 are then laminated with a skin or slick material on the bottom and an open or closed cell foam material on the deck and rails. The next step is to fit and attach the leash rope connector and finally, applying any decals and/or a colour graphic to the bodyboard.

Given the varying requirements for different weight, style and ability of the user or surfer the flexible spine 50 comes in a number of varied cross-sectional shapes, end profiles, passage or aperture shapes and configurations, lengths, widths and thickness or depths. This allows for the customising of the foam blank for a surfcraft to suit the user or surfers requirements.

The longitudinally extending apertures for receiving the flexible spines 50 therein are predominantly a C-shaped recess other shapes are not excluded by the present invention. For example, the aperture could have rounded walls to accommodate a substantially cylindrically shaped flexible spine 50. Alternatively the recess or aperture may be formed or shaped as any quadrilateral or triangular shape for receiving a complementary shaped flexible spine 50. Typically the ends of the flexible spine 50 are curved or semicircular, however the ends could simply be squared off or any other shape.

While the flexible spine 50 has been illustrated as extending for substantially the length of the foam blank 130, 140, other embodiments can include where the flexible spine 50 extend the complete length of the foam blank 130, 140. Also, due to the variable length of the flexible spine 50 shorter spines 50 may be used and placed in and around the foam blank 130, 140 to suit the particular requirements of the user.

ADVANTAGES

It will be apparent that the present invention relates generally to an improved foam blank for a surfcraft suitable for riding waves and in particular, to a fibre-reinforced flexible spine for use within the foam blank or core of surfboards, bodyboards and surfcraft.

The present invention has been designed due to the large, constantly varying and reverse bending and twisting stresses in surfboards and the known limitations of the current types of foam blanks for those boards. Boards can flex unduly and may often break and in other aspects do not provide the performance demanded by skilled riders and spectators.

The present invention came about due to a long felt need in the marketplace to increase the physical strength and durability of the foam blank for a surfcraft by improving the tensile and compressive strength in a new and innovative manner. It was also found that by using the flexible spine improved surfcraft performance through optimising flex. By controlling the flex pattern of foam blanks (the core of the surfboard) will ultimately affect the way a surfcraft flexes and surfs.

Therefore the flexible spine technology is mutually beneficial to both epoxy and PU surfboard constructions and 'revolutionise' existing methods to achieve both structural strength and optimise flex based performance.

The present invention through the inventive use of the flexible spine in and around the foam blank provides a number of distinct advantages over the prior art, and in particular:

1. Increased overall strength and durability of the surfcraft. This is provided:

a. Through increased compression and tensile strength through distributing load and energy. For example, surfboards for large waves require more structural integrity;
b. Increased unidirectional and overall axial (multi-directional) strength;
c. Reduced structural fatigue, pressure dents and snapping/breaking, hence adding to the lifespan and value of the surfcraft; and
d. The strengthening of a surf craft and making it less likely to fail will certainly improve certain safety elements related to surfing. For example, losing a board due to it snapping in half can leave a surfer in a compromising position, forced to swim to safety in potential treacherous conditions.

2. Controlled Flex Pattern. Shapers believes this is the future of surfing, governing how and when a board flexes which therefore helps determine the feel of the board as important factors such as speed and manoeuvrability can be controlled. The flexible spine allows the shaper to develop a controlled flex pattern to suit the particular and varied requirements for surfcraft.

By way of example only the following effects of flex pattern in relation to how a surfboard flows through a wave and manoeuvres are noted below:
Lighter surfers may prefer more flex as the surfboard is easier to turn.
Heavier surfers may prefer a stiffer flex pattern to give them more drive and a flex pattern that responds effectively to their power.
Performance surfers may like more flex in certain waves for a dynamic and lively feel (acceleration and flex assist in performing and completing manoeuvres).
Those wanting more speed and power may prefer less flex.
Surfers in powerful and/or choppy rough conditions may prefer a stiffer flex pattern that ensures more directional control and stability.
Stiffer flex creates faster response times however is less forgiving (therefore experienced surfers may like a stiffer feel to increase reaction times in and less experienced surfers more flex for a for forgiving feel).
Big wave surfers may prefer minimal flex and extra weight so they can punch through the waves with speed, power and predictability.

3. Dynamic Flex Pattern. The flexible spine will flex to absorb force, distributing and storing energy and then respond back to its natural position. This response (or rate of return) provides a whip effect, creating acceleration and generating drive. The flexible spine is designed to flex in unity with the surfer and the wave, for example holding speed whilst going straight (minimal flex) and flexing when manoeuvring.

4. Light weight, high strength to weight ratio with excellent compression stability. The flexible spine can also be increased in weight for certain boards, for example, big wave boards and tow boards are often designed to have more weight.

5. Improving the Blank Core of Surfboards. The flexible spine changes the way surfboards flow through the water. This is also referred to as 'feel'. EPS Blanks are often referenced as having a 'corky feel' meaning they sit above the water more than traditional PU blanks which can make them vulnerable to choppy/bumpy/windy conditions. It is also often claimed that they flex too much. The flexible spine helps to mitigate and even eliminate this feel by advantageously improving the structural strength of EPS foam and therefore giving it a totally different feel and surfing potential. Even lower grade EPS blanks with a low foam density can be made structurally sound with the flexible spine, which moreover can be advantageous for small wave boards where light weight is desired through lower density surfboards.

6. Rocker Versatility. The flexible spine has elasticity and can be bent to fit the shape of any surfcraft rocker (Curve). Once a surfcraft is shaped, the flexible spine is installed to fit the exact rocker of the board. In this respect, it works with the board design and not against it. It also puts surfcraft shapers in control of their surfcraft, unlike traditional stringers where the stringer is applied by the foam manufacturer and its shape cannot be modified. The flexile spine can even be moulded and reshaped to suit large production runs of surfcraft where an accurate and consistent rocker is required.

7. Improvement to Surfcraft Manufacturing Speed and Efficiency. A majority of surfcraft are shaped through CNC Machines and or hand shaping. Each method is slowed down by the cutting off of the timber stringer. It also creates timber dust that can cross contaminate other areas of the surfcraft. Shaping boards without a stringer removes these issues and then after shaping, allows the surfcraft manufacturer to secure the exact rocker shape using the flexible spine. The emphasis here is on reinforcing rocker (surfcraft curve) after the shaping process rather than before it.

8. Strength through Variation in Installation Methods. The "Beam Effect". An example here is having symmetrical longitudinal strength achieved by installing the flexible spine for the full length of the board on both the deck and the bottom of the surfcraft. Further reinforcement can them be achieved by a 'beam effect', this simply involves drilling a hole through the foam blank at various intervals so as to connect the bottom and deck flexible spines with resin.

The advantages provided by the present invention are directly related to Hooke's Law of elastic potential energy. This elastic potential energy is then transferred into kinetic energy which is beneficial to surfing (acceleration, drive, speed, power and flow). Energy is simply the capacity to do work. Usable energy is divided up into potential energy and kinetic energy. Elastic potential energy is potential stored energy (PE) such as in a coiled spring. It is the energy an object possesses due to its extension produced by proportional load, and the distance that an object is stretched/compressed/twisted away from the equilibrium position. Kinetic energy (KE) is the energy of motion and hence, the energy that an object possesses due to its motion. The flexible spine of the present invention is set to the rocker of the board (equilibrium position), when the board engages in a manoeuvre the rocker of the board extends away from its equilibrium position and creates elastic potential energy. This potential energy is stored in the fibres of the flexible spine which then return the surfcrafts rocker back to it equilibrium position with force. This force is what generates speed and drive and power and flow (KE).

Maximising surfcraft efficiency or the way the board moves through water is another advantage of the present invention. The flexible spine of the present invention helps a surfer achieve greater output from less input. For an example, a lighter amount of force required through the bottom turn to create more acceleration for the top turn. Creating a more powerful response from less applied energy will help surfers maximise their potential outcome. Maximising efficiency is also an important way to minimise surfer fatigue and maintain energy for longer periods.

The controlled flex pattern is critical to performance of any surfcraft. The present invention provides flex-based performance by providing boards that are lively, but they are predictable. The rate at which the board flexes is important and the rate at which the board responds back to its natural shape is equally important. The flexible spine of the present invention manages all of the above.

It cannot be overstated the importance of a performance surfcraft to be able to change shape (distort) and then return back to its optimal form (shape) with force. The spine flexing is loading up on energy (this load process is 'storing energy'=elastic potential energy). When the board responds back to its natural shape (the boards rocker curve), this stored energy is converted to kinetic energy (the energy of motion). In simple terms, the surfcraft loads up on energy (potential) and then the board springs back with energy (kinetic). In surfing terms, speed, power, drive and flow, are all relevant.

Variations

It will be realised that the foregoing has been given by way of illustrative example only and that all other modifications and variations as would be apparent to persons skilled in the art are deemed to fall within the broad scope and ambit of the invention as herein set forth.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

(a) there is no requirement for the inclusion of any particular described or illustrated characteristic, function, activity, or element, any particular sequence of activities, or any particular interrelationship of elements;

(b) no characteristic, function, activity, or element is "essential";

(c) any elements can be integrated, segregated, and/or duplicated;

(d) any activity can be repeated, any activity can be performed by multiple entities, and/or any activity can be performed in multiple jurisdictions; and (e) any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The invention claimed is:

1. An apparatus for a surfcraft, the apparatus comprising:
   a foam blank defined by a top blank face, an opposed bottom blank face, and
   a pair of shaped rails extending between the opposed top and bottom faces at blank edge faces from a nose of the foam blank to a tail,
   the foam blank having a core between the opposed top and bottom blank faces and the rails,
   wherein a midline axis extends between a nose region and a tail region of the foam blank and divides the foam blank into two substantially equal side regions, each of which extend between the midline axis and the rail on sides respectively thereof,
   wherein at least one longitudinally extending recess is formed in any one or more of the top blank face, the bottom blank face, or the blank edge faces, wherein each recess extends into the core from the corresponding face of the foam blank and is defined by a recess depth and a recess width such that the recess width is greater than the recess depth; and
   at least one flexible spine disposed within the corresponding at least one longitudinally extending recess and bonded to be fixed therein, wherein each flexible spine is molded from a composition of fibers and resin using a continuous molding process that produces a uniform cross-section, wherein each flexible spine is defined by a top side, a bottom side, and peripheral edges joining the top and bottom sides such that a spine width associated with at least the top side is greater than a spine thickness associated with the peripheral edges.

2. The apparatus according to claim 1, wherein at least one of the recesses extend approximately from the nose to the tail in the top blank face or the bottom blank face or in both the top and bottom blank faces of the foam blank.

3. The apparatus according to claim 1, wherein at least one of the recesses extend along the midline axis of the foam blank in the top, bottom or the top and bottom blank faces of the foam blank.

4. The apparatus according to claim 1, wherein a plurality of longitudinally extending recesses are formed in any one or more of the top blank face, the bottom blank face or the rails of the foam blank and at least one flexible spine is located in each one of the recesses, the plurality of longitudinally extending recesses are positioned in any one or more of the following position in the foam blank:

a) at least two recesses are formed in any one or more of the top or the bottom blank faces of the foam blank, one of the at least two recesses being angled such that it extends from the nose region on one side of the blank to the tail region on the opposing side of the blank, the other one of the at least two recesses being angled from the opposing side nose region to the opposing side tail region such that the at least two recesses cross the midline axis which divides the foam blank into two approximately equal regions;

b) at least two recesses are formed in any one or more of the top or the bottom blank faces of the foam blank, the at least two recesses extending generally along the length of the foam blank from the nose region to the tail region and on opposing sides of the midline axis of the foam blank;

c) at least two recesses curve from the tail and adjacent the rail on opposing side regions towards the nose of the foam blank;

d) one of the plurality of recesses extend approximately from the nose to the tail in the top blank face, the bottom blank face or both the top and bottom blank faces of the foam blank and along the midline axis;

e) ones of the plurality of recesses are located in the top blank face, the bottom blank face or both the top and bottom blank faces of the foam blank in a position symmetrically either side of the midline axis and extending approximately from the nose to the tail, in a position symmetrically either side of the midline axis and extending a distance from the nose or the tail or both, in groups located symmetrically either side of the midline axis and extending approximately from the nose to the tail, in groups located symmetrically either side of the midline axis and extending a distance from the nose or the tail or both; and f) pairs of the plurality of recesses are located symmetrically spaced from the midline axis and extend a distance measured from a line passing through a midpoint on the midline axis of the foam blank and along the top blank face, the bottom blank face or top and bottom blank faces, and the distance each of the pairs of recesses extend from the mid-point on the midline axis of the foam blank varies in increasing or decreasing lengths.

5. The apparatus according to claim 1, wherein the at least one longitudinally extending recess includes two recesses located in each rail of the foam blank that extend for approximately the length of each rail.

6. The apparatus according to claim 1, wherein the fibers of the flexible spine composition are selected from the group consisting of: fiberglass fibers, S-glass fibers, aramid fibers, polyolefin fibers, and any combination thereof, and the resin of the flexible spine composition is selected from the group consisting of: Vinyl Ester resins, Epoxy resins, and Polyester resins.

7. The apparatus according to claim 1, wherein the composition of fibers and resin in the at least one flexible spine has a chemical structure that bonds with the foam blank and the resin ensures a strong unified apparatus with a longer life span while providing a desired flex pattern and strength properties to provide an enhanced performance characteristics to suit an end user.

8. The apparatus according to claim 1, wherein the continuous molding process is a pultrusion molding process whereby the fibers are saturated with a liquid polymer resin and then formed and pulled through a heated die to form the corresponding flexible spine.

9. The apparatus according to claim 1, wherein the at least one flexible spine has an elasticity that allows the at least one flexible spine to fit a shape of a desired surfcraft rocker and to maintain the shape.

10. The apparatus according to claim 9, wherein when the at least one flexible spine is bent to fit the shape of the surfcraft rocker and when the surfcraft engages in a manoeuvre the rocker of the surfcraft extends away from an equilibrium position and creates elastic potential energy, the potential energy is stored in the fibers of the flexible spine which then return the surfcraft rocker back to it equilibrium position with a force, the force generates speed, drive and power for the surfcraft.

11. The apparatus according to claim 1, wherein the at least one flexible spine is positioned in relation to the foam blank to optimize flex, increase physical strength, and increase durability of the apparatus, the at least one flexible spine improving tensile and compressive strength of the apparatus.

12. The apparatus according to claim 1, wherein the surfcraft is selected from the group consisting of:

surfboards, bodyboards, stand up paddleboards, surf skis, windsurfing boards, kiteboards, surf lifesaving crafts, skim boards, and wakeboards, wherein the surf lifesaving crafts include nipper boards and racing mals.

13. The apparatus according to claim 1, wherein the foam blank is selected from the group consisting of:

polyurethane (PU) foam blanks, polyethylene foam blanks, polypropylene foam blanks, polystyrene foam blanks, expanded polystyrene (EPS) foam blanks, extruded polystyrene foam blanks, plant-based foam blanks, and algae-based foam blanks.

14. The apparatus according to claim 1 wherein each flexible spine sits flush with a surface area of the foam blank that surrounds the corresponding recess within which the flexible spine is disposed.

15. The apparatus according to claim 1 wherein the fibers of the flexible spine composition are glass fibers.

16. The apparatus according to claim 1 wherein the fibers of the flexible spine composition are unidirectional in relation to a length of the flexible spine and the midline axis of the foam blank.

17. The apparatus according to claim 1 wherein the resin of the flexible spine composition is a vinylester resin.

18. The apparatus according to claim 1 wherein the peripheral side edges of the at least one flexible spine that are parallel with the midline axis are radiused side edges.

19. The apparatus according to claim 1 wherein the at least one flexible spine is bonded within the corresponding at least one longitudinally extending recess using a chemical bonding agent.

20. The apparatus according to claim 1 wherein the at least one flexible spine is elastically deformable.

21. An apparatus for a surfcraft, the apparatus comprising:
a stringerless foam blank defined by a top blank face, an opposed bottom blank face, and
a pair of shaped rails extending between the opposed top and bottom blank faces at blank edge faces,
the stringerless foam blank having a core between the opposed top and bottom blank faces and the rails, wherein a midline axis extends between a nose region and a tail region of the stringerless foam blank and divides the stringerless foam blank into two substantially equal side regions, each of which extend between the midline axis and the rail on sides respectively thereof, wherein the stringerless foam blank is cut into two pieces at a plane passing substantially horizontal between the top and bottom blank faces and through the core to form a top section and a bottom section, wherein at least one longitudinally extending recess is formed on a cut surface of one or both of the top and bottom sections of the stringerless foam blank, wherein each recess is defined by a recess depth and a recess width such that the recess width is greater than the recess depth; and at least one flexible spine, wherein each flexible spine is molded from a composition of fibers and resin using a continuous molding process that produces a uniform cross-section, wherein each flexible spine is defined by a flat top side, a flat bottom side, and radiused peripheral edges joining the top and bottom sides such that a spine width associated with the top and bottom sides is greater than a spine thickness associated with the peripheral edges, wherein each flexible spine is disposed within one recess in the top or bottom section of the stringerless foam blank or within two opposing recesses in the top or bottom sections of the stringerless foam blank, wherein the at least flexible spine is bonded to be fixed between the top and bottom sections within the corresponding one or two recesses.

22. An apparatus for a surfcraft, the apparatus comprising:

a foam blank defined by a top blank face, an opposed bottom blank face, and a pair of shaped rails extending between the opposed top and bottom blank faces at blank edge faces, the foam blank having a core between the opposed top and bottom blank faces and the rails, wherein a midline axis extends between a nose region and a tail region of the foam blank and divides the foam blank into two substantially equal side regions, each of which extend between the midline axis and the rail on sides respectively thereof, wherein two or more longitudinally extending recesses are formed in any one or more of the top blank face, the bottom blank face, or the blank edge faces, wherein each recess extends into the core from the corresponding face of the foam blank and is defined by a recess depth and a recess width such that the recess width is greater than the recess depth; and two or more flexible spines disposed within the corresponding two or more recesses and bonded to be fixed therein, wherein each flexible spine is molded from a composition of fibers and resin using a continuous molding process that produces a uniform cross-section, wherein each flexible spine is defined by a top side, a bottom side, and peripheral edges joining the top and bottom sides such that a spine width associated with at least the top side is greater than a spine thickness associated with the peripheral edges;

wherein at least two of the two or more flexible spines are formed in one or more of different lengths, different cross-sectional shapes, different widths, and different thicknesses and the corresponding two or more longitudinally extending recesses are formed in a complementary length, cross-sectional shape, width, and depth to suit the corresponding flexible spine.

\* \* \* \* \*